(12) United States Patent
Mishra et al.

(10) Patent No.: US 12,521,447 B2
(45) Date of Patent: Jan. 13, 2026

(54) CATIONIC LIPID COMPOSITIONS FOR TISSUE-SPECIFIC DELIVERY

(71) Applicant: Life Technologies Corporation, Carlsbad, CA (US)

(72) Inventors: Shikha Mishra, San Diego, CA (US); Xavier de Mollerat du Jeu, Encinitas, CA (US)

(73) Assignee: Life Technologies Corporation, Carlsbad, CA (US)

(*) Notice: Subject to any disclaimer, the term of this patent is extended or adjusted under 35 U.S.C. 154(b) by 933 days.

(21) Appl. No.: 17/378,466

(22) Filed: Jul. 16, 2021

(65) Prior Publication Data
US 2022/0001023 A1  Jan. 6, 2022

Related U.S. Application Data

(63) Continuation of application No. 16/038,107, filed on Jul. 17, 2018, now abandoned.
(Continued)

(51) Int. Cl.
*A61K 9/1272* (2025.01)
*A61K 9/00* (2006.01)
(Continued)

(52) U.S. Cl.
CPC ........ *A61K 47/6917* (2017.08); *A61K 9/0019* (2013.01); *A61K 9/1272* (2013.01);
(Continued)

(58) Field of Classification Search
CPC .............. A61K 47/6917; A61K 9/0019; A61K 9/1272; A61K 31/7105; A61K 31/713;
(Continued)

(56) References Cited

U.S. PATENT DOCUMENTS 6,028,077 A    2/2000  Rinehart et al.
11,690,921 B2* 7/2023  Conway ............ A61K 48/0033
                                                      424/94.6
(Continued)

FOREIGN PATENT DOCUMENTS

EP        3315608 A1    5/2018
WO    WO-0027795 A1    5/2000
(Continued)

OTHER PUBLICATIONS

Smith, Mackensie C et al. "Zeta potential: a case study of cationic, anionic, and neutral liposomes." Analytical and bioanalytical chemistry vol. 409,24 (2017): 5779-5787. doi:10.1007/s00216-017-0527-z) (Year: 2017).*

(Continued)

*Primary Examiner* — Isaac Shomer
(74) *Attorney, Agent, or Firm* — Vijay Gore

(57) ABSTRACT

Provided herein are, inter alia, compositions and methods useful for the in vivo delivery of bioactive agents (e.g., therapeutic or diagnostic agents). The compositions provided herein include cationic lipids, helper lipids and a biostability enhancing agent, which together form a lipid aggregate with the bioactive agent and allow for the systemic delivery of the bioactive agent to, for example, lung tissue without the requirement for biomolecular targeting.

11 Claims, 65 Drawing Sheets

Related U.S. Application Data

(60) Provisional application No. 62/552,783, filed on Aug. 31, 2017.

(51) Int. Cl.

| | | |
|---|---|---|
| *A61K 31/7105* | (2006.01) | |
| *A61K 31/713* | (2006.01) | |
| *A61K 47/54* | (2017.01) | |
| *A61K 47/69* | (2017.01) | |
| *A61P 11/00* | (2006.01) | |
| *C12N 9/22* | (2006.01) | |
| *C12N 15/88* | (2006.01) | |

(52) U.S. Cl.
CPC ........ *A61K 31/7105* (2013.01); *A61K 31/713* (2013.01); *A61K 47/541* (2017.08); *A61K 47/549* (2017.08); *A61P 11/00* (2018.01); *C12N 9/22* (2013.01); *C12N 15/88* (2013.01)

(58) Field of Classification Search
CPC ..... A61K 47/541; A61K 47/549; A61P 11/00; C12N 9/22; C12N 15/88
See application file for complete search history.

(56) References Cited

U.S. PATENT DOCUMENTS

| | | | |
|---|---|---|---|
| 2004/0013720 A1 | 1/2004 | Ellens et al. | |
| 2006/0083780 A1 | 4/2006 | Heyes et al. | |
| 2008/0063701 A1 | 3/2008 | Keller et al. | |
| 2011/0165223 A1* | 7/2011 | Sgouros | A61K 9/0019 424/277.1 |
| 2012/0270921 A1* | 10/2012 | de Fougerolles | A61P 31/14 435/375 |
| 2013/0189364 A1 | 7/2013 | Sabin | |
| 2014/0206753 A1* | 7/2014 | Guild | A61K 38/47 514/44 R |
| 2015/0152436 A1* | 6/2015 | Musunuru | A61P 7/06 435/462 |
| 2015/0216803 A1 | 8/2015 | Siepis et al. | |
| 2015/0318305 A1 | 11/2015 | Zhang et al. | |
| 2016/0045600 A1* | 2/2016 | De Mollerat Du Jeu | C12N 15/88 435/458 |
| 2020/0353099 A1 | 11/2020 | Anderson et al. | |
| 2021/0259980 A1* | 8/2021 | Cheng | C12N 15/113 |

FOREIGN PATENT DOCUMENTS

| | | |
|---|---|---|
| WO | WO-03053408 A1 | 7/2003 |
| WO | WO-2011076807 A2 | 6/2011 |
| WO | WO-2012068176 A1 | 5/2012 |
| WO | WO-2015089487 A1 | 6/2015 |
| WO | WO-2016011203 A1 | 1/2016 |
| WO | WO-2016206626 A1 | 12/2016 |
| WO | WO-2017066707 A1 | 4/2017 |

OTHER PUBLICATIONS

Tuo Wei et al. "Systemic nanoparticle delivery of CRISPR-Cas9 ribonucleoproteins for effective tissue specific genome editing." Nature Communications, (2020) 11:3232, pp. 1-12. (Year: 2020).*
R. Siekmeier and G. Scheuch. "Systemic Treatment by Inhalation of Macromolecules—Principles, Problems, and Examples." Journal of Physiology and Pharmacology, vol. 59 Suppl. 6, 2008, pp. 53-79. (Year: 2008).*
F Mailly et al. "Analytical Isoelectric Focusing with Immobilized pH Gradients of Human Apolipoprotein E from Very Low Density Lipoproteins and Total Plasma." Journal of Lipid Research, vol. 31, 1990, pp. 149-155. (Year: 1990).*
Norbert Pardi et al. "Expression kinetics of nucleoside-modified mRNA delivered in lipid nanoparticles to mice by various routes." Journal of Controlled Release, vol. 217, 2015, pp. 345-351. (Year: 2015).*
Abe K., et al., "Effects of the PEG molecular weight of a PEG-lipid and cholesterol on PEG chain flexibility on liposome surfaces", Colloids and Surfaces A: Physiochemical and Engineering Aspects, XP055510793, vol. 474, Jun. 1, 2015 (Jun. 1, 2015), pp. 63-70.
CN Collaborative Search and Examination for Application No. PCT/US2018/042555, mailed Sep. 20, 2018, 20 pages.
Ghonaim H M., et al., "Varying the chain length in N4, N9-diacyl spermines: non-viral lipopolyamine vectors for efficient plasmid DNA formulation", Molecular Pharmaceutics, 2008, vol. 5, No. 6, pp. 1111-1121.
Harvie P., et al., "Use of poly(ethylene glycol)-lipid conjugates to regulate the surface attributes and transfection activity of lipid-DNA particles", Journal of Pharmaceutical Sciences, American Chemical Society and American Pharmaceutical Association, US, XP000927062, vol. 89, No. 5, May 1, 2000 (May 1, 2000), pp. 652-663.
International Search Report and Written Opinion for Application No. PCT/US2018/042555, mailed Oct. 17, 2018, 13 pages.
JP Collaborative Search and Examination for Application No. PCT/US2018/042555, mailed Sep. 25, 2018, 11 pages.
KR Collaborative Search and Examination for Application No. PCT/US2018/042555, mailed Sep. 17, 2018, 20 pages.
Nicolazzi C., et al., "Anionic polyethyleneglycol lipids added to cationic lipoplexes increase their plasmatic circulation time", Journal of Controlled Release, 2003, vol. 88, pp. 429-443.
US Collaborative Search and Examination for Application No. PCT/US2018/042555, mailed Sep. 20, 2018, 11 pages.

\* cited by examiner

Invivofectamine™ Lung Reagent Protocol

| | Procedure |
|---|---|
| Mix nucleic acid payload with Complexation Buffer | 1. Prepare 100 µL of a 0.69-mg/mL siRNA solution by mixing the following components in a 1:1 ratio:<br><br>| Component | Volume |<br>|---|---|<br>| siRNA duplex solution (1.38-mg/mL) | 50 µL |<br>| Complexation Buffer | 50 µL | | 1. Prepare 100 µL of a 0.6-mg/mL mRNA solution by mixing the following components in a 1:1 ratio:<br><br>| Component | Volume |<br>|---|---|<br>| mRNA solution (1.2-mg/mL) | 50 µL |<br>| Complexation Buffer | 50 µL | |
| Mix diluted siRNA or mRNA with Invivofectamine™ Lung Reagent | 2. Bring Invivofectamine™ Lung Reagent to room temperature and add 100 µL to a 1.5-mL tube. Add diluted siRNA or mRNA solution immediately to Invivofectamine™ Lung Reagent in tube. Return remaining reagent to 4°C for storage. |
| Vortex | 3. Vortex immediately to ensure Invivofectamine™ Lung-payload complexation. |
| Incubate | 4. Incubate the Invivofectamine™ Lung-payload mixture for 30 minutes at 50°C. Centrifuge the tube briefly to collect the sample. |
| Dialyze complex | 5. Add the Invivofectamine™ Lung-payload mixture to the dialysis device and incubate at room temperature for 1.5–2 hours in 1L of PBS pH 7.4 with gentle agitation. Following dialysis, collect sample and dilute to desired concentration. |
| Inject mouse | 6. Proceed with in vivo delivery of the Invivofectamine™ Lung-payload complex, or store the complex at −20°C for up to a week prior to injection. |

FIG. 1C

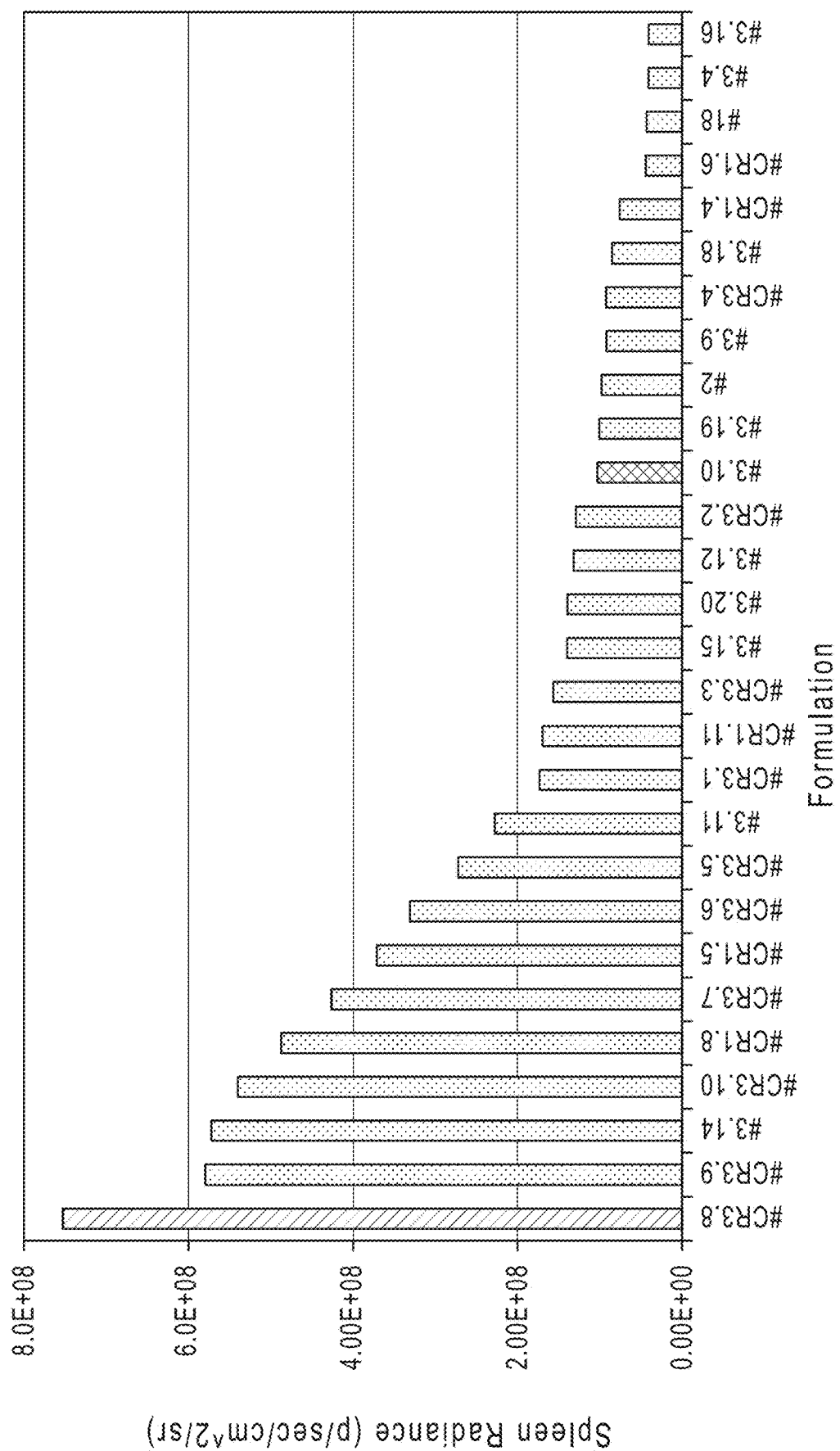

CATIONIC LIPID COMPOSITIONS FOR TISSUE-SPECIFIC DELIVERY

CROSS-REFERENCE TO RELATED APPLICATIONS

This application is a continuation of U.S. application Ser. No. 16/038,107, filed Jul. 17, 2018, which claims the benefit of priority to U.S. Provisional Application No. 62/552,783, filed Aug. 31, 2017, each of which disclosure is herein incorporated by reference in its entirety.

BACKGROUND OF THE INVENTION

Delivery of payloads such as therapeutic nucleic acids to specific tissues has traditionally been achieved using biomolecular targeting via ligand or receptor expression on the surface of lipid nanoparticles which serve as a delivery vehicle. Designing lipid nanoparticles capable of targeting specific organs, tissues, or cell types without the use of canonical biomolecular targeting techniques has been a significant challenge. Manipulation of the inherent properties of lipid nanoparticles affords a means of achieving organ, tissue, and cell-type specific targeting. Provided herein are compositions and methods which cure this and other needs in the art.

BRIEF SUMMARY OF THE INVENTION

In an aspect is provided a composition including: (i) a first cationic lipid at a compositional molar ratio from about 0.18 to about 0.32 and of formula:

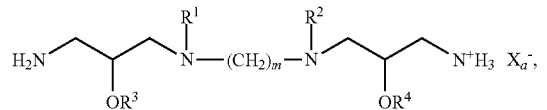

(I)

wherein $R^1$ and $R^2$ are independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; $R^3$ and $R^4$ are independently hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; m is an integer from 1 to 6; $X_a^-$ is an anion; (ii) a second cationic lipid at a compositional molar ratio from about 0.24 to about 0.51 and of formula:

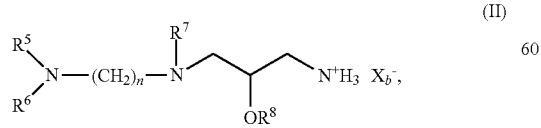

(II)

wherein $R^5$ and $R^8$ are independently hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; $R^6$ and $R^7$ are independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; n is an integer from 1 to 6; and $X_b^-$ is an anion; (iii) a first helper lipid; (iv) a second helper lipid; and (v) a biostability enhancing agent.

In an aspect is provided a composition including: (i) a first cationic lipid at a compositional molar ratio from about 0.18 to about 0.32 and of formula:

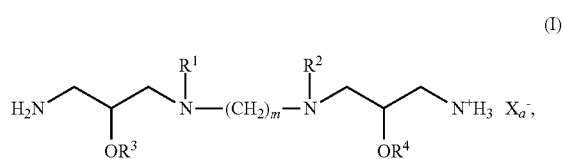

(I)

wherein $R^1$ and $R^2$ are independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; $R^3$ and $R^4$ are independently hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; m is an integer from 1 to 6; $X_a^-$ is an anion; (ii) a second cationic lipid at a compositional molar ratio from about 0.24 to about 0.51 and of formula:

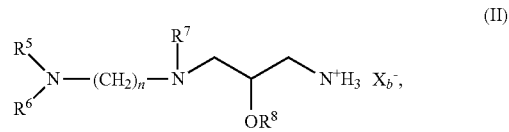

(II)

wherein $R^5$ and $R^8$ are independently hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; $R^6$ and $R^7$ are independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; n is an integer from 1 to 6; and $X_b^-$ is an anion; (iii) a first helper lipid at a compositional molar ratio from about 0.20 to about 0.32; (iv) a second helper lipid; and (v) a biostability enhancing agent.

In an aspect is provided a composition including: (i) a first cationic lipid at a compositional molar ratio from about 0.18 to about 0.32 and of formula:

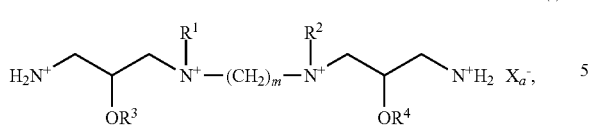

(I)

wherein $R^1$ and $R^2$ are independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; $R^3$ and $R^4$ are independently hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; m is an integer from 1 to 6; $X_a^-$ is an anion; (ii) a second cationic lipid at a compositional molar ratio from about 0.24 to about 0.51 and of formula:

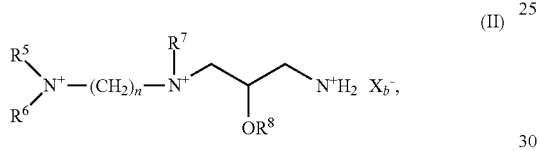

(II)

wherein $R^5$ and $R^8$ are independently hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; $R^6$ and $R^7$ are independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; n is an integer from 1 to 6; and $X_b^-$ is an anion; (iii) a first helper lipid at a compositional molar ratio from about 0.20 to about 0.32; (iv) a second helper lipid at a compositional molar ratio from about 0.01 to about 0.14; and (v) a biostability enhancing agent.

In an aspect is provided a composition including: (i) a first cationic lipid at a compositional molar ratio from about 0.18 to about 0.32 and of formula:

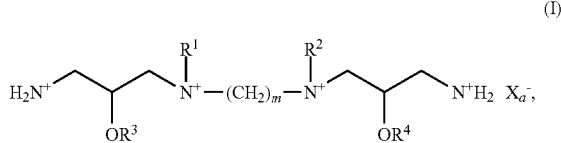

(I)

wherein $R^1$ and $R^2$ are independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; $R^3$ and $R^4$ are independently hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; m is an integer from 1 to 6; $X_a^-$ is an anion; (ii) a second cationic lipid at a compositional molar ratio from about 0.24 to about 0.51 and of formula:

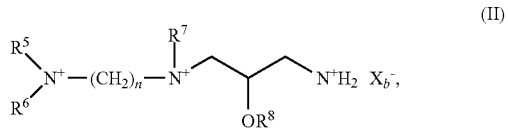

(II)

wherein $R^5$ and $R^8$ are independently hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; $R^6$ and $R^7$ are independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; n is an integer from 1 to 6; and $X_b^-$ is an anion; (iii) a first helper lipid at a compositional molar ratio from about 0.20 to about 0.32; (iv) a second helper lipid at a compositional molar ratio from about 0.01 to about 0.14; and (v) a biostability enhancing agent at a compositional molar ratio from about 0.01 to about 0.02.

In an aspect is provided a composition including: (i) a first cationic lipid at a compositional molar ratio of about 0.24, wherein the first cationic lipid is dihydroxy dimyristyl spermine; (ii) a second cationic lipid at a compositional molar ratio of about 0.38, wherein the second cationic lipid is hydroxy dimyristyl spermidine; (iii) a first helper lipid at a compositional molar ratio of about 0.32, wherein the first helper lipid is dioleoylphosphatidylethanolamine; (iv) a second helper lipid at a compositional molar ratio of about 0.05, wherein the second helper lipid is cholesterol; and (v) a biostability enhancing agent at a compositional molar ratio of about 0.01, wherein the biostability enhancing agent is C14 polyethylene glycol 5000.

In an aspect is provided a composition including: (i) a first cationic lipid at a compositional molar ratio of about 0.32, wherein the first cationic lipid is dihydroxy dimyristyl spermine; (ii) a second cationic lipid at a compositional molar ratio of about 0.39, wherein the second cationic lipid is hydroxy dimyristyl spermidine; (iii) a first helper lipid at a compositional molar ratio of about 0.26, wherein the first helper lipid is dioleoylphosphatidylethanolamine; (iv) a second helper lipid at a compositional molar ratio of about 0.01, wherein the second helper lipid is cholesterol; and (v) a biostability enhancing agent at a compositional molar ratio of about 0.02, wherein the biostability enhancing agent is C14 polyethylene glycol 5000.

In an aspect is provided a composition including: (i) a first cationic lipid at a compositional molar ratio of about 0.18, wherein the first cationic lipid is dihydroxy dimyristyl spermine; (ii) a second cationic lipid at a compositional molar ratio of about 0.38, wherein the second cationic lipid is hydroxy dimyristyl spermidine; (iii) a first helper lipid at a compositional molar ratio of about 0.32, wherein the first helper lipid is dioleoylphosphatidylethanolamine; (iv) a second helper lipid at a compositional molar ratio of about 0.10, wherein the second helper lipid is cholesterol; and (v) a biostability enhancing agent at a compositional molar ratio of about 0.02, wherein the biostability enhancing agent is C14 polyethylene glycol 5000.

In an aspect is provided a composition including: (i) a first cationic lipid at a compositional molar ratio of about 0.23, wherein the first cationic lipid is dihydroxy dimyristyl spermine; (ii) a second cationic lipid at a compositional molar ratio of about 0.45, wherein the second cationic lipid is hydroxy dimyristyl spermidine; (iii) a first helper lipid at a compositional molar ratio of about 0.20, wherein the first helper lipid is dioleoylphosphatidylethanolamine; (iv) a second helper lipid at a compositional molar ratio of about 0.10, wherein the second helper lipid is cholesterol; and (v) a biostability enhancing agent at a compositional molar ratio of about 0.02, wherein the biostability enhancing agent is C14 polyethylene glycol 5000.

In an aspect is provided a composition including: (i) a first cationic lipid at a compositional molar ratio of about 0.18, wherein the first cationic lipid is dihydroxy dimyristyl spermine; (ii) a second cationic lipid at a compositional molar ratio of about 0.51, wherein the second cationic lipid is hydroxy dimyristyl spermidine; (iii) a first helper lipid at a compositional molar ratio of about 0.20, wherein the first helper lipid is dioleoylphosphatidylethanolamine; (iv) a second helper lipid at a compositional molar ratio of about 0.10, wherein the second helper lipid is cholesterol; and (v) a biostability enhancing agent at a compositional molar ratio of about 0.01, wherein the biostability enhancing agent is C14 polyethylene glycol 5000.

In an aspect is provided a composition including: (i) a first cationic lipid at a compositional molar ratio of about 0.27, wherein the first cationic lipid is dihydroxy dimyristyl spermine; (ii) a second cationic lipid at a compositional molar ratio of about 0.38, wherein the second cationic lipid is hydroxy dimyristyl spermidine; (iii) a first helper lipid at a compositional molar ratio of about 0.32, wherein the first helper lipid is dioleoylphosphatidylethanolamine; (iv) a second helper lipid at a compositional molar ratio of about 0.01, wherein the second helper lipid is cholesterol; and (v) a biostability enhancing agent at a compositional molar ratio of about 0.02, wherein the biostability enhancing agent is C14 polyethylene glycol 5000.

In an aspect is provided a composition including: (i) a first cationic lipid at a compositional molar ratio of about 0.25, wherein the first cationic lipid is dihydroxy dimyristyl spermine; (ii) a second cationic lipid at a compositional molar ratio of about 0.38, wherein the second cationic lipid is hydroxy dimyristyl spermidine; (iii) a first helper lipid at a compositional molar ratio of about 0.26, wherein the first helper lipid is dioleoylphosphatidylethanolamine; (iv) a second helper lipid at a compositional molar ratio of about 0.10, wherein the second helper lipid is cholesterol; and (v) a biostability enhancing agent at a compositional molar ratio of about 0.01, wherein the biostability enhancing agent is C14 polyethylene glycol 5000.

In an aspect is provided a composition including: (i) a first cationic lipid at a compositional molar ratio of about 0.28, wherein the first cationic lipid is dihydroxy dimyristyl spermine; (ii) a second cationic lipid at a compositional molar ratio of about 0.24, wherein the second cationic lipid is hydroxy dimyristyl spermidine; (iii) a first helper lipid at a compositional molar ratio of about 0.32, wherein the first helper lipid is dioleoylphosphatidylethanolamine; (iv) a second helper lipid at a compositional molar ratio of about 0.14, wherein the second helper lipid is cholesterol; and (v) a biostability enhancing agent at a compositional molar ratio of about 0.02, wherein the biostability enhancing agent is C14 polyethylene glycol 750.

In an aspect is provided a composition including: (i) a first cationic lipid at a compositional molar ratio of about 0.18, wherein the first cationic lipid is dihydroxy dimyristyl spermine; (ii) a second cationic lipid at a compositional molar ratio of about 0.47, wherein the second cationic lipid is hydroxy dimyristyl spermidine; (iii) a first helper lipid at a compositional molar ratio of about 0.32, wherein the first helper lipid is dioleoylphosphatidylethanolamine; (iv) a second helper lipid at a compositional molar ratio of about 0.01, wherein the second helper lipid is cholesterol; and (v) a biostability enhancing agent at a compositional molar ratio of about 0.02, wherein said biostability enhancing agent is C14 polyethylene glycol 5000.

In an aspect is provided a composition including: (i) a first cationic lipid at a compositional molar ratio of about 0.24, wherein the first cationic lipid is dihydroxy dimyristyl spermine; (ii) a second cationic lipid at a compositional molar ratio of about 0.40, wherein the second cationic lipid is hydroxy dimyristyl spermidine; (iii) a first helper lipid at a compositional molar ratio of about 0.24, wherein the first helper lipid is dioleoylphosphatidylethanolamine; (iv) a second helper lipid at a compositional molar ratio of about 0.10, wherein the second helper lipid is cholesterol; and (v) a biostability enhancing agent at a compositional molar ratio of about 0.02, wherein the biostability enhancing agent is C14 polyethylene glycol 2000.

In an aspect is provided a composition including: (i) a first cationic lipid at a compositional molar ratio of about 0.32, wherein the first cationic lipid is dihydroxy dimyristyl spermine; (ii) a second cationic lipid at a compositional molar ratio of about 0.38, wherein the second cationic lipid is hydroxy dimyristyl spermidine; (iii) a first helper lipid at a compositional molar ratio of about 0.20, wherein the first helper lipid is dioleoylphosphatidylethanolamine; (iv) a second helper lipid at a compositional molar ratio of about 0.08, wherein the second helper lipid is cholesterol; and (v) a biostability enhancing agent at a compositional molar ratio of about 0.02, wherein the biostability enhancing agent is C14 polyethylene glycol 5000.

In an aspect is provided a pharmaceutical composition including a composition as provided herein including embodiments thereof and a pharmaceutically acceptable excipient.

In an aspect is provided a cell including a composition as provided herein including embodiments thereof. In embodiments, the cell is a mammalian cell. In embodiments, the cell is a rodent cell. In embodiments, the cell is a mouse cell. In embodiments, the cell is a rat cell. In embodiments, the cell is a porcine cell. In embodiments, the cell is a canine cell. In embodiments, the cell is a primate cell. In embodiments, the cell is an epithelial cell. In embodiments, the cell is an epithelial lung cell. In embodiments, the cell is an endothelial cell. In embodiments, the cell is an endothelial lung cell.

In an aspect is provided, method of delivering a bioactive agent to a cell, the method including: (i) admixing an bioactive agent with a composition as provided herein including embodiments thereof, thereby forming a bioactive agent-lipid complex; (ii) contacting a cell with the bioactive agent-lipid complex, thereby delivering the bioactive agent-lipid complex to a cell.

In another aspect is provided a method of delivering a bioactive agent to lung tissue in a subject, the method including: (i) admixing an bioactive agent with a composition as described herein including embodiments thereof, thereby forming a bioactive agent-lipid complex; (ii) systemically administering an effective amount of the bioactive agent-lipid complex to a subject, thereby delivering the bioactive agent-lipid complex to a lung tissue in a subject.

In another aspect is provided a method of expressing a protein in lung tissue in a subject, the method including: (i) admixing a mRNA with a composition as described herein including embodiments thereof, thereby forming a mRNA-lipid complex; (ii) administering an effective amount of the mRNA-lipid complex to a subject; and (iii) allowing the mRNA of the mRNA-lipid complex to express in lung tissue of the subject, thereby expressing a protein in lung tissue in a subject.

In an aspect is provided a method of treating a pulmonary disease in a subject in need thereof, the method including administering to a subject a therapeutically effective amount of a bioactive agent and a composition as described herein including embodiments thereof, thereby treating a pulmonary disease in the subject.

BRIEF DESCRIPTION OF THE DRAWINGS

FIGS. 1A-1C. Based on mixture Design of Experiment optimization, new LNP formulations were made, complexed with mRNA using the previously developed protocol (FIGS. 1A-1C), and the subsequent LNPs were screened for delivery in vivo using a luciferase readout. Top performing formulations were then used to model and predict second generation formulations for optimized tissue specific expression. These new formulations were then tested in vivo to identify the best LNP formulation. FIG. 1A. Cartoon representation of method for generating new lipid nanoparticle (LNP) formulations, testing in vivo, and optimizing. FIG. 1B. Cartoon representation of steps involved in complexing the LNP formulation with mRNA and testing in vivo. FIG. 1C. Written procedure of steps involved in complexing the LNP formulation with mRNA and testing in vivo.

FIG. 3A shows through whole animal imaging that LNPs distributed in the spleen. FIG. 3B shows through whole animal imaging that LNPs distributed in the lung. FIGS. 3C-3E show biodistribution patterns of LNPs determined from imaging ex vivo isolated organ tissue.

FIGS. 4A-4B. Performance optimization screening. FIG. 4A. Lung directed delivery: ex vivo quantification. FIG. 4B. Spleen directed delivery: ex vivo quantification.

FIG. 5A. Lung delivery in vivo luciferase expression. FIG. 5B. Lung radiance as a function of mRNA dose titration (3 mg/kg, 1 mg/kg, 0.5 mg/kg) quantified 4 hours (4 h) post-injection. FIG. 5C. Lung directed delivery: in vivo quantification. In vivo radiance over time (hours) quantified for each dose titration (3 mg/kg, 1 mg/kg, 0.5 mg/kg).

FIG. 6A. Ex vivo lung bioluminescence signal. FIG. 6B. In vivo bioluminescence signal. FIG. 6C. Quantification of ex vivo lung luciferase signal.

FIG. 7A. Levels of IL5. FIG. 7B. Levels of IL4. FIG. 7C. Levels of IL2. FIG. 7D. Levels of IL10. FIG. 7E. Levels of IL1b. FIG. 7F. Levels of IL6. FIG. 7G. Levels of IFNg. FIG. 7H. Levels of GMCSF. FIG. 7I. Levels of IL12. FIG. 7J. Levels of TNFa.

FIG. 11E shows Bruce #3.14 lipid nanoparticle formulation and Jet PEI® flux. Two animals in the Jet PEI® group died. FIG. 11F shows flux in lung after treatment with Bruce #3.14 lipid nanoparticle formulation or Jet PEI®.

FIG. 12A shows organ flux luciferase activity across organs. FIG. 12B shows in vivo whole animal luminescence. FIG. 12C shows ex vivo isolated organ tissue luminescence.

FIG. 13A shows organ flux luciferase activity across organs. FIG. 13B shows in vivo whole animal luminescence. FIG. 13C shows ex vivo isolated organ tissue luminescence.

FIG. 14A shows organ flux luciferase activity across organs. FIG. 14B shows in vivo whole animal luminescence. FIG. 14C shows ex vivo isolated organ tissue luminescence.

FIG. 15A shows organ flux luciferase activity across organs. FIG. 15B shows in vivo whole animal luminescence. FIG. 15C shows ex vivo isolated organ tissue luminescence.

FIG. 16A shows organ flux luciferase activity across organs. FIG. 16B shows in vivo whole animal luminescence. FIG. 16C shows ex vivo isolated organ tissue luminescence.

FIG. 17K shows mean (total flux (p/s)) vs. column 1 over time.

FIG. 20A shows a bar graph depicting lung radiance for each formulation. FIG. 20B shows in vivo whole animal radiance for each formulation.

FIGS. 24A and 24C show lacZ expression via beta-gal staining. FIGS. 24B and 24D are high magnification images of the regions circled in 24A and 24C, respectively.

FIG. 25A shows 10× view of staining. FIG. 25B shows 25× view of staining.

FIGS. 27A and 27B shows N/P ratio 10. FIGS. 27C and 27D shows N/P ratio 8. FIGS. 27E and 27F shows N/P ratio 6. FIGS. 27G and 27H shows N/P ratio 4. FIGS. 27I and 27J shows N/P ratio 2. FIG. 27K shows a side view of N/P ratio 4.

DETAILED DESCRIPTION OF THE INVENTION

Definitions

Figure 1A:
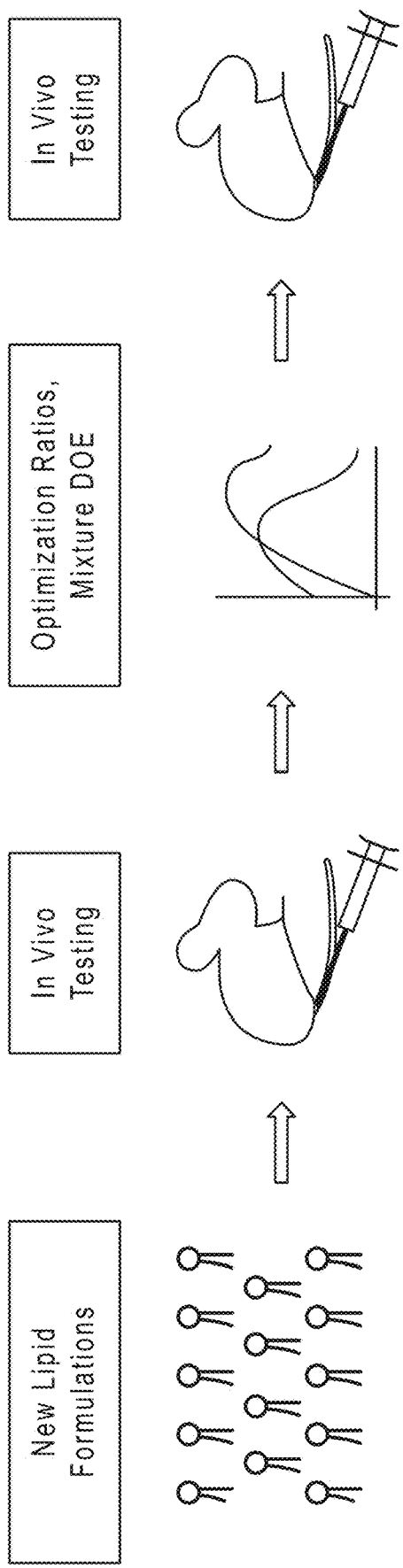

The abbreviations used herein have their conventional meaning within the chemical and biological arts. The chemical structures and formulae set forth herein are constructed according to the standard rules of chemical valency known in the chemical arts.

Where substituent groups are specified by their conventional chemical formulae, written from left to right, they equally encompass the chemically identical substituents that would result from writing the structure from right to left, e.g., —CH$_2$O— is equivalent to —OCH$_2$—.

The term "alkyl," by itself or as part of another substituent, means, unless otherwise stated, a straight (i.e., unbranched) or branched chain, or combination thereof, which may be fully saturated, mono- or polyunsaturated and can include di- and multivalent radicals, having the number of carbon atoms designated (i.e., $C_1$-$C_{10}$ means one to ten carbons). Alkyl is an uncyclized chain. Examples of saturated hydrocarbon radicals include, but are not limited to, groups such as methyl, ethyl, n-propyl, isopropyl, n-butyl, t-butyl, isobutyl, sec-butyl, (cyclohexyl)methyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. An alkoxy is an alkyl attached to the remainder of the molecule via an oxygen linker (—O—).

The term "alkylene," by itself or as part of another substituent, means, unless otherwise stated, a divalent radical derived from an alkyl, as exemplified, but not limited by, —CH$_2$CH$_2$CH$_2$CH$_2$—. Typically, an alkyl (or alkylene) group will have from 1 to 24 carbon atoms, with those groups having 10 or fewer carbon atoms being preferred. A "lower alkyl" or "lower alkylene" is a $C_1$-$C_8$ alkyl or alkylene group.

The term "heteroalkyl," by itself or in combination with another term, means, unless otherwise stated, a stable straight or branched chain, or combinations thereof, consisting of at least one carbon atom and at least one heteroatom selected from the group consisting of O, N, P, Si, and S, and wherein the nitrogen and sulfur atoms may optionally be oxidized, and the nitrogen heteroatom may optionally be quaternized. The heteroatom(s) O, N, P, S, and Si may be placed at any interior position of the heteroalkyl group or at the position at which the alkyl group is attached to the remainder of the molecule. Heteroalkyl is an uncyclized chain.

Examples include, but are not limited to: —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_2$, —S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, —CH=CH—N(CH$_3$)—CH$_3$, —O—CH$_3$, —O—CH$_2$—CH$_3$, and —CN. Up to two heteroatoms may be consecutive, such as, for example, —CH$_2$—NH—OCH$_3$.

Similarly, the term "heteroalkylene," by itself or as part of another substituent, means, unless otherwise stated, a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —C(O)$_2$R'— represents both —C(O)$_2$R'— and —R'C(O)$_2$—. As described above, heteroalkyl groups, as used herein, include those groups that are attached to the remainder of the molecule through a heteroatom, such as —C(O)R', —C(O)NR', —NR'R", —OR', —SR', and/or —SO$_2$R'. Where "heteroalkyl" is recited, followed by recitations of specific heteroalkyl groups, such as —NR'R" or the like, it will be understood that the terms heteroalkyl and —NR'R" are not redundant or mutually exclusive. Rather, the specific heteroalkyl groups are recited to add clarity. Thus, the term "heteroalkyl" should not be interpreted herein as excluding specific heteroalkyl groups, such as —NR'R" or the like.

The terms "cycloalkyl" and "heterocycloalkyl," by themselves or in combination with other terms, mean, unless otherwise stated, cyclic versions of "alkyl" and "heteroalkyl," respectively. Cycloalkyl and heteroalkyl are not aromatic. Additionally, for heterocycloalkyl, a heteroatom can occupy the position at which the heterocycle is attached to the remainder of the molecule. Examples of cycloalkyl include, but are not limited to, cyclopropyl, cyclobutyl, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. A "cycloalkylene" and a "heterocycloalkylene," alone or as part of another substituent, means a divalent radical derived from a cycloalkyl and heterocycloalkyl, respectively.

The terms "halo" or "halogen," by themselves or as part of another substituent, mean, unless otherwise stated, a fluorine, chlorine, bromine, or iodine atom. Additionally, terms such as "haloalkyl" are meant to include monohaloalkyl and polyhaloalkyl. For example, the term "halo($C_1$-$C_4$) alkyl" includes, but is not limited to, fluoromethyl, difluoromethyl, trifluoromethyl, 2,2,2-trifluoroethyl, 4-chlorobutyl, 3-bromopropyl, and the like.

The term "acyl" means, unless otherwise stated, —C(O)R where R is a substituted or unsubstituted alkyl, substituted or unsubstituted cycloalkyl, substituted or unsubstituted heteroalkyl, substituted or unsubstituted heterocycloalkyl, substituted or unsubstituted aryl, or substituted or unsubstituted heteroaryl.

The term "aryl" means, unless otherwise stated, a polyunsaturated, aromatic, hydrocarbon substituent, which can be a single ring or multiple rings (preferably from 1 to 3 rings) that are fused together (i.e., a fused ring aryl) or linked covalently. A fused ring aryl refers to multiple rings fused together wherein at least one of the fused rings is an aryl ring. The term "heteroaryl" refers to aryl groups (or rings) that contain from one to four heteroatoms selected from N, O, and S, wherein the nitrogen and sulfur atoms are optionally oxidized, and the nitrogen atom(s) are optionally quaternized. Thus, the term "heteroaryl" includes fused ring heteroaryl groups (i.e., multiple rings fused together wherein at least one of the fused rings is a heteroaromatic ring). A 5,6-fused ring heteroarylene refers to two rings fused together, wherein one ring has 5 members and the other ring has 6 members, and wherein at least one ring is a heteroaryl ring. Likewise, a 6,6-fused ring heteroarylene refers to two rings fused together, wherein one ring has 6 members and the other ring has 6 members, and wherein at least one ring is a heteroaryl ring. And a 6,5-fused ring heteroarylene refers to two rings fused together, wherein one ring has 6 members and the other ring has 5 members, and wherein at least one ring is a heteroaryl ring. A heteroaryl group can be attached to the remainder of the molecule through a carbon or heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below. An "arylene" and a "heteroarylene," alone or as part of another substituent, mean a divalent radical derived from an aryl and heteroaryl, respectively.

For brevity, the term "aryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl, and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

The term "oxo," as used herein, means an oxygen that is double bonded to a carbon atom.

The term "alkylsulfonyl," as used herein, means a moiety having the formula —S($O_2$)—R', where R' is an alkyl group as defined above. R' may have a specified number of carbons (e.g., "$C_1$-$C_4$ alkylsulfonyl").

Each of the above terms (e.g., "alkyl," "heteroalkyl," "aryl," and "heteroaryl") includes both substituted and unsubstituted forms of the indicated radical.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) can be one or more of a variety of groups selected from, but not limited to, —OR', =O, =NR', =N—OR', —NR'R", —SR', -halogen, —SiR'R"R'", —OC(O)R', —C(O)R', —$CO_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —CN, and —NO$_2$ in a number ranging from zero to (2m'+1), where m' is the total number of carbon atoms in such radical. R', R", R'", and R"" each preferably independently refer to hydrogen, substituted or unsubstituted heteroalkyl, substituted or unsubstituted cycloalkyl, substituted or unsubstituted heterocycloalkyl, substituted or unsubstituted aryl (e.g., aryl substituted with 1-3 halogens), substituted or unsubstituted alkyl, alkoxy, or thioalkoxy groups, or arylalkyl groups. When a compound disclosed herein includes more than one R group, for example, each of the R groups is independently selected as are each R', R", R'", and R"" group when more than one of these groups is present. When R' and R" are attached to the same nitrogen atom, they can be combined with the nitrogen atom to form a 4-, 5-, 6-, or 7-membered ring. For example, —NR'R" includes, but is not limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —$CF_3$ and —$CH_2CF_3$) and acyl (e.g., —C(O)$CH_3$, —C(O)$CF_3$, —C(O)$CH_2OCH_3$, and the like).

Similar to the substituents described for the alkyl radical, substituents for the aryl and heteroaryl groups are varied and are selected from, for example: —OR', —NR'R", —SR', -halogen, —SiR'R"R'", —OC(O)R', —C(O)R', —$CO_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —CN, —NO$_2$, —R', —N$_3$, —CH(Ph)$_2$, fluoro($C_1$-$C_4$)alkoxy, and fluoro($C_1$-$C_4$)alkyl, in a number ranging from zero to the total number of open valences on the aromatic ring system; and where R', R", R'", and R"" are preferably independently selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl. When a compound disclosed herein includes more than one R group, for example, each of the R groups is independently selected as are each R', R", R''', and R"" groups when more than one of these groups is present.

Two or more substituents may optionally be joined to form aryl, heteroaryl, cycloalkyl, or heterocycloalkyl groups. Such so-called ring-forming substituents are typically, though not necessarily, found attached to a cyclic base structure. In embodiments, the ring-forming substituents are attached to adjacent members of the base structure. For example, two ring-forming substituents attached to adjacent members of a cyclic base structure create a fused ring structure. In another embodiment, the ring-forming substituents are attached to a single member of the base structure. For example, two ring-forming substituents attached to a single member of a cyclic base structure create a spirocyclic structure. In yet another embodiment, the ring-forming substituents are attached to non-adjacent members of the base structure.

Two of the substituents on adjacent atoms of the aryl or heteroaryl ring may optionally form a ring of the formula -T-C(O)—(CRR')$_q$—U—, wherein T and U are independently —NR—, —O—, —CRR'—, or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'—, or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —(CRR')$_s$—X'—(C"R''')$_d$—, where s and d are independently integers of from 0 to 3, and X' is —O—, —NR'—, —S—, —S(O)—, —S(O)$_2$—, or —S(O)$_2$NR'—. The substituents R, R', R", and R''' are preferably independently selected from hydrogen, substituted or unsubstituted alkyl, substituted or unsubstituted cycloalkyl, substituted or unsubstituted heterocycloalkyl, substituted or unsubstituted aryl, and substituted or unsubstituted heteroaryl.

As used herein, the terms "heteroatom" or "ring heteroatom" are meant to include oxygen (O), nitrogen (N), sulfur (S), phosphorus (P), and silicon (Si).

A "substituent group," as used herein, means a group selected from the following moieties:
(A) —OH, —NH$_2$, —SH, —CN, —CF$_3$, —NO$_2$, oxo, halogen, unsubstituted alkyl, unsubstituted heteroalkyl, unsubstituted cycloalkyl, unsubstituted heterocycloalkyl, unsubstituted aryl, unsubstituted heteroaryl, and
(B) alkyl, heteroalkyl, cycloalkyl, heterocycloalkyl, aryl, and heteroaryl, substituted with at least one substituent selected from:
(i) oxo, —OH, —NH$_2$, —SH, —CN, —CF$_3$, —NO$_2$, halogen, unsubstituted alkyl, unsubstituted heteroalkyl, unsubstituted cycloalkyl, unsubstituted heterocycloalkyl, unsubstituted aryl, unsubstituted heteroaryl, and
(ii) alkyl, heteroalkyl, cycloalkyl, heterocycloalkyl, aryl, and heteroaryl, substituted with at least one substituent selected from:
(a) oxo, —OH, —NH$_2$, —SH, —CN, —CF$_3$, —NO$_2$, halogen, unsubstituted alkyl, unsubstituted heteroalkyl, unsubstituted cycloalkyl, unsubstituted heterocycloalkyl, unsubstituted aryl, unsubstituted heteroaryl, and
(b) alkyl, heteroalkyl, cycloalkyl, heterocycloalkyl, aryl, or heteroaryl, substituted with at least one substituent selected from:
oxo, —OH, —NH$_2$, —SH, —CN, —CF$_3$, —NO$_2$, halogen, unsubstituted alkyl, unsubstituted heteroalkyl, unsubstituted cycloalkyl, unsubstituted heterocycloalkyl, unsubstituted aryl, and unsubstituted heteroaryl.

A "size-limited substituent" or "size-limited substituent group," as used herein, means a group selected from all of the substituents described above for a "substituent group," wherein each substituted or unsubstituted alkyl is a substituted or unsubstituted C$_1$-C$_{20}$ alkyl, each substituted or unsubstituted heteroalkyl is a substituted or unsubstituted 2 to 20 membered heteroalkyl, each substituted or unsubstituted cycloalkyl is a substituted or unsubstituted C$_4$-C$_8$ cycloalkyl, and each substituted or unsubstituted heterocycloalkyl is a substituted or unsubstituted 4 to 8 membered heterocycloalkyl.

A "lower substituent" or "lower substituent group," as used herein, means a group selected from all of the substituents described above for a "substituent group," wherein each substituted or unsubstituted alkyl is a substituted or unsubstituted C$_1$-C$_8$ alkyl, each substituted or unsubstituted heteroalkyl is a substituted or unsubstituted 2 to 8 membered heteroalkyl, each substituted or unsubstituted cycloalkyl is a substituted or unsubstituted C$_5$-C$_7$ cycloalkyl, and each substituted or unsubstituted heterocycloalkyl is a substituted or unsubstituted 5 to 7 membered heterocycloalkyl.

In some embodiments, each substituted group described in the compounds herein is substituted with at least one substituent group. More specifically, in some embodiments, each substituted alkyl, substituted heteroalkyl, substituted cycloalkyl, substituted heterocycloalkyl, substituted aryl, substituted heteroaryl, substituted alkylene, substituted heteroalkylene, substituted cycloalkylene, substituted heterocycloalkylene, substituted arylene, and/or substituted heteroarylene described in the compounds herein are substituted with at least one substituent group. In other embodiments, at least one or all of these groups are substituted with at least one size-limited substituent group. In other embodiments, at least one or all of these groups are substituted with at least one lower substituent group.

In other embodiments of the compounds herein, each substituted or unsubstituted alkyl may be a substituted or unsubstituted C$_1$-C$_{20}$ alkyl, each substituted or unsubstituted heteroalkyl is a substituted or unsubstituted 2 to 20 membered heteroalkyl, each substituted or unsubstituted cycloalkyl is a substituted or unsubstituted C$_3$-C$_8$ cycloalkyl, each substituted or unsubstituted heterocycloalkyl is a substituted or unsubstituted 3 to 8 membered heterocycloalkyl, each substituted or unsubstituted aryl is a substituted or unsubstituted C$_6$-C$_{10}$ aryl, and/or each substituted or unsubstituted heteroaryl is a substituted or unsubstituted 5 to 10 membered heteroaryl. In some embodiments of the compounds herein, each substituted or unsubstituted alkylene is a substituted or unsubstituted C$_1$-C$_{20}$ alkylene, each substituted or unsubstituted heteroalkylene is a substituted or unsubstituted 2 to 20 membered heteroalkylene, each substituted or unsubstituted cycloalkylene is a substituted or unsubstituted C$_3$-C$_8$ cycloalkylene, each substituted or unsubstituted heterocycloalkylene is a substituted or unsubstituted 3 to 8 membered heterocycloalkylene, each substituted or unsubstituted arylene is a substituted or unsubstituted C$_6$-C$_{10}$ arylene, and/or each substituted or unsubstituted heteroarylene is a substituted or unsubstituted 5 to 10 membered heteroarylene.

In some embodiments, each substituted or unsubstituted alkyl is a substituted or unsubstituted $C_1$-$C_8$ alkyl, each substituted or unsubstituted heteroalkyl is a substituted or unsubstituted 2 to 8 membered heteroalkyl, each substituted or unsubstituted cycloalkyl is a substituted or unsubstituted $C_3$-$C_7$ cycloalkyl, each substituted or unsubstituted heterocycloalkyl is a substituted or unsubstituted 3 to 7 membered heterocycloalkyl, each substituted or unsubstituted aryl is a substituted or unsubstituted $C_6$-$C_{10}$ aryl, and/or each substituted or unsubstituted heteroaryl is a substituted or unsubstituted 5 to 9 membered heteroaryl. In some embodiments, each substituted or unsubstituted alkylene is a substituted or unsubstituted $C_1$-$C_8$ alkylene, each substituted or unsubstituted heteroalkylene is a substituted or unsubstituted 2 to 8 membered heteroalkylene, each substituted or unsubstituted cycloalkylene is a substituted or unsubstituted $C_3$-$C_7$ cycloalkylene, each substituted or unsubstituted heterocycloalkylene is a substituted or unsubstituted 3 to 7 membered heterocycloalkylene, each substituted or unsubstituted arylene is a substituted or unsubstituted $C_6$-$C_{10}$ arylene, and/or each substituted or unsubstituted heteroarylene is a substituted or unsubstituted 5 to 9 membered heteroarylene. In some embodiments, the compound is a chemical species set forth herein.

The terms "a" or "an," as used in herein means one or more. In addition, the phrase "substituted with a[n]," as used herein, means the specified group may be substituted with one or more of any or all of the named substituents. For example, where a group, such as an alkyl or heteroaryl group, is "substituted with an unsubstituted $C_1$-$C_{20}$ alkyl, or unsubstituted 2 to 20 membered heteroalkyl," the group may contain one or more unsubstituted $C_1$-$C_{20}$ alkyls, and/or one or more unsubstituted 2 to 20 membered heteroalkyls. Moreover, where a moiety is substituted with an R substituent, the group may be referred to as "R-substituted." Where a moiety is R-substituted, the moiety is substituted with at least one R substituent and each R substituent is optionally different.

Descriptions of compounds of the present invention are limited by principles of chemical bonding known to those skilled in the art. Accordingly, where a group may be substituted by one or more of a number of substituents, such substitutions are selected so as to comply with principles of chemical bonding and to give compounds which are not inherently unstable and/or would be known to one of ordinary skill in the art as likely to be unstable under ambient conditions, such as aqueous, neutral, and several known physiological conditions. For example, a heterocycloalkyl or heteroaryl is attached to the remainder of the molecule via a ring heteroatom in compliance with principles of chemical bonding known to those skilled in the art thereby avoiding inherently unstable compounds.

Unless defined otherwise, technical and scientific terms used herein have the same meaning as commonly understood by a person of ordinary skill in the art. See, e.g., Singleton et al., DICTIONARY OF MICROBIOLOGY AND MOLECULAR BIOLOGY 2nd ed., J. Wiley & Sons (New York, NY 1994); Sambrook et al., MOLECULAR CLONING, A LABORATORY MANUAL, Cold Springs Harbor Press (Cold Springs Harbor, NY 1989). Any methods, devices and materials similar or equivalent to those described herein can be used in the practice of this invention. The following definitions are provided to facilitate understanding of certain terms used frequently herein and are not meant to limit the scope of the present disclosure.

"Nucleic acid" refers to deoxyribonucleotides or ribonucleotides and polymers thereof in either single-, double- or multiple-stranded form, or complements thereof. The term "polynucleotide" refers to a linear sequence of nucleotides. The term "nucleotide" typically refers to a single unit of a polynucleotide, i.e., a monomer. Nucleotides can be ribonucleotides, deoxyribonucleotides, or modified versions thereof. Examples of polynucleotides contemplated herein include single and double stranded DNA, single and double stranded RNA (including siRNA and mRNA), and hybrid molecules having mixtures of single and double stranded DNA and RNA. Nucleic acids can be linear or branched. For example, nucleic acids can be a linear chain of nucleotides or the nucleic acids can be branched, e.g., such that the nucleic acids comprise one or more arms or branches of nucleotides. Optionally, the branched nucleic acids are repetitively branched to form higher ordered structures such as dendrimers and the like.

Nucleic acids, including nucleic acids with a phosphothioate backbone can include one or more reactive moieties. As used herein, the term reactive moiety includes any group capable of reacting with another molecule, e.g., a nucleic acid or polypeptide through covalent, non-covalent or other interactions. By way of example, the nucleic acid can include an amino acid reactive moiety that reacts with an amino acid on a protein or polypeptide through a covalent, non-covalent or other interaction.

The terms also encompass nucleic acids containing known nucleotide analogs or modified backbone residues or linkages, which are synthetic, naturally occurring, and non-naturally occurring, which have similar binding properties as the reference nucleic acid, and which are metabolized in a manner similar to the reference nucleotides. Examples of such analogs include, without limitation, phosphodiester derivatives including, e.g., phosphoramidate, phosphorodiamidate, phosphorothioate (also known as phosphothioate), phosphorodithioate, phosphonocarboxylic acids, phosphonocarboxylates, phosphonoacetic acid, phosphonoformic acid, methyl phosphonate, boron phosphonate, or O-methylphosphoroamidite linkages (see Eckstein, Oligonucleotides and Analogues: A Practical Approach, Oxford University Press); and peptide nucleic acid backbones and linkages. Other analog nucleic acids include those with positive backbones; non-ionic backbones, modified sugars, and non-ribose backbones (e.g. phosphorodiamidate morpholino oligos or locked nucleic acids (LNA)), including those described in U.S. Pat. Nos. 5,235,033 and 5,034,506, and Chapters 6 and 7, ASC Symposium Series 580, *Carbohydrate Modifications in Antisense Research*, Sanghui & Cook, eds. Nucleic acids containing one or more carbocyclic sugars are also included within one definition of nucleic acids. Modifications of the ribose-phosphate backbone may be done for a variety of reasons, e.g., to increase the stability and half-life of such molecules in physiological environments or as probes on a biochip. Mixtures of naturally occurring nucleic acids and analogs can be made; alternatively, mixtures of different nucleic acid analogs, and mixtures of naturally occurring nucleic acids and analogs may be made. In embodiments, the internucleotide linkages in DNA are phosphodiester, phosphodiester derivatives, or a combination of both.

As used herein, the term "about" means a range of values including the specified value, which a person of ordinary skill in the art would consider reasonably similar to the specified value. In embodiments, the term "about" means within a standard deviation using measurements generally acceptable in the art. In embodiments, about means a range extending to +/−10% of the specified value. In embodiments, about means the specified value.

The terms "polypeptide," "peptide" and "protein" are used interchangeably herein to refer to a polymer of amino acid residues, wherein the polymer may be conjugated to a moiety that does not consist of amino acids. The terms apply to amino acid polymers in which one or more amino acid residue is an artificial chemical mimetic of a corresponding naturally occurring amino acid, as well as to naturally occurring amino acid polymers and non-naturally occurring amino acid polymers. The terms apply to macrocyclic peptides, peptides that have been modified with non-peptide functionality, peptidomimetics, polyamides, and macrolactams. A "fusion protein" refers to a chimeric protein encoding two or more separate protein sequences that are recombinantly expressed as a single moiety.

The term "peptidyl" and "peptidyl moiety" means a monovalent peptide.

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, and O-phosphoserine. Amino acid analogs refers to compounds that have the same basic chemical structure as a naturally occurring amino acid, i.e., an α carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. Amino acid mimetics refers to chemical compounds that have a structure that is different from the general chemical structure of an amino acid, but that functions in a manner similar to a naturally occurring amino acid. The terms "non-naturally occurring amino acid" and "unnatural amino acid" refer to amino acid analogs, synthetic amino acids, and amino acid mimetics which are not found in nature.

Amino acids may be referred to herein by either their commonly known three letter symbols or by the one-letter symbols recommended by the IUPAC-IUB Biochemical Nomenclature Commission. Nucleotides, likewise, may be referred to by their commonly accepted single-letter codes.

An amino acid or nucleotide base "position" is denoted by a number that sequentially identifies each amino acid (or nucleotide base) in the reference sequence based on its position relative to the N-terminus (or 5'-end). Due to deletions, insertions, truncations, fusions, and the like that must be taken into account when determining an optimal alignment, in general the amino acid residue number in a test sequence determined by simply counting from the N-terminus will not necessarily be the same as the number of its corresponding position in the reference sequence. For example, in a case where a variant has a deletion relative to an aligned reference sequence, there will be no amino acid in the variant that corresponds to a position in the reference sequence at the site of deletion. Where there is an insertion in an aligned reference sequence, that insertion will not correspond to a numbered amino acid position in the reference sequence. In the case of truncations or fusions there can be stretches of amino acids in either the reference or aligned sequence that do not correspond to any amino acid in the corresponding sequence.

The terms "numbered with reference to" or "corresponding to," when used in the context of the numbering of a given amino acid or polynucleotide sequence, refers to the numbering of the residues of a specified reference sequence when the given amino acid or polynucleotide sequence is compared to the reference sequence.

"Conservatively modified variants" applies to both amino acid and nucleic acid sequences. With respect to particular nucleic acid sequences, conservatively modified variants refers to those nucleic acids which encode identical or essentially identical amino acid sequences, or where the nucleic acid does not encode an amino acid sequence, to essentially identical sequences. Because of the degeneracy of the genetic code, a large number of functionally identical nucleic acids encode any given protein. For instance, the codons GCA, GCC, GCG and GCU all encode the amino acid alanine. Thus, at every position where an alanine is specified by a codon, the codon can be altered to any of the corresponding codons described without altering the encoded polypeptide. Such nucleic acid variations are "silent variations," which are one species of conservatively modified variations. Every nucleic acid sequence herein which encodes a polypeptide also describes every possible silent variation of the nucleic acid. One of skill will recognize that each codon in a nucleic acid (except AUG, which is ordinarily the only codon for methionine, and TGG, which is ordinarily the only codon for tryptophan) can be modified to yield a functionally identical molecule. Accordingly, each silent variation of a nucleic acid which encodes a polypeptide is implicit in each described sequence with respect to the expression product, but not with respect to actual probe sequences.

As to amino acid sequences, one of skill will recognize that individual substitutions, deletions or additions to a nucleic acid, peptide, polypeptide, or protein sequence which alters, adds or deletes a single amino acid or a small percentage of amino acids in the encoded sequence is a "conservatively modified variant" where the alteration results in the substitution of an amino acid with a chemically similar amino acid. Conservative substitution tables providing functionally similar amino acids are well known in the art. Such conservatively modified variants are in addition to and do not exclude polymorphic variants, interspecies homologs, and alleles of the invention.

The following eight groups each contain amino acids that are conservative substitutions for one another: 1) Alanine (A), Glycine (G); 2) Aspartic acid (D), Glutamic acid (E); 3) Asparagine (N), Glutamine (Q); 4) Arginine (R), Lysine (K); 5) Isoleucine (I), Leucine (L), Methionine (M), Valine (V); 6) Phenylalanine (F), Tyrosine (Y), Tryptophan (W); 7) Serine (S), Threonine (T); and 8) Cysteine (C), Methionine (M).

"Percentage of sequence identity" is determined by comparing two optimally aligned sequences over a comparison window, wherein the portion of the polynucleotide or polypeptide sequence in the comparison window may comprise additions or deletions (i.e., gaps) as compared to the reference sequence (which does not comprise additions or deletions) for optimal alignment of the two sequences. The percentage is calculated by determining the number of positions at which the identical nucleic acid base or amino acid residue occurs in both sequences to yield the number of matched positions, dividing the number of matched positions by the total number of positions in the window of comparison and multiplying the result by 100 to yield the percentage of sequence identity.

The terms "identical" or percent "identity," in the context of two or more nucleic acids or polypeptide sequences, refer to two or more sequences or subsequences that are the same or have a specified percentage of amino acid residues or nucleotides that are the same (i.e., 60% identity, optionally 65%, 70%, 75%, 80%, 85%, 90%, 95%, 98%, or 99% identity over a specified region, e.g., of the entire polypeptide sequences of the invention or individual domains of the polypeptides of the invention), when compared and aligned for maximum correspondence over a comparison window, or designated region as measured using one of the following sequence comparison algorithms or by manual alignment and visual inspection. Such sequences are then said to be "substantially identical." This definition also refers to the complement of a test sequence. Optionally, the identity exists over a region that is at least about 50 nucleotides in length, or more preferably over a region that is 100 to 500 or 1000 or more nucleotides in length.

For sequence comparison, typically one sequence acts as a reference sequence, to which test sequences are compared. When using a sequence comparison algorithm, test and reference sequences are entered into a computer, subsequence coordinates are designated, if necessary, and sequence algorithm program parameters are designated. Default program parameters can be used, or alternative parameters can be designated. The sequence comparison algorithm then calculates the percent sequence identities for the test sequences relative to the reference sequence, based on the program parameters.

A "comparison window", as used herein, includes reference to a segment of any one of the number of contiguous positions selected from the group consisting of, e.g., a full length sequence or from 20 to 600, about 50 to about 200, or about 100 to about 150 amino acids or nucleotides in which a sequence may be compared to a reference sequence of the same number of contiguous positions after the two sequences are optimally aligned. Methods of alignment of sequences for comparison are well known in the art. Optimal alignment of sequences for comparison can be conducted, e.g., by the local homology algorithm of Smith and Waterman (1970) *Adv. Appl. Math.* 2:482c, by the homology alignment algorithm of Needleman and Wunsch (1970) *J. Mol. Biol.* 48:443, by the search for similarity method of Pearson and Lipman (1988) *Proc. Nat'l. Acad. Sci. USA* 85:2444, by computerized implementations of these algorithms (GAP, BESTFIT, FASTA, and TFASTA in the Wisconsin Genetics Software Package, Genetics Computer Group, 575 Science Dr., Madison, WI), or by manual alignment and visual inspection (see, e.g., Ausubel et al., *Current Protocols in Molecular Biology* (1995 supplement)).

An example of an algorithm that is suitable for determining percent sequence identity and sequence similarity are the BLAST and BLAST 2.0 algorithms, which are described in Altschul et al. (1977) *Nuc. Acids Res.* 25:3389-3402, and Altschul et al. (1990) *J. Mol. Biol.* 215:403-410, respectively. Software for performing BLAST analyses is publicly available through the National Center for Biotechnology Information (http://www.ncbi.nlm.nih.gov/). This algorithm involves first identifying high scoring sequence pairs (HSPs) by identifying short words of length W in the query sequence, which either match or satisfy some positive-valued threshold score T when aligned with a word of the same length in a database sequence. T is referred to as the neighborhood word score threshold (Altschul et al., supra). These initial neighborhood word hits act as seeds for initiating searches to find longer HSPs containing them. The word hits are extended in both directions along each sequence for as far as the cumulative alignment score can be increased. Cumulative scores are calculated using, for nucleotide sequences, the parameters M (reward score for a pair of matching residues; always >0) and N (penalty score for mismatching residues; always <0). For amino acid sequences, a scoring matrix is used to calculate the cumulative score. Extension of the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T, and X determine the sensitivity and speed of the alignment. The BLASTN program (for nucleotide sequences) uses as defaults a wordlength (W) of 11, an expectation (E) or 10, M=5, N=−4 and a comparison of both strands. For amino acid sequences, the BLASTP program uses as defaults a wordlength of 3, and expectation (E) of 10, and the BLOSUM62 scoring matrix (see Henikoff and Henikoff (1989) *Proc. Natl. Acad. Sci. USA* 89:10915) alignments (B) of 50, expectation (E) of 10, M=5, N=−4, and a comparison of both strands.

The BLAST algorithm also performs a statistical analysis of the similarity between two sequences (see, e.g., Karlin and Altschul (1993) *Proc. Natl. Acad. Sci. USA* 90:5873-5787). One measure of similarity provided by the BLAST algorithm is the smallest sum probability (P(N)), which provides an indication of the probability by which a match between two nucleotide or amino acid sequences would occur by chance. For example, a nucleic acid is considered similar to a reference sequence if the smallest sum probability in a comparison of the test nucleic acid to the reference nucleic acid is less than about 0.2, more preferably less than about 0.01, and most preferably less than about 0.001.

An indication that two nucleic acid sequences or polypeptides are substantially identical is that the polypeptide encoded by the first nucleic acid is immunologically cross-reactive with the antibodies raised against the polypeptide encoded by the second nucleic acid, as described below. Thus, a polypeptide is typically substantially identical to a second polypeptide, for example, where the two peptides differ only by conservative substitutions. Another indication that two nucleic acid sequences are substantially identical is that the two molecules or their complements hybridize to each other under stringent conditions, as described below. Yet another indication that two nucleic acid sequences are substantially identical is that the same primers can be used to amplify the sequence.

"Contacting" is used in accordance with its plain ordinary meaning and refers to the process of allowing at least two distinct species (e.g. chemical compounds including biomolecules or cells) to become sufficiently proximal to react, interact or physically touch. It should be appreciated, however, that the resulting reaction product can be produced directly from a reaction between the added reagents or from an intermediate from one or more of the added reagents which can be produced in the reaction mixture. In embodiments contacting includes, for example, allowing a ribonucleic acid as described herein to interact with a an endonuclease and an enhancer element.

A "control" sample or value refers to a sample that serves as a reference, usually a known reference, for comparison to a test sample. For example, a test sample can be taken from a test condition, e.g., in the presence of a test compound, and compared to samples from known conditions, e.g., in the absence of the test compound (negative control), or in the presence of a known compound (positive control). A control can also represent an average value gathered from a number of tests or results. One of skill in the art will recognize that controls can be designed for assessment of any number of parameters. For example, a control can be devised to compare therapeutic benefit based on pharmacological data (e.g., half-life) or therapeutic measures (e.g., comparison of side effects). One of skill in the art will understand which standard controls are most appropriate in a given situation and be able to analyze data based on comparisons to standard control values. Standard controls are also valuable for determining the significance (e.g. statistical significance) of data. For example, if values for a given parameter are widely variant in standard controls, variation in test samples will not be considered as significant.

A "label" or a "detectable moiety" is a composition detectable by spectroscopic, photochemical, biochemical, immunochemical, chemical, or other physical means. For example, useful labels include $^{32}P$, fluorescent dyes, electron-dense reagents, enzymes (e.g., as commonly used in an ELISA), biotin, digoxigenin, or haptens and proteins or other entities which can be made detectable, e.g., by incorporating a radiolabel into a peptide or antibody specifically reactive with a target peptide. Any appropriate method known in the art for conjugating an antibody to the label may be employed, e.g., using methods described in Hermanson, Bioconjugate Techniques 1996, Academic Press, Inc., San Diego.

A "labeled protein or polypeptide" is one that is bound, either covalently, through a linker or a chemical bond, or noncovalently, through ionic, van der Waals, electrostatic, or hydrogen bonds to a label such that the presence of the labeled protein or polypeptide may be detected by detecting the presence of the label bound to the labeled protein or polypeptide. Alternatively, methods using high affinity interactions may achieve the same results where one of a pair of binding partners binds to the other, e.g., biotin, streptavidin.

"Biological sample" or "sample" refer to materials obtained from or derived from a subject or patient. A biological sample includes sections of tissues such as biopsy and autopsy samples, and frozen sections taken for histological purposes. Such samples include bodily fluids such as blood and blood fractions or products (e.g., serum, plasma, platelets, red blood cells, and the like), sputum, tissue, cultured cells (e.g., primary cultures, explants, and transformed cells) stool, urine, synovial fluid, joint tissue, synovial tissue, synoviocytes, fibroblast-like synoviocytes, macrophage-like synoviocytes, immune cells, hematopoietic cells, fibroblasts, macrophages, T cells, etc. A biological sample is typically obtained from a eukaryotic organism, such as a mammal such as a primate e.g., chimpanzee or human; cow; dog; cat; a rodent, e.g., guinea pig, rat, mouse; rabbit; or a bird; reptile; or fish.

A "cell" as used herein, refers to a cell carrying out metabolic or other function sufficient to preserve or replicate its genomic DNA. A cell can be identified by well-known methods in the art including, for example, presence of an intact membrane, staining by a particular dye, ability to produce progeny or, in the case of a gamete, ability to combine with a second gamete to produce a viable offspring. Cells may include prokaryotic and eukaryotic cells. Prokaryotic cells include but are not limited to bacteria. Eukaryotic cells include but are not limited to yeast cells and cells derived from plants and animals, for example mammalian, insect (e.g., spodoptera) and human cells.

The word "expression" or "expressed" as used herein in reference to a gene means the transcriptional and/or translational product of that gene. The level of expression of a DNA molecule in a cell may be determined on the basis of either the amount of corresponding mRNA that is present within the cell or the amount of protein encoded by that DNA produced by the cell (Sambrook et al., 1989, Molecular Cloning: A Laboratory Manual, 18.1-18.88).

Expression of a transfected gene can occur transiently or stably in a cell. During "transient expression" the transfected gene is not transferred to the daughter cell during cell division. Since its expression is restricted to the transfected cell, expression of the gene is lost over time. In contrast, stable expression of a transfected gene can occur when the gene is co-transfected with another gene that confers a selection advantage to the transfected cell. Such a selection advantage may be a resistance towards a certain toxin that is presented to the cell.

The term "exogenous" refers to a molecule or substance (e.g., nucleic acid or protein) that originates from outside a given cell or organism. Conversely, the term "endogenous" refers to a molecule or substance that is native to, or originates within, a given cell or organism.

A "cell culture" is an in vitro population of cells residing outside of an organism. The cell culture can be established from primary cells isolated from a cell bank or animal, or secondary cells that are derived from one of these sources and immortalized for long-term in vitro cultures.

Agents of the invention are often administered as pharmaceutical compositions comprising an active therapeutic agent, i.e., and a variety of other pharmaceutically acceptable components. See *Remington's Pharmaceutical Science* (15th ed., Mack Publishing Company, Easton, Pennsylvania, 1980). The preferred form depends on the intended mode of administration and therapeutic application. The compositions can also include, depending on the formulation desired, pharmaceutically-acceptable, non-toxic carriers or diluents, which are defined as vehicles commonly used to formulate pharmaceutical compositions for animal or human administration. The diluent is selected so as not to affect the biological activity of the combination. Examples of such diluents are distilled water, physiological phosphate-buffered saline, Ringer's solutions, dextrose solution, and Hank's solution. In addition, the pharmaceutical composition or formulation may also include other carriers, adjuvants, or nontoxic, nontherapeutic, nonimmunogenic stabilizers and the like.

The compositions can be administered for therapeutic or prophylactic treatments. In therapeutic applications, compositions are administered to a patient suffering from a disease (e.g., pulmonary disease) in a "therapeutically effective dose." Amounts effective for this use will depend upon the severity of the disease and the general state of the patient's health. Single or multiple administrations of the compositions may be administered depending on the dosage and frequency as required and tolerated by the patient. A "patient" or "subject" for the purposes of the present invention includes both humans and other animals, particularly mammals. Thus the methods are applicable to both human therapy, veterinary applications, and in research use settings, for example in experimental animal models including rodent, canine, and primate animal models. In certain embodiments the subject or patient is a mammal, preferably a primate, and in the most preferred embodiment the patient is human. In other embodiments the subject or patient is a mammal, preferably a rodent, and in the most preferred embodiments a mouse or rat.

Pharmaceutical compositions can also include large, slowly metabolized macromolecules such as proteins, polysaccharides such as chitosan, polylactic acids, polyglycolic acids and copolymers (such as latex functionalized Sepharose™, agarose, cellulose, and the like), polymeric amino acids, amino acid copolymers, and lipid aggregates (such as oil droplets or liposomes). Additionally, these carriers can function as immunostimulating agents (i.e., adjuvants).

The compositions provided herein, alone or in combination with other suitable components, can be made into aerosol formulations (i.e., they can be "nebulized") to be administered via inhalation. Aerosol formulations can be placed into pressurized acceptable propellants, such as dichlorodifluoromethane, propane, nitrogen, and the like.

Formulations suitable for parenteral administration, such as, for example, by intraarticular (in the joints), intravenous, intramuscular, intratumoral, intradermal, intraperitoneal, and subcutaneous routes, include aqueous and non-aqueous, isotonic sterile injection solutions, which can contain antioxidants, buffers, bacteriostats, and solutes that render the formulation isotonic with the blood of the intended recipient, and aqueous and non-aqueous sterile suspensions that can include suspending agents, solubilizers, thickening agents, stabilizers, and preservatives. In the practice of this invention, compositions can be administered, for example, by intravenous infusion, intraperitoneally, intravesically or intrathecally. Parenteral administration, and intravenous administration are the preferred methods of administration. The formulations of compounds can be presented in unit-dose or multi-dose sealed containers, such as ampules and vials.

Injection solutions and suspensions can be prepared from sterile powders, granules, and tablets of the kind previously described.

The pharmaceutical preparation is preferably in unit dosage form. In such form the preparation is subdivided into unit doses containing appropriate quantities of the active component. The unit dosage form can be a packaged preparation, the package containing discrete quantities of preparation, such as powders in vials or ampoules. The composition can, if desired, also contain other compatible therapeutic agents.

The combined administrations contemplates co-administration, using separate formulations or a single pharmaceutical formulation, and consecutive administration in either order, wherein preferably there is a time period while both (or all) active agents simultaneously exert their biological activities.

Effective doses of the compositions provided herein vary depending upon many different factors, including means of administration, target site, physiological state of the patient, whether the patient is human or an animal, other medications administered, and whether treatment is prophylactic or therapeutic. However, a person of ordinary skill in the art would immediately recognize appropriate and/or equivalent doses looking at dosages of approved compositions for treating and preventing lung/pulmonary disorders for guidance.

The terms "disease" or "condition" refer to a state of being or health status of a patient or subject capable of being treated with a compound, pharmaceutical composition, or method provided herein. In embodiments, the disease is a pulmonary disease (e.g. lung cancer, asthma, chronic obstructive pulmonary disease (COPD), cystic fibrosis).

The term "associated" or "associated with" in the context of a substance or substance activity or function associated with a disease (e.g., lung disease, lung cancer, asthma, chronic obstructive pulmonary disease (COPD), cystic fibrosis) is caused by (in whole or in part), or a symptom of the disease is caused by (in whole or in part) the substance or substance activity or function.

The terms "transfection", "transduction", "transfecting" or "transducing" can be used interchangeably and are defined as a process of introducing a nucleic acid molecule and/or a protein and/or a ribonucleoprotein to a cell in culture or in a tissue in vivo. The nucleic acid molecule can be a sequence encoding complete proteins, ribonucleoproteins or functional portions thereof. Typically, a nucleic acid encoding proteins, ribonucleoproteins or functional portions thereof comprises the elements necessary for expression of the protein or functional portion thereof (e.g., a promoter, transcription start site, etc.). Non-viral methods of transfection include any appropriate method that does not use viral DNA or viral particles as a delivery system to introduce the nucleic acid molecule into the cell. Exemplary non-viral transfection methods include liposomal transfection. The terms "transfection" or "transduction" also refer to introducing nucleic acids and/or proteins into a cell from the external environment. Through transfection, the nucleic acid molecule and/or a protein and/or a ribonucleoprotein is delivered into the interior of the cell or the cells constituting the tissue. Transfection of a nucleic acid molecule and/or a protein and/or a ribonucleoprotein into a cell or tissue may be performed with the purpose of modifying the biological function of the cell. Alternatively, transfection of a nucleic acid molecule and/or a protein and/or a ribonucleoprotein may be performed with the purpose of delivering a detectable label to a cell or tissue to facilitate identification of a cell or tissue. For example, nucleic acids (e.g., DNA, RNA, mRNA, siRNA, miRNA, guide RNA) and/or ribonucleoproteins (e.g., CAS 9) can be introduced into a cell or tissue via lipid-mediated delivery (e.g., liposomal transfection). The nucleic acid molecule may alternatively be an mRNA, a siRNA, a miRNA or a guide RNA. In some instances, the nucleic acid molecule may be bound to a ribonucleoprotein (e.g., Cas9 bound to a guide RNA).

For specific proteins described herein, the named protein includes any of the protein's naturally occurring forms, or variants or homologs that maintain the protein transcription factor activity (e.g., within at least 50%, 80%, 90%, 95%, 96%, 97%, 98%, 99% or 100% activity compared to the native protein). In some embodiments, variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring form. In other embodiments, the protein is the protein as identified by its NCBI sequence reference. In other embodiments, the protein is the protein as identified by its NCBI sequence reference or functional fragment or homolog thereof.

Thus, a "CRISPR associated protein 9," "Cas9" or "Cas9 protein" as referred to herein includes any of the recombinant or naturally-occurring forms of the Cas9 endonuclease or variants or homologs thereof that maintain Cas9 endonuclease enzyme activity (e.g. within at least 50%, 80%, 90%, 95%, 96%, 97%, 98%, 99% or 100% activity compared to Cas9). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring Cas9 protein. In embodiments, the Cas9 protein is substantially identical to the protein identified by the UniProt reference number Q99ZW2 or a variant or homolog having substantial identity thereto. Cas9 refers to the protein also known in the art as "nickase". In embodiments, Cas9 binds a CRISPR (clustered regularly interspaced short palindromic repeats) nucleic acid sequence. In embodiments, the CRISPR nucleic acid sequence is a prokaryotic nucleic acid sequence.

As used herein, the term "lipid" refers to lipid molecules that can include fats, waxes, steroids, cholesterol, fat-soluble vitamins, monoglycerides, diglycerides, phospholipids, sphingolipids, glycolipids, cationic or anionic lipids, derivatized lipids, and the like, as described in detail below.

Suitable phospholipids include but are not limited to phosphatidylcholine (PC), phosphatidic acid (PA), phosphatidylethanolamine (PE), phosphatidylglycerol (PG), phosphatidylserine (PS), and phosphatidylinositol (PI), dimyristoyl phosphatidyl choline (DMPC), distearoyl phosphatidyl choline (DSPC), dioleoyl phosphatidyl choline (DOPC), dipalmitoyl phosphatidyl choline (DPPC), dimyristoyl phosphatidyl glycerol (DMPG), distearoyl phosphatidyl glycerol (DSPG), dioleoyl phosphatidyl glycerol (DOPG), dipalmitoyl phosphatidyl glycerol (DPPG), dimyristoyl phosphatidyl serine (DMPS), distearoyl phosphatidyl serine (DSPS), dioleoyl phosphatidyl serine (DOPS), dipalmitoyl phosphatidyl serine (DPPS), dioleoyl phosphatidyl ethanolamine (DOPE), palmitoyloleoylphosphatidylcholine (POPC), palmitoyloleoyl-phosphatidylethanolamine (POPE) and dioleoyl-phosphatidylethanolamine 4-(N-maleimidomethyl)-cyclohexane-1-carboxylate (DOPE-mal), dipalmitoyl phosphatidyl ethanolamine (DPPE), dimyristoyl-phosphoethanolamine (DMPE), distearoyl-phosphatidyl-ethanolamine (DSPE), 16-O-monomethyl PE, 16-O-dimethyl PE, 18-1-trans PE, 1-stearoyl-2-oleoyl-phosphatidy-ethanolamine (SOPE), 1,2-dielaidoyl-sn-glycero-3-phophoethanolamine (transDOPE), and cardiolipin. In some embodiments, the phospholipid is DOPE. In other embodiments, the phospholipid is DSPC. Lipid extracts, such as egg PC, heart extract, brain extract, liver extract, and soy PC, are also useful in the present invention. In some embodiments, soy PC can include Hydro Soy PC (HSPC). In certain embodiments, the lipids can include derivatized lipids, such as PEGylated lipids. Derivatized lipids can include, for example, DSPE-PEG2000, cholesterol-PEG2000, DSPE-polyglycerol, or other derivatives generally known in the art.

A "cationic lipid" as provided herein refers, in the usual and customary sense, to a net positively charged lipid which can facilitate the formation of lipid aggregates. Cationic lipids contain positively charged functional groups under physiological conditions. Cationic lipids include, but are not limited to, N,N-dioleyl-N,N-dimethylammonium chloride (DODAC), N,N-distearyl-N,N-dimethylammonium bromide (DDAB), N-(1-(2,3-dioleoyloxy)propyl)-N,N,N-trimethylammonium chloride (DOTAP), N-(1-(2,3-dioleyloxy)propyl)-N,N,N-trimethylammonium chloride (DOTMA), N-[1-(2,3,-ditetradecyloxy)propyl]-N,N-dimethyl-N-hydroxyethylammonium bromide (DMRIE), N-[1-(2,3,dioleyloxy)propyl]-N,N-dimethyl-N-hydroxy ethylammonium bromide (DORIE), 30-[N-(N',N'-dimethylaminoethane) carbamoyl]cholesterol (DC-Chol), dimethyldioctadecylammonium (DDAB) and N,N-dimethyl-2,3-dioleyloxy)propylamine (DODMA). In embodiments, the cationic lipid (e.g., first cationic lipid, second cationic lipid) is a compound of formula (I) or (II). In embodiments, the first cationic lipid is dihydroxy dimyristyl spermine (DHDMS). In embodiments, the second cationic lipid is hydroxy dimyristyl spermidine (HDMS).

Lipids can form micelles, monolayers, and bilayer membranes. The lipids can self-assemble into liposomes or lipid aggregates.

The term "lipid aggregate" refers to a lipid structure including a plurality of lipids or type of lipids, forming a higher order structure (e.g., secondary, tertiary or quaternary structure). Non-limiting examples of lipid aggregates include liposomes, unilamellar vesicles, multilamellar vesicles, micelles, amorphous aggregates, and the like. The lipid aggregates of the present invention can contain any suitable lipid, including cationic lipids, zwitterionic lipids, neutral lipids, or anionic lipids. In embodiments, the lipid aggregate includes a cationic lipid or a cationic lipid type. In embodiments, the lipid aggregate includes a cationic lipid or a cationic lipid type in combination with a non-cationic (e.g., neutral) lipid or a non-cationic lipid type. In embodiments, the lipid aggregate has a net positive charge. In embodiments, the lipid aggregate includes a cationic lipid and a neutral lipid. In embodiments, the cationic lipid is a cationic lipid as described in U.S. Pat. No. 8,785,200 which is hereby incorporated by reference and for all purposes.

In embodiments, the lipid aggregate includes a single lipid. In embodiments, the lipid aggregate includes a plurality of different lipids (e.g., first cationic lipid, second cationic lipid, helper lipid). Where the lipid aggregate includes a plurality of different lipids the lipid aggregate may include a lipid blend. A "lipid blend" as provided herein is a mixture of a plurality of lipid types. In embodiments, the lipid blend includes a first lipid type, a second lipid type or a third lipid type. The first, second and third lipid type may be independently different (e.g., cationic lipid and non-cationic lipid). Therefore, a person having ordinary skill in the art will immediately recognize that the terms "lipid" and "lipid type(s)" have the same meaning and can be used interchangeably.

In embodiments, the lipid aggregate provided herein is a liposome. As used herein, the term "liposome" encompasses any compartment enclosed by a lipid bilayer. The term liposome includes unilamellar vesicles which are comprised of a single lipid bilayer and generally have a diameter in the range of about 20 to about 400 nm. Liposomes can also be multilamellar having a diameter in the range of approximately 1 µm to approximately 10 µm. Multilamellar liposomes may consist of several (anywhere from two to hundreds) unilamellar vesicles forming one inside the other in diminishing size, creating a multilamellar structure of concentric phospholipid spheres separated by layers of water. Alternatively, multilamellar liposomes may consist of many smaller non concentric spheres of lipid inside a large liposome. In embodiments, liposomes include multilamellar vesicles (MLV), large unilamellar vesicles (LUV), and small unilamellar vesicles (SUV). The liposomes of the present invention can contain any suitable lipid, including cationic lipids, zwitterionic lipids, neutral lipids, or anionic lipids.

Compositions

Provided herein are, inter alia, compositions and methods useful for the in vivo delivery of bioactive agents (e.g., therapeutic, biologically active, or diagnostic agents). The compositions and methods provided herein including embodiments thereof may be, inter alia, used for the delivery of bioactive agents (e.g., nucleic acid molecules, ribonucleoproteins, small molecules or combinations thereof) to the lung (e.g., including but not limited to endothelial lung cells, epithelial lung cells) of a subject. The compositions provided herein include cationic lipids, helper lipids and a biostability enhancing agent, which together form a lipid aggregate with the bioactive agent and allow for the systemic delivery of the bioactive agent to, for example, lung tissue without the requirement for biomolecular targeting.

In an aspect is provided a composition including: (i) a first cationic lipid at a compositional molar ratio from about 0.18 to about 0.32 and of formula:

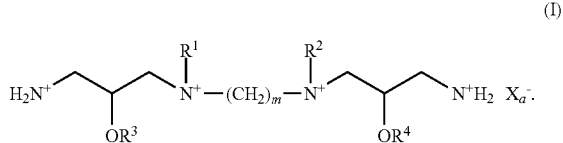

(I)

In formula (I) $R^1$ and $R^2$ are independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl. $R^3$ and $R^4$ are independently hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl. m is an integer from 1 to 6. $X_a^-$ is an anion. (ii) A second cationic lipid at a compositional molar ratio from about 0.24 to about 0.51 and of formula:

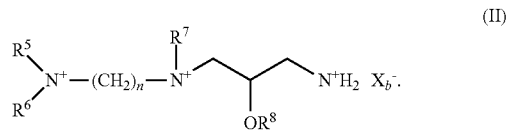

(II)

In formula (II) $R^5$ and $R^8$ are independently hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl. $R^6$ and $R^7$ are independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl. n is an integer from 1 to 6. $X_b^-$ is an anion. (iii) A first helper lipid at a compositional molar ratio from about 0.20 to about 0.32. (iv) A second helper lipid at a compositional molar ratio from about 0.01 to about 0.14; and (v) a biostability enhancing agent at a compositional molar ratio from about 0.01 to about 0.02.

In embodiments, $R^1$ and $R^2$ are independently substituted or unsubstituted alkyl. In embodiments, $R^1$ and $R^2$ are independently unsubstituted alkyl. $R^1$ and $R^2$ are independently unsubstituted $C_1$-$C_{20}$ alkyl. In embodiments, $R^1$ and $R^2$ are independently unsubstituted $C_5$-$C_{20}$ alkyl. In embodiments, $R^1$ and $R^2$ are independently unsubstituted $C_{10}$-$C_{20}$ alkyl. In embodiments, $R^1$ and $R^2$ are independently unsubstituted $C_{12}$-$C_{18}$ alkyl. In embodiments, $R^1$ and $R^2$ are independently unsubstituted $C_{14}$-$C_{16}$ alkyl. In embodiments, $R^1$ is unsubstituted $C_{14}$ alkyl. In embodiments, $R^2$ is unsubstituted $C_{14}$ alkyl. In embodiments, $R^1$ is unsubstituted $C_{15}$ alkyl. In embodiments, $R^2$ is unsubstituted $C_{15}$ alkyl. In embodiments, $R^1$ is unsubstituted $C_{16}$ alkyl. In embodiments, $R^2$ is unsubstituted $C_{16}$ alkyl. In embodiments, $R^1$ is —$(CH_2)_{13}CH_3$. In embodiments, $R^2$ is —$(CH_2)_{13}CH_3$.

In embodiments, $R^3$ and $R^4$ are independently hydrogen or substituted or unsubstituted alkyl. In embodiments, $R^3$ and $R^4$ are independently hydrogen.

In embodiments, $R^5$, $R^6$ and $R^7$ are independently hydrogen, substituted or unsubstituted alkyl. In embodiments, $R^5$, $R^6$ and $R^7$ are independently hydrogen or unsubstituted alkyl. In embodiments, $R^5$, $R^6$ and $R^7$ are independently hydrogen or unsubstituted $C_1$-$C_{20}$ alkyl. In embodiments, $R^5$, $R^6$ and $R^7$ are independently hydrogen or unsubstituted $C_5$-$C_{20}$ alkyl. In embodiments, $R^5$, $R^6$ and $R^7$ are independently hydrogen or unsubstituted $C_{10}$-$C_{20}$ alkyl. In embodiments, $R^5$, $R^6$ and $R^7$ are independently hydrogen or unsubstituted $C_{12}$-$C_{18}$ alkyl. In embodiments, $R^5$, $R^6$ and $R^7$ are independently hydrogen or unsubstituted $C_{14}$-$C_{16}$ alkyl. In embodiments, $R^5$, $R^6$ and $R^7$ are independently hydrogen or unsubstituted $C_{14}$ alkyl. In embodiments, $R^5$, $R^6$ and $R^7$ are independently hydrogen or unsubstituted $C_{15}$ alkyl. In embodiments, $R^5$, $R^6$ and $R^7$ are independently hydrogen or unsubstituted $C_{16}$ alkyl. In embodiments, $R^5$ is unsubstituted $C_{14}$ alkyl. In embodiments, $R^7$ is unsubstituted $C_{14}$ alkyl. In embodiments, $R^5$ is —$(CH_2)_{13}CH_3$. In embodiments, $R^6$ is hydrogen. In embodiments, $R^7$ is —$(CH_2)_{13}CH_3$.

In embodiments, $R^8$ is hydrogen or substituted or unsubstituted alkyl. In embodiments, $R^8$ is hydrogen.

In embodiments, m is an integer from about 1 to 6. In embodiments, m is an integer from about 1 to 5. In embodiments, m is an integer from about 1 to 4. In embodiments, m is an integer from about 1 to 3. In embodiments, m is an integer from 1 to 6. In embodiments, m is an integer from 1 to 5. In embodiments, m is an integer from 1 to 4. In embodiments, m is an integer from 1 to 3. In embodiments, m is 1. In embodiments, m is 2. In embodiments, m is 3. In embodiments, m is 4. In embodiments, m is 5. In embodiments, m is 6.

In embodiments, n is an integer from about 1 to 6. In embodiments, n is an integer from about 1 to 5. In embodiments, n is an integer from about 1 to 4. In embodiments, n is an integer from about 1 to 3. In embodiments, n is an integer from 1 to 6. In embodiments, n is an integer from 1 to 5. In embodiments, n is an integer from 1 to 4. In embodiments, n is an integer from 1 to 3. In embodiments, n is 1. In embodiments, n is 2. In embodiments, n is 3. In embodiments, n is 4. In embodiments, n is 5. In embodiments, n is 6.

In one embodiment, $R^1$ is —$(CH_2)_{13}CH_3$, $R^2$ is —$(CH_2)_{13}CH_3$, $R^3$ is hydrogen, $R^4$ is hydrogen, m is 4 and $X_a^-$ is $CH_3COO^-$.

In one embodiment, $R^5$ is —$(CH_2)_{13}CH_3$, $R^6$ is hydrogen, $R^7$ is —$(CH_2)_{13}CH_3$, $R^8$ is hydrogen, n is 4 and $X_b^-$ is $CH_3COO^-$.

The term "compositional molar ratio" of a compound (e.g., cationic lipid, helper lipid, biostability enhancing agent) refers to the ratio of the number of solute moles of an individual compound to the total number of solute moles of all compounds in a solution. For example, the total number of solute moles may be 33.8 and the number of solute moles of an individual compound (e.g., first cationic lipid) may be 8.1 resulting in a compositional ratio for the individual compound of 0.24. In embodiments, the total number of solute moles is 33.8 and the number of solute moles of a single compound is 10.8 moles resulting in a compositional ratio of the single compound of 0.32.

The compositions provided herein include two or more helper lipids (e.g., a first helper lipid, a second helper lipid). A "helper lipid" as provided herein refers to a lipid capable of increasing delivery of the bioactive agent to a cell relative to the absence of the helper lipid. Thus, the delivery efficiency of a bioactive agent to a cell is higher in the presence of a helper lipid relative to the delivery efficiency in the absence of said helper lipid. Delivery of a bioactive agent into a cell includes, for example, uptake of the bioactive agent into a cell (penetration through the cell membrane), endosomal release of the bioactive agent in a cell, enhancing stability of the bioactive agent and/or the compounds forming the lipid aggregate during the process of delivery. Helper lipids useful in this invention include, without limitation: lecithins; phosphotidylethanolamine; phosphatidylethanolamines, such as DOPE (dioleoylphosphatidylethanolamine), DPhPE (diphytanoylphosphatidylethanolamine), DPPE (dipalmitoylphosphatidylethanolamine), dipalmiteoylphosphatidylethanolamine, POPE (palmitoyloleoylphosphatidylethanolamine) and distearoylphosphatidylethanolamine; phosphotidylcholine; phosphatidylcholines, such as DOPC (dioleoylphosphidylcholine), DPPC (dipalmitoylphosphatidylcholine) POPC (palmitoyloleoylphosphatidylcholine) and distearoylphosphatidylcholine; phosphatidylglycerol; phosphatidylglycerols, such as DOPG (dioleoylphosphatidylglycerol), DPPG (dipalmitoylphosphatidyl-glycerol), and distearoylphosphatidylglycerol; phosphatidylserine; phosphatidylserines, such as dioleoyl- or dipalmitoylphosphatidylserine; diphosphatidylglycerols; fatty acid esters; glycerol esters; sphingolipids; cardolipin; cerebrosides; and ceramides; and mixtures thereof. Helper lipids also include cholesterol and other 3OH-sterols.

A "biostability enhancing agent" as provided herein is a compound capable of increasing the physical and chemical stability of the compositions (e.g., lipid aggregates including a bioactive agent) provided herein relative to the absence of the compound. Upon administration to a subject a biostability enhancing agent may increase the biodistribution of the compounds provided herein. In embodiments, the biostability enhancing agent is a polyether compound. In embodiments, the biostability enhancing agent is a PEGylated phospholipid. In embodiments, the biostability enhancing agent is polyethylene glycol.

In embodiments, the first cationic lipid is present at a compositional molar ratio of about 0.18. In embodiments, the first cationic lipid is present at a compositional molar ratio of 0.18. In embodiments, the first cationic lipid is present at a compositional molar ratio of about 0.23. In embodiments, the first cationic lipid is present at a compositional molar ratio of 0.23. In embodiments, the first cationic lipid is present at a compositional molar ratio of about 0.24. In embodiments, the first cationic lipid is present at a compositional molar ratio of 0.24. In embodiments, the first cationic lipid is present at a compositional molar ratio of about 0.25. In embodiments, the first cationic lipid is present at a compositional molar ratio of 0.25. In embodiments, the first cationic lipid is present at a compositional molar ratio of about 0.27. In embodiments, the first cationic lipid is present at a compositional molar ratio of 0.27. In embodiments, the first cationic lipid is present at a compositional molar ratio of about 0.28. In embodiments, the first cationic lipid is present at a compositional molar ratio of 0.28. In embodiments, the first cationic lipid is present at a compositional molar ratio of about 0.32. In embodiments, the first cationic lipid is present at a compositional molar ratio of 0.32.

In embodiments, the first cationic lipid has the formula:

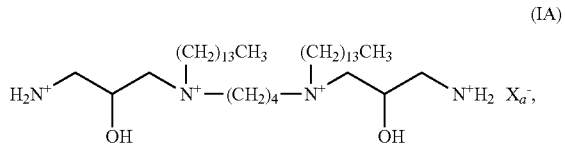

wherein $X_a^-$ is $Cl^-$ or $CH_3COO^-$. In embodiments, $X_a^-$ is $CH_3COO^-$. In embodiments, the first cationic lipid is dihydroxy dimyristyl spermine.

In embodiments, the second cationic lipid is present at a compositional molar ratio of about 0.24. In embodiments, the second cationic lipid is present at a compositional molar ratio of 0.24. In embodiments, the second cationic lipid is present at a compositional molar ratio of about 0.38. In embodiments, the second cationic lipid is present at a compositional molar ratio of 0.38. In embodiments, the second cationic lipid is present at a compositional molar ratio of about 0.39. In embodiments, the second cationic lipid is present at a compositional molar ratio of 0.39. In embodiments, the second cationic lipid is present at a compositional molar ratio of about 0.40. In embodiments, the second cationic lipid is present at a compositional molar ratio of 0.40. In embodiments, the second cationic lipid is present at a compositional molar ratio of about 0.45. In embodiments, the second cationic lipid is present at a compositional molar ratio of 0.45. In embodiments, the second cationic lipid is present at a compositional molar ratio of about 0.47. In embodiments, the second cationic lipid is present at a compositional molar ratio of 0.47. In embodiments, the second cationic lipid is present at a compositional molar ratio of about 0.51. In embodiments, the second cationic lipid is present at a compositional molar ratio of 0.51.

In embodiments, the second cationic lipid has the formula:

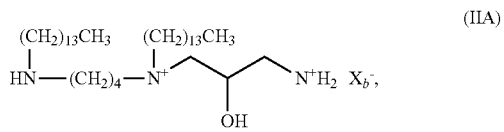

wherein $X_b^-$ is $Cl^-$ or $CH_3COO^-$. In embodiments, $X_b^-$ is $CH_3COO^-$. In embodiments, the second cationic lipid is hydroxy dimyristyl spermidine.

In embodiments, the first helper lipid is present at a compositional molar ratio of about 0.20. In embodiments, the first helper lipid is present at a compositional molar ratio of 0.20. In embodiments, the first helper lipid is present at a compositional molar ratio of about 0.24. In embodiments, the first helper lipid is present at a compositional molar ratio of 0.24. In embodiments, the first helper lipid is present at a compositional molar ratio of about 0.26. In embodiments, the first helper lipid is present at a compositional molar ratio of 0.26. In embodiments, the first helper lipid is present at a compositional molar ratio of about 0.32. In embodiments, the first helper lipid is present at a compositional molar ratio of 0.32. In embodiments, the first helper lipid is dioleoylphosphatidylethanolamine (DOPE).

In embodiments, the second helper lipid is present at a compositional molar ratio of about 0.01. In embodiments, the second helper lipid is present at a compositional molar ratio of 0.01. In embodiments, the second helper lipid is present at a compositional molar ratio of about 0.05. In embodiments, the second helper lipid is present at a compositional molar ratio of 0.05. In embodiments, the second helper lipid is present at a compositional molar ratio of about 0.08. In embodiments, the second helper lipid is present at a compositional molar ratio of 0.08. In embodiments, the second helper lipid is present at a compositional molar ratio of about 0.10. In embodiments, the second helper lipid is present at a compositional molar ratio of 0.10. In embodiments, the second helper lipid is present at a compositional molar ratio of about 0.14. In embodiments, the second helper lipid is present at a compositional molar ratio of 0.14. In embodiments, the second helper lipid is cholesterol.

In embodiments, the biostability enhancing agent is present at a compositional molar ratio of about 0.01. In embodiments, the biostability enhancing agent is present at a compositional molar ratio of 0.01. In embodiments, the biostability enhancing agent is present at a compositional molar ratio of about 0.02. In embodiments, the biostability enhancing agent is present at a compositional molar ratio of 0.02. In embodiments, the biostability enhancing agent is a polyether compound. In embodiments, the biostability enhancing agent is a PEGylated phospholipid. In embodiments, the biostability enhancing agent is polyethylene glycol.

In embodiments, the biostability enhancing agent has a molecular weight from about 750 g/mol to about 5000 g/mol. In embodiments, the biostability enhancing agent has a molecular weight from about 800/mol to about 5000 g/mol. In embodiments, the biostability enhancing agent has a molecular weight from about 850 g/mol to about 5000 g/mol. In embodiments, the biostability enhancing agent has a molecular weight from about 900 g/mol to about 5000 g/mol. In embodiments, the biostability enhancing agent has a molecular weight from about 950 g/mol to about 5000 g/mol. In embodiments, the biostability enhancing agent has a molecular weight from about 1000 g/mol to about 5000 g/mol. In embodiments, the biostability enhancing agent has a molecular weight from about 1500 g/mol to about 5000 g/mol. In embodiments, the biostability enhancing agent has a molecular weight from about 2000 g/mol to about 5000 g/mol. In embodiments, the biostability enhancing agent has a molecular weight from about 2500 g/mol to about 5000 g/mol. In embodiments, the biostability enhancing agent has a molecular weight from about 3000 g/mol to about 5000 g/mol. In embodiments, the biostability enhancing agent has a molecular weight from about 3500 g/mol to about 5000 g/mol. In embodiments, the biostability enhancing agent has a molecular weight from about 4000 g/mol to about 5000 g/mol. In embodiments, the biostability enhancing agent has a molecular weight from about 4500 g/mol to about 5000 g/mol.

In embodiments, the biostability enhancing agent has a molecular weight of about 750 g/mol. In embodiments, the biostability enhancing agent has a molecular weight of 750 g/mol. In embodiments, the biostability enhancing agent has a molecular weight of about 2000 g/mol. In embodiments, the biostability enhancing agent has a molecular weight of 2000 g/mol. In embodiments, the biostability enhancing agent has a molecular weight of about 5000 g/mol. In embodiments, the biostability enhancing agent has a molecular weight of 5000 g/mol.

In embodiments, the biostability enhancing agent is C14 polyethylene glycol 750. In embodiments, the biostability enhancing agent is C14 polyethylene glycol 2000. In embodiments, biostability enhancing agent is C14 polyethylene glycol 5000.

In embodiments, the first cationic lipid is present at a compositional molar ratio from about 0.18 to about 0.32, from about 0.19 to about 0.32, from about 0.20 to about 0.32, from about 0.21 to about 0.32, from about 0.22 to about 0.32, from about 0.23 to about 0.32, from about 0.24 to about 0.32, from about 0.25 to about 0.32, from about 0.26 to about 0.32, from about 0.27 to about 0.32, from about 0.28 to about 0.32, from about 0.29 to about 0.32, or from about 0.30 to about 0.32. In embodiments, the first cationic lipid is present at a compositional molar ratio from 0.18 to 0.32, from 0.19 to 0.32, from 0.20 to 0.32, from 0.21 to 0.32, from 0.22 to 0.32, from 0.23 to 0.32, from 0.24 to 0.32, from 0.25 to 0.32, from 0.26 to 0.32, from 0.27 to 0.32, from 0.28 to 0.32, from 0.29 to 0.32, or from 0.30 to 0.32.

In embodiments, the first cationic lipid is present at a compositional molar ratio from 0.18 to 0.32. In embodiments, the first cationic lipid is present at a compositional molar ratio from 0.19 to 0.32. In embodiments, the first cationic lipid is present at a compositional molar ratio from 0.20 to 0.32. In embodiments, the first cationic lipid is present at a compositional molar ratio from 0.21 to 0.32. In embodiments, the first cationic lipid is present at a compositional molar ratio from 0.22 to 0.32. In embodiments, the first cationic lipid is present at a compositional molar ratio from 0.23 to 0.32. In embodiments, the first cationic lipid is present at a compositional molar ratio from 0.24 to 0.32. In embodiments, the first cationic lipid is present at a compositional molar ratio from 0.25 to 0.32. In embodiments, the first cationic lipid is present at a compositional molar ratio from 0.26 to 0.32. In embodiments, the first cationic lipid is present at a compositional molar ratio from 0.27 to 0.32. In embodiments, the first cationic lipid is present at a compositional molar ratio from 0.28 to 0.32. In embodiments, the first cationic lipid is present at a compositional molar ratio from 0.29 to 0.32. In embodiments, the first cationic lipid is present at a compositional molar ratio from 0.30 to 0.32.

In embodiments, the first cationic lipid is present at a compositional molar ratio from 0.18 to 0.31. In embodiments, the first cationic lipid is present at a compositional molar ratio from 0.18 to 0.30. In embodiments, the first cationic lipid is present at a compositional molar ratio from 0.18 to 0.29. In embodiments, the first cationic lipid is present at a compositional molar ratio from 0.18 to 0.28. In embodiments, the first cationic lipid is present at a compositional molar ratio from 0.18 to 0.27. In embodiments, the first cationic lipid is present at a compositional molar ratio from 0.18 to 0.26. In embodiments, the first cationic lipid is present at a compositional molar ratio from 0.18 to 0.25. In embodiments, the first cationic lipid is present at a compositional molar ratio from 0.18 to 0.24. In embodiments, the first cationic lipid is present at a compositional molar ratio from 0.18 to 0.23. In embodiments, the first cationic lipid is present at a compositional molar ratio from 0.18 to 0.22. In embodiments, the first cationic lipid is present at a compositional molar ratio from 0.18 to 0.21. In embodiments, the first cationic lipid is present at a compositional molar ratio from 0.18 to 0.20.

In embodiments, the first cationic lipid is present at a compositional molar ratio of 0.18, 0.19, 0.20, 0.21, 0.22, 0.23, 0.24, 0.25, 0.26, 0.27, 0.28, 0.29, 0.30, 0.31 or 0.32. In embodiments, the first cationic lipid is present at a compositional molar ratio of about 0.18, 0.19, 0.20, 0.21, 0.22, 0.23, 0.24, 0.25, 0.26, 0.27, 0.28, 0.29, 0.30, 0.31 or 0.32. In further embodiments, the second cationic lipid is present at a compositional molar ratio from about 0.24 to about 0.51, the first helper lipid is present at a compositional molar ratio from about 0.20 to about 0.32, the second helper lipid is present at a compositional molar ratio from about 0.01 to about 0.14 and the biostability enhancing agent is present at a compositional molar ratio from about 0.01 to about 0.02.

In embodiments, the second cationic lipid is present at a compositional molar ratio from about 0.24 to about 0.51, from about 0.25 to about 0.51, from about 0.26 to about 0.51, from about 0.27 to about 0.51, from about 0.28 to about 0.51, from about 0.29 to about 0.51, from about 0.30 to about 0.51, from about 0.31 to about 0.51, from about 0.32 to about 0.51, from about 0.33 to about 0.51, from about 0.34 to about 0.51, from about 0.35 to about 0.51, from about 0.36 to about 0.51, from about 0.37 to about 0.51, from about 0.38 to about 0.51, from about 0.39 to about 0.51, from about 0.40 to about 0.51, from about 0.41 to about 0.51, from about 0.42 to about 0.51, from about 0.43 to about 0.51, from about 0.44 to about 0.51, from about 0.45 to about 0.51, from about 0.46 to about 0.51, from about 0.47 to about 0.51, from about 0.48 to about 0.51, or from about 0.49 to about 0.51.

In embodiments, the second cationic lipid is present at a compositional molar ratio from 0.24 to 0.51, from 0.25 to 0.51, from 0.26 to 0.51, from 0.27 to 0.51, from 0.28 to 0.51, from 0.29 to 0.51, from 0.30 to 0.51, from 0.31 to 0.51, from 0.32 to 0.51, from 0.33 to 0.51, from 0.34 to 0.51, from 0.35 to 0.51, from 0.36 to 0.51, from 0.37 to 0.51, from 0.38 to 0.51, from 0.39 to 0.51, from 0.40 to 0.51, from 0.41 to 0.51, from 0.42 to 0.51, from 0.43 to 0.51, from 0.44 to 0.51, from 0.45 to 0.51, from 0.46 to 0.51, from 0.47 to 0.51, from 0.48 to 0.51, or from 0.49 to 0.51.

In embodiments, the second cationic lipid is present at a compositional molar ratio from about 0.24 to about 0.51, from about 0.24 to about 0.50, from about 0.24 to about 0.49, from about 0.24 to about 0.48, from about 0.24 to about 0.47, from about 0.24 to about 0.46, from about 0.24 to about 0.45, from about 0.24 to about 0.44, from about 0.24 to about 0.43, from about 0.24 to about 0.42, from about 0.24 to about 0.41, from about 0.24 to about 0.40, from about 0.24 to about 0.39, from about 0.24 to about 0.38, from about 0.24 to about 0.37, from about 0.24 to about 0.36, from about 0.24 to about 0.35, from about 0.24 to about 0.34, from about 0.24 to about 0.33, from about 0.24 to about 0.32, from about 0.24 to about 0.31, from about 0.24 to about 0.30, from about 0.24 to about 0.29, from about 0.24 to about 0.28, from about 0.24 to about 0.27, or from about 0.24 to about 0.26.

In embodiments, the second cationic lipid is present at a compositional molar ratio from 0.24 to 0.51, from 0.24 to 0.50, from 0.24 to 0.49, from 0.24 to 0.48, from 0.24 to 0.47, from 0.24 to 0.46, from 0.24 to 0.45, from 0.24 to 0.44, from 0.24 to 0.43, from 0.24 to 0.42, from 0.24 to 0.41, from 0.24 to 0.40, from 0.24 to 0.39, from 0.24 to 0.38, from 0.24 to 0.37, from 0.24 to 0.36, from 0.24 to 0.35, from 0.24 to 0.34, from 0.24 to 0.33, from 0.24 to 0.32, from 0.24 to 0.31, from 0.24 to 0.30, from 0.24 to 0.29, from 0.24 to 0.28, from 0.24 to 0.27, or from 0.24 to 0.26.

In embodiments, the second cationic lipid is present at a compositional molar ratio from 0.24 to 0.51. In embodiments, the second cationic lipid is present at a compositional molar ratio from 0.25 to 0.51. In embodiments, the second cationic lipid is present at a compositional molar ratio from 0.26 to 0.51. In embodiments, the second cationic lipid is present at a compositional molar ratio from 0.27 to 0.51. In embodiments, the second cationic lipid is present at a compositional molar ratio from 0.28 to 0.51. In embodiments, the second cationic lipid is present at a compositional molar ratio from 0.29 to 0.51. In embodiments, the second cationic lipid is present at a compositional molar ratio from 0.30 to 0.51. In embodiments, the second cationic lipid is present at a compositional molar ratio from 0.31 to 0.51. In embodiments, the second cationic lipid is present at a compositional molar ratio from 0.32 to 0.51. In embodiments, the second cationic lipid is present at a compositional molar ratio from 0.33 to 0.51. In embodiments, the second cationic lipid is present at a compositional molar ratio from 0.34 to 0.51. In embodiments, the second cationic lipid is present at a compositional molar ratio from 0.35 to 0.51. In embodiments, the second cationic lipid is present at a compositional molar ratio from 0.36 to 0.51. In embodiments, the second cationic lipid is present at a compositional molar ratio from 0.37 to 0.51. In embodiments, the second cationic lipid is present at a compositional molar ratio from 0.38 to 0.51. In embodiments, the second cationic lipid is present at a compositional molar ratio from 0.39 to 0.51. In embodiments, the second cationic lipid is present at a compositional molar ratio from 0.40 to 0.51. In embodiments, the second cationic lipid is present at a compositional molar ratio from 0.41 to 0.51. In embodiments, the second cationic lipid is present at a compositional molar ratio from 0.42 to 0.51. In embodiments, the second cationic lipid is present at a compositional molar ratio from 0.43 to 0.51. In embodiments, the second cationic lipid is present at a compositional molar ratio from 0.44 to 0.51. In embodiments, the second cationic lipid is present at a compositional molar ratio from 0.45 to 0.51. In embodiments, the second cationic lipid is present at a compositional molar ratio from 0.46 to 0.51. In embodiments, the second cationic lipid is present at a compositional molar ratio from 0.47 to 0.51. In embodiments, the second cationic lipid is present at a compositional molar ratio from 0.48 to 0.51. In embodiments, the second cationic lipid is present at a compositional molar ratio or from 0.49 to 0.51.

In embodiments, the second cationic lipid is present at a compositional molar ratio of 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50 or 0.51. In embodiments, the second cationic lipid is present at a compositional molar ratio of about 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50 or 0.51. In further embodiments, the first cationic lipid is present at a compositional molar ratio from about 0.18 to about 0.32, the first helper lipid is present at a compositional molar ratio from about 0.20 to about 0.32, the second helper lipid is present at a compositional molar ratio from about 0.01 to about 0.14 and the biostability enhancing agent is present at a compositional molar ratio from about 0.01 to about 0.02.

In embodiments, the first helper lipid is present at a compositional molar ratio from 0.20 to 0.32, from 0.21 to 0.32, from 0.22 to 0.32, from 0.23 to 0.32, from 0.24 to 0.32, from 0.25 to 0.32, from 0.26 to 0.32, from 0.27 to 0.32, from 0.28 to 0.32, from 0.29 to 0.32, or from 0.30 to 0.32. In embodiments, the first helper lipid is present at a compositional molar ratio from about 0.20 to about 0.32, from about 0.21 to about 0.32, from about 0.22 to about 0.32, from about 0.23 to about 0.32, from about 0.24 to about 0.32, from about 0.25 to about 0.32, from about 0.26 to about 0.32, from about 0.27 to about 0.32, from about 0.28 to about 0.32, from about 0.29 to about 0.32, or from about 0.30 to about 0.32.

In embodiments, the first helper lipid is present at a compositional molar ratio from 0.20 to 0.31, from 0.20 to 0.30, from 0.20 to 0.29, from 0.20 to 0.28, from 0.20 to 0.27, from 0.20 to 0.26, from 0.20 to 0.25, from 0.20 to 0.24, from 0.20 to 0.23, or from 0.20 to 0.22. In embodiments, the first helper lipid is present at a compositional molar ratio from about 0.20 to about 0.31, from about 0.20 to about 0.30, from about 0.20 to about 0.29, from about 0.20 to about 0.28, from about 0.20 to about 0.27, from about 0.20 to about 0.26, from about 0.20 to about 0.25, from about 0.20 to about 0.24, from about 0.20 to about 0.23, or from about 0.20 to about 0.22.

In embodiments, the first helper lipid is present at a compositional molar ratio from 0.20 to 0.31. In embodiments, the first helper lipid is present at a compositional molar ratio from 0.20 to 0.30. In embodiments, the first helper lipid is present at a compositional molar ratio from 0.20 to 0.29. In embodiments, the first helper lipid is present at a compositional molar ratio from 0.20 to 0.28. In embodiments, the first helper lipid is present at a compositional molar ratio from 0.20 to 0.27. In embodiments, the first helper lipid is present at a compositional molar ratio from 0.20 to 0.26. In embodiments, the first helper lipid is present at a compositional molar ratio from 0.20 to 0.25. In embodiments, the first helper lipid is present at a compositional molar ratio from 0.20 to 0.24. In embodiments, the first helper lipid is present at a compositional molar ratio from 0.20 to 0.23. In embodiments, the first helper lipid is present at a compositional molar ratio or from 0.20 to 0.22.

In embodiments, the first helper lipid is present at a compositional molar ratio from 0.20, 0.21, 0.22, 0.23, 0.24, 0.25, 0.26, 0.27, 0.28, 0.29, 0.30, 0.31, or 0.32. In embodiments, the first helper lipid is present at a compositional molar ratio from about 0.20, 0.21, 0.22, 0.23, 0.24, 0.25, 0.26, 0.27, 0.28, 0.29, 0.30, 0.31, or 0.32. In further embodiments, the first cationic lipid is present at a compositional molar ratio from about 0.18 to about 0.32, the second cationic lipid is present at a compositional molar ratio from about 0.24 to about 0.51, the second helper lipid is present at a compositional molar ratio from about 0.01 to about 0.14 and the biostability enhancing agent is present at a compositional molar ratio from about 0.01 to about 0.02.

In embodiments, the second helper lipid is present at a compositional molar ratio from 0.01 to 0.14, from 0.01 to 0.13, from 0.01 to 0.12, from 0.01 to 0.11, from 0.01 to 0.10, from 0.01 to 0.9, from 0.01 to 0.8, from 0.01 to 0.7, from 0.01 to 0.6, from 0.01 to 0.5, from 0.01 to 0.4, from 0.01 to 0.3, from 0.01 to 0.2, from 0.01 to 0.1, from 0.01 to 0.09, from 0.01 to 0.08, from 0.01 to 0.07, from 0.01 to 0.06, from 0.01 to 0.05, from 0.01 to 0.04, or from 0.01 to 0.03. In embodiments, the second helper lipid is present at a compositional molar ratio from about 0.01 to about 0.14, from about 0.01 to about 0.13, from about 0.01 to about 0.12, from about 0.01 to about 0.11, from about 0.01 to about 0.10, from about 0.01 to about 0.9, from about 0.01 to about 0.8, from about 0.01 to about 0.7, from about 0.01 to about 0.6, from about 0.01 to about 0.5, from about 0.01 to about 0.4, from about 0.01 to about 0.3, from about 0.01 to about 0.2, from about 0.01 to about 0.1, from about 0.01 to about 0.09, from about 0.01 to about 0.08, from about 0.01 to about 0.07, from about 0.01 to about 0.06, from about 0.01 to about 0.05, from about 0.01 to about 0.04, or from about 0.01 to about 0.03.

In embodiments, the second helper lipid is present at a compositional molar ratio from 0.02 to 0.14. In embodiments, the second helper lipid is present at a compositional molar ratio from 0.03 to 0.14. In embodiments, the second helper lipid is present at a compositional molar ratio from 0.04 to 0.14. In embodiments, the second helper lipid is present at a compositional molar ratio from 0.05 to 0.14. In embodiments, the second helper lipid is present at a compositional molar ratio from 0.06 to 0.14. In embodiments, the second helper lipid is present at a compositional molar ratio from 0.07 to 0.14. In embodiments, the second helper lipid is present at a compositional molar ratio from 0.08 to 0.14. In embodiments, the second helper lipid is present at a compositional molar ratio from 0.09 to 0.14. In embodiments, the second helper lipid is present at a compositional molar ratio from 0.1 to 0.14. In embodiments, the second helper lipid is present at a compositional molar ratio from 0.2 to 0.14. In embodiments, the second helper lipid is present at a compositional molar ratio from 0.3 to 0.14. In embodiments, the second helper lipid is present at a compositional molar ratio from 0.4 to 0.14. In embodiments, the second helper lipid is present at a compositional molar ratio from 0.5 to 0.14. In embodiments, the second helper lipid is present at a compositional molar ratio from 0.6 to 0.14. In embodiments, the second helper lipid is present at a compositional molar ratio from 0.7 to 0.14. In embodiments, the second helper lipid is present at a compositional molar ratio from 0.8 to 0.14. In embodiments, the second helper lipid is present at a compositional molar ratio from 0.9 to 0.14. In embodiments, the second helper lipid is present at a compositional molar ratio from 0.1 to 0.14. In embodiments, the second helper lipid is present at a compositional molar ratio from 0.11 to 0.14. In embodiments, the second helper lipid is present at a compositional molar ratio from 0.12 to 0.14.

In embodiments, the second helper lipid is present at a compositional molar ratio from 0.01, 0.02, 0.03, 0.04, 0.05, 0.06, 0.07, 0.08, 0.09, 0.10, 0.11, 0.12, 0.13, or 0.14. In embodiments, the second helper lipid is present at a compositional molar ratio from about 0.01, 0.02, 0.03, 0.04, 0.05, 0.06, 0.07, 0.08, 0.09, 0.10, 0.11, 0.12, 0.13, or 0.14. In further embodiments, the first cationic lipid is present at a compositional molar ratio from about 0.18 to about 0.32, the second cationic lipid is present at a compositional molar ratio from about 0.24 to about 0.51, the first helper lipid is present at a compositional molar ratio from about 0.20 to about 0.32 and the biostability enhancing agent is present at a compositional molar ratio from about 0.01 to about 0.02.

In embodiments, the biostability enhancing agent is present at a compositional molar ratio from 0.01 to 0.02. In embodiments, the biostability enhancing agent is present at a compositional molar ratio from 0.011 to 0.02. In embodiments, the biostability enhancing agent is present at a compositional molar ratio from 0.012 to 0.02. In embodiments, the biostability enhancing agent is present at a compositional molar ratio from 0.013 to 0.02. In embodiments, the biostability enhancing agent is present at a compositional molar ratio from 0.014 to 0.02. In embodiments, the biostability enhancing agent is present at a compositional molar ratio from 0.015 to 0.02. In embodiments, the biostability enhancing agent is present at a compositional molar ratio from 0.016 to 0.02. In embodiments, the biostability enhancing agent is present at a compositional molar ratio from 0.017 to 0.02. In embodiments, the biostability enhancing agent is present at a compositional molar ratio from 0.018 to 0.02.

In embodiments, the biostability enhancing agent is present at a compositional molar ratio from about 0.01 to about 0.02. In embodiments, the biostability enhancing agent is present at a compositional molar ratio from about 0.011 to about 0.02. In embodiments, the biostability enhancing agent is present at a compositional molar ratio from about 0.012 to about 0.02. In embodiments, the biostability enhancing agent is present at a compositional molar ratio from about 0.013 to about 0.02. In embodiments, the biostability enhancing agent is present at a compositional molar ratio from about 0.014 to about 0.02. In embodiments, the biostability enhancing agent is present at a compositional molar ratio from about 0.015 to about 0.02. In embodiments, the biostability enhancing agent is present at a compositional molar ratio from about 0.016 to about 0.02. In embodiments, the biostability enhancing agent is present at a compositional molar ratio from about 0.017 to about 0.02. In embodiments, the biostability enhancing agent is present at a compositional molar ratio from about 0.018 to about 0.02.

In embodiments, the biostability enhancing agent is present at a compositional molar ratio from about 0.01 to about 0.019. In embodiments, the biostability enhancing agent is present at a compositional molar ratio from about 0.01 to about 0.018. In embodiments, the biostability enhancing agent is present at a compositional molar ratio from about 0.01 to about 0.017. In embodiments, the biostability enhancing agent is present at a compositional molar ratio from about 0.01 to about 0.016. In embodiments, the biostability enhancing agent is present at a compositional molar ratio from about 0.01 to about 0.015. In embodiments, the biostability enhancing agent is present at a compositional molar ratio from about 0.01 to about 0.014. In embodiments, the biostability enhancing agent is present at a compositional molar ratio from about 0.01 to about 0.013. In embodiments, the biostability enhancing agent is present at a compositional molar ratio from about 0.01 to about 0.012.

In embodiments, the biostability enhancing agent is present at a compositional molar ratio from 0.01, 0.011, 0.012, 0.013, 0.014, 0.015, 0.016, 0.017, 0.018, 0.019 or 0.020. In embodiments, the biostability enhancing agent is present at a compositional molar ratio from about 0.01, 0.011, 0.012, 0.013, 0.014, 0.015, 0.016, 0.017, 0.018, 0.019 or 0.020. In further embodiments, the first cationic lipid is present at a compositional molar ratio from about 0.18 to about 0.32, the second cationic lipid is present at a compositional molar ratio from about 0.24 to about 0.51, the first helper lipid is present at a compositional molar ratio from about 0.20 to about 0.32 and the second helper lipid is present at a compositional molar ratio from about 0.01 to about 0.14.

In an aspect is provided a composition including: (i) a first cationic lipid at a compositional molar ratio of about 0.24, wherein the first cationic lipid is dihydroxy dimyristyl spermine; (ii) a second cationic lipid at a compositional molar ratio of about 0.38, wherein the second cationic lipid is hydroxy dimyristyl spermidine; (iii) a first helper lipid at a compositional molar ratio of about 0.32, wherein the first helper lipid is dioleoylphosphatidylethanolamine; (iv) a second helper lipid at a compositional molar ratio of about 0.05, wherein the second helper lipid is cholesterol; and (v) a biostability enhancing agent at a compositional molar ratio of about 0.01, wherein the biostability enhancing agent is C14 polyethylene glycol 5000.

In an aspect is provided a composition including: (i) a first cationic lipid at a compositional molar ratio of about 0.32, wherein the first cationic lipid is dihydroxy dimyristyl spermine; (ii) a second cationic lipid at a compositional molar ratio of about 0.39, wherein the second cationic lipid is hydroxy dimyristyl spermidine; (iii) a first helper lipid at a compositional molar ratio of about 0.26, wherein the first helper lipid is dioleoylphosphatidylethanolamine; (iv) a second helper lipid at a compositional molar ratio of about 0.01, wherein the second helper lipid is cholesterol; and (v) a biostability enhancing agent at a compositional molar ratio of about 0.02, wherein the biostability enhancing agent is C14 polyethylene glycol 5000.

In an aspect is provided a composition including: (i) a first cationic lipid at a compositional molar ratio of about 0.18, wherein the first cationic lipid is dihydroxy dimyristyl spermine; (ii) a second cationic lipid at a compositional molar ratio of about 0.38, wherein the second cationic lipid is hydroxy dimyristyl spermidine; (iii) a first helper lipid at a compositional molar ratio of about 0.32, wherein the first helper lipid is dioleoylphosphatidylethanolamine; (iv) a second helper lipid at a compositional molar ratio of about 0.10, wherein the second helper lipid is cholesterol; and (v) a biostability enhancing agent at a compositional molar ratio of about 0.02, wherein the biostability enhancing agent is C14 polyethylene glycol 5000.

In an aspect is provided a composition including: (i) a first cationic lipid at a compositional molar ratio of about 0.23, wherein the first cationic lipid is dihydroxy dimyristyl spermine; (ii) a second cationic lipid at a compositional molar ratio of about 0.45, wherein the second cationic lipid is hydroxy dimyristyl spermidine; (iii) a first helper lipid at a compositional molar ratio of about 0.20, wherein the first helper lipid is dioleoylphosphatidylethanolamine; (iv) a second helper lipid at a compositional molar ratio of about 0.10, wherein the second helper lipid is cholesterol; and (v) a biostability enhancing agent at a compositional molar ratio of about 0.02, wherein the biostability enhancing agent is C14 polyethylene glycol 5000.

In an aspect is provided a composition including: (i) a first cationic lipid at a compositional molar ratio of about 0.18, wherein the first cationic lipid is dihydroxy dimyristyl spermine; (ii) a second cationic lipid at a compositional molar ratio of about 0.51, wherein the second cationic lipid is hydroxy dimyristyl spermidine; (iii) a first helper lipid at a compositional molar ratio of about 0.20, wherein the first helper lipid is dioleoylphosphatidylethanolamine; (iv) a second helper lipid at a compositional molar ratio of about 0.10, wherein the second helper lipid is cholesterol; and (v) a biostability enhancing agent at a compositional molar ratio of about 0.01, wherein the biostability enhancing agent is C14 polyethylene glycol 5000.

In an aspect is provided a composition including: (i) a first cationic lipid at a compositional molar ratio of about 0.27, wherein the first cationic lipid is dihydroxy dimyristyl spermine; (ii) a second cationic lipid at a compositional molar ratio of about 0.38, wherein the second cationic lipid is hydroxy dimyristyl spermidine; (iii) a first helper lipid at a compositional molar ratio of about 0.32, wherein the first helper lipid is dioleoylphosphatidylethanolamine; (iv) a second helper lipid at a compositional molar ratio of about 0.01, wherein the second helper lipid is cholesterol; and (v) a biostability enhancing agent at a compositional molar ratio of about 0.02, wherein the biostability enhancing agent is C14 polyethylene glycol 5000.

In an aspect is provided a composition including: (i) a first cationic lipid at a compositional molar ratio of about 0.25, wherein the first cationic lipid is dihydroxy dimyristyl spermine; (ii) a second cationic lipid at a compositional molar ratio of about 0.38, wherein the second cationic lipid is hydroxy dimyristyl spermidine; (iii) a first helper lipid at a compositional molar ratio of about 0.26, wherein the first helper lipid is dioleoylphosphatidylethanolamine; (iv) a second helper lipid at a compositional molar ratio of about 0.10, wherein the second helper lipid is cholesterol; and (v) a biostability enhancing agent at a compositional molar ratio of about 0.01, wherein the biostability enhancing agent is C14 polyethylene glycol 5000.

In an aspect is provided a composition including: (i) a first cationic lipid at a compositional molar ratio of about 0.28, wherein the first cationic lipid is dihydroxy dimyristyl spermine; (ii) a second cationic lipid at a compositional molar ratio of about 0.24, wherein the second cationic lipid is hydroxy dimyristyl spermidine; (iii) a first helper lipid at a compositional molar ratio of about 0.32, wherein the first helper lipid is dioleoylphosphatidylethanolamine; (iv) a second helper lipid at a compositional molar ratio of about 0.14, wherein the second helper lipid is cholesterol; and (v) a biostability enhancing agent at a compositional molar ratio of about 0.02, wherein the biostability enhancing agent is C14 polyethylene glycol 750.

In an aspect is provided a composition including: (i) a first cationic lipid at a compositional molar ratio of about 0.18, wherein the first cationic lipid is dihydroxy dimyristyl spermine; (ii) a second cationic lipid at a compositional molar ratio of about 0.47, wherein the second cationic lipid is hydroxy dimyristyl spermidine; (iii) a first helper lipid at a compositional molar ratio of about 0.32, wherein the first helper lipid is dioleoylphosphatidylethanolamine; (iv) a second helper lipid at a compositional molar ratio of about 0.01, wherein the second helper lipid is cholesterol; and (v) a biostability enhancing agent at a compositional molar ratio of about 0.02, wherein said biostability enhancing agent is C14 polyethylene glycol 5000.

In an aspect is provided a composition including: (i) a first cationic lipid at a compositional molar ratio of about 0.24, wherein the first cationic lipid is dihydroxy dimyristyl spermine; (ii) a second cationic lipid at a compositional molar ratio of about 0.40, wherein the second cationic lipid is hydroxy dimyristyl spermidine; (iii) a first helper lipid at a compositional molar ratio of about 0.24, wherein the first helper lipid is dioleoylphosphatidylethanolamine; (iv) a second helper lipid at a compositional molar ratio of about 0.10, wherein the second helper lipid is cholesterol; and (v) a biostability enhancing agent at a compositional molar ratio of about 0.02, wherein the biostability enhancing agent is C14 polyethylene glycol 2000.

In an aspect is provided a composition including: (i) a first cationic lipid at a compositional molar ratio of about 0.32, wherein the first cationic lipid is dihydroxy dimyristyl spermine; (ii) a second cationic lipid at a compositional molar ratio of about 0.38, wherein the second cationic lipid is hydroxy dimyristyl spermidine; (iii) a first helper lipid at a compositional molar ratio of about 0.20, wherein the first helper lipid is dioleoylphosphatidylethanolamine; (iv) a second helper lipid at a compositional molar ratio of about 0.08, wherein the second helper lipid is cholesterol; and (v) a biostability enhancing agent at a compositional molar ratio of about 0.02, wherein the biostability enhancing agent is C14 polyethylene glycol 5000.

In embodiments, the composition as provided herein including embodiments thereof, further includes a bioactive agent. A "bioactive agent" as provided herein refers to a compound that upon administration to a cell, tissue or organism has a detectable effect on the biological function of said cell, tissue or organism. In embodiments, the detectable effect is a biological effect. In embodiments, the detectable effect is a therapeutic effect. In embodiments, the detectable effect is a diagnostic effect. The bioactive agent is capable of forming a lipid aggregate with the compositions provided herein including embodiments thereof. In embodiments, the bioactive agent is a test compound. A "test compound" as provided herein is a compound whose effect on a biological function is determined relative to a control compound. A "control compound" as provided herein refers to a compound having a known effect on a biological function. In embodiments, the bioactive agent is a control compound. In embodiments, the bioactive agent is a therapeutic agent or a diagnostic agent. In embodiments, the bioactive agent is a therapeutic agent or a diagnostic agent. In embodiments, the bioactive agent is a therapeutic agent. In embodiments, the bioactive agent is a diagnostic agent. In embodiments, the bioactive agent includes a nucleic acid, a ribonucleoprotein or a small molecule. In embodiments, the bioactive agent includes a nucleic acid. In embodiments, the bioactive agent includes a ribonucleoprotein. In embodiments, the bioactive agent includes a small molecule. In embodiments, the nucleic acid is an mRNA, a siRNA, a miRNA or a guide RNA. In embodiments, the nucleic acid is an mRNA. In embodiments, the nucleic acid is a siRNA. In embodiments, the nucleic acid is a miRNA. In embodiments, the nucleic acid is a guide RNA. In embodiments, the bioactive agent includes a nucleic acid and a ribonucleoprotein. In embodiments, the ribonucleoprotein is CRISPR associated protein 9 (Cas9). An "mRNA" as provided herein refers to a ribonucleic acid molecule, including one or more than one expressible nucleic acid sequences encoding one or more proteins or polypeptides, or other DNA molecules.

Pharmaceutical Composition

In an aspect is provided a pharmaceutical composition including a composition as provided herein including embodiments thereof and a pharmaceutically acceptable excipient.

A therapeutically effective amount as provided herein refers to an amount effective to achieve its intended purpose. The actual amount effective for a particular application will depend, inter alia, on the condition being treated. When administered in methods to treat a disease, the pharmaceutical compositions described herein will contain an amount of active bioactive agent effective to achieve the desired result, e.g., modulating the activity of a target molecule and/or reducing, eliminating, or slowing the progression of disease symptoms (e.g., pulmonary disease). Determination of a therapeutically effective amount of a bioactive agent forming a lipid aggregate with the compositions provided herein is well within the capabilities of those skilled in the art, especially in light of the detailed disclosure herein.

Acceptable carriers, excipients or stabilizers are nontoxic to recipients at the dosages and concentrations employed, and include buffers such as phosphate, citrate, or acetate at a pH typically of 5.0 to 8.0, most often 6.0 to 7.0; salts such as sodium chloride, potassium chloride, etc. to make isotonic; antioxidants, preservatives, low molecular weight polypeptides, proteins, hydrophilic polymers such as polysorbate 80, amino acids such as glycine, carbohydrates, chelating agents, sugars, and other standard ingredients known to those skilled in the art (Remington's Pharmaceutical Science 16$^{th}$ edition, Osol, A. Ed. 1980).

A pharmaceutical composition including a composition provided herein including embodiments thereof (e.g., a lipid aggregate complexed with a bioactive agent) can be administered by a variety of methods known in the art. The route and/or mode of administration vary depending upon the desired results. In embodiments, administration is intravenous, intramuscular, intraperitoneal, or subcutaneous, or administered proximal to the site of the target.

Pharmaceutically acceptable excipients can be suitable for intravenous, intramuscular, subcutaneous, parenteral, spinal or epidermal administration (e.g., by injection or infusion).

Pharmaceutical compositions of the composition provided herein including embodiments thereof (e.g., a lipid aggregate complexed with a bioactive agent) can be prepared in accordance with methods well known and routinely practiced in the art. See, e.g., Remington: *The Science and Practice of Pharmacy*, Mack Publishing Co., 20$^{th}$ ed., 2000; and *Sustained and Controlled Release Drug Delivery Systems*, J. R. Robinson, ed., Marcel Dekker, Inc., New York, 1978. Pharmaceutical compositions are preferably manufactured under GMP conditions.

Typically, a therapeutically effective dose or efficacious dose of the composition provided herein including embodiments thereof (e.g., a lipid aggregate complexed with a bioactive agent) is employed in the pharmaceutical compositions of the invention. The composition provided herein including embodiments thereof (e.g., a lipid aggregate complexed with a bioactive agent) can be formulated into pharmaceutically acceptable dosage forms by conventional methods known to those of skill in the art. Dosage regimens are adjusted to provide the optimum desired response (e.g., a therapeutic response). For example, a single bolus may be administered, several divided doses may be administered over time or the dose may be proportionally reduced or increased as indicated by the exigencies of the therapeutic situation. It may be advantageous to formulate the composition provided herein including embodiments thereof (e.g., a lipid aggregate complexed with a bioactive agent) in combination with other therapies or agents. It can be advantageous to formulate parenteral compositions in dosage unit form for ease of administration and uniformity of dosage. Dosage unit form as used herein refers to physically discrete units suited as unitary dosages for the subjects to be treated; each unit contains a predetermined quantity of a composition provided herein including embodiments thereof (e.g., a lipid aggregate complexed with a bioactive agent)calculated to produce the desired therapeutic effect in association with the required pharmaceutical excipient.

Actual dosage levels of the bioactive agent in the pharmaceutical compositions of the present invention can be varied so as to obtain an amount of the active ingredient which is effective to achieve the desired therapeutic response for a particular patient, composition, and mode of administration, without being toxic to the patient. The selected dosage level depends upon a variety of pharmacokinetic factors including the activity of the particular compositions of the present invention employed, the route of administration, the time of administration, the rate of excretion of the particular antibody being employed, the duration of the treatment, other drugs, compounds and/or materials used in combination with the particular compositions employed, the age, sex, weight, condition, general health and prior medical history of the patient being treated, and like factors.

A physician or veterinarian can start doses of the composition provided herein including embodiments thereof (e.g., a lipid aggregate complexed with a bioactive agent) employed in the pharmaceutical composition at levels lower than that required to achieve the desired therapeutic effect and gradually increase the dosage until the desired effect is achieved. In general, effective doses of the compositions of the present invention vary depending upon many different factors, including the specific disease or condition to be treated, means of administration, target site, physiological state of the patient, whether the patient is human or an animal, other medications administered, and whether treatment is prophylactic or therapeutic. Treatment dosages need to be titrated to optimize safety and efficacy.

Composition provided herein including embodiments thereof (e.g., a lipid aggregate complexed with a bioactive agent) can be administered on multiple occasions. Intervals between single dosages can be weekly, monthly or yearly. Intervals can also be irregular as indicated by measuring blood levels of the composition in the patient. Dosage and frequency vary depending on the half-life of the composition in the patient. The dosage and frequency of administration can vary depending on whether the treatment is prophylactic or therapeutic. In prophylactic applications, a relatively low dosage is administered at relatively infrequent intervals over a long period of time. Some patients continue to receive treatment for the rest of their lives. In therapeutic applications, a relatively high dosage at relatively short intervals is sometimes required until progression of the disease is reduced or terminated, and preferably until the patient shows partial or complete amelioration of symptoms of disease. Thereafter, the patient can be administered a prophylactic regime.

Cellular Compositions

In an aspect is provided a cell including a composition as provided herein including embodiments thereof. In embodiments, the cell is a mammalian cell. In embodiments, the cell is a rodent cell. In embodiments, the cell is a mouse cell. In embodiments, the cell is a rat cell. In embodiments, the cell is a porcine cell. In embodiments, the cell is a canine cell. In embodiments, the cell is a primate cell. In embodiments, the cell is a human cell. In embodiments, the cell is an epithelial cell. In embodiments, the cell is an epithelial lung cell. In embodiments, the cell is an endothelial cell. In embodiments, the cell is an endothelial lung cell. In embodiments, the cell forms part of an organism. In embodiments, the organism is human. In embodiments, the organism is rat. In embodiments, the organism is mouse.

Methods of Delivery

In an aspect is provided, method of delivering a bioactive agent to a cell, the method including: (i) admixing an bioactive agent with a composition as provided herein including embodiments thereof, thereby forming a bioactive agent-lipid complex; (ii) contacting a cell with the bioactive agent-lipid complex, thereby delivering the bioactive agent-lipid complex to a cell. The bioactive agent may be any bioactive agent as described herein (e.g. a nucleic acid). The bioactive agent-lipid complex as provided herein is a lipid aggregate as described herein.

In embodiments, the method as described herein including embodiments thereof, further includes allowing the bioactive agent-lipid complex to enter the cell. In embodiments, the bioactive agent is a therapeutic agent or a diagnostic agent. In embodiments, the bioactive agent includes a nucleic acid, a ribonucleoprotein or a small molecule. In embodiments, the nucleic acid is an mRNA, a siRNA, miRNA or guide RNA. In embodiments, the bioactive agent includes a guide RNA and a ribonucleoprotein. In embodiments, the ribonucleoprotein is CRISPR associated protein 9 (Cas9). In embodiments, the ribonucleoprotein is bound to the guide RNA.

In embodiments, the cell is a mammalian cell. In embodiments, the cell is a rodent cell. In embodiments, the cell is a mouse cell. In embodiments, the cell is a rat cell. In embodiments, the cell is a porcine cell. In embodiments, the cell is a canine cell. In embodiments, the cell is a primate cell. In embodiments, the cell is an epithelial cell. In embodiments, the cell is an epithelial lung cell. In embodiments, the cell is an endothelial cell. In embodiments, the cell is an endothelial lung cell.

In another aspect is provided a method of delivering a bioactive agent to lung tissue in a subject, the method including: (i) admixing an bioactive agent with a composition as described herein including embodiments thereof, thereby forming a bioactive agent-lipid complex; (ii) systemically administering an effective amount of the bioactive agent-lipid complex to a subject, thereby delivering the bioactive agent-lipid complex to a lung tissue in a subject.

In another aspect is provided a method of expressing a protein in lung tissue in a subject, the method including: (i) admixing a mRNA with a composition as described herein including embodiments thereof, thereby forming a mRNA-lipid complex; (ii) administering an effective amount of the mRNA-lipid complex to a subject; and (iii) allowing the mRNA of the mRNA-lipid complex to express in lung tissue of the subject, thereby expressing a protein in lung tissue in a subject.

Methods of Treatment

In an aspect is provided a method of treating a pulmonary disease in a subject in need thereof, the method including administering to a subject a therapeutically effective amount of a bioactive agent and a composition as described herein including embodiments thereof, thereby treating a pulmonary disease in the subject.

In embodiments, the composition and the bioactive agent are admixed prior to the administering. In embodiments, bioactive agent includes a nucleic acid, a ribonucleoprotein or a small molecule. In embodiments, the nucleic acid is an mRNA, a siRNA, a miRNA or a guide RNA.

In embodiments, the pulmonary disease is asthma, chronic obstructive pulmonary disease (COPD), lung cancer or cystic fibrosis. In embodiments, the pulmonary disease is asthma. In embodiments, the pulmonary disease is chronic obstructive pulmonary disease (COPD). In embodiments, the pulmonary disease is lung cancer. In embodiments, the pulmonary disease is or cystic fibrosis.

The terms "pulmonary disease," "pulmonary disorder," "lung disease," etc. are used interchangeably herein. The term is used to broadly refer to lung disorders characterized by difficulty breathing, coughing, airway discomfort and inflammation, increased mucus, and/or pulmonary fibrosis.

The terms "dose" and "dosage" are used interchangeably herein. A dose refers to the amount of active ingredient given to an individual at each administration. For the present invention, the dose will generally refer to the amount of pulmonary disease treatment. The dose will vary depending on a number of factors, including the range of normal doses for a given therapy, frequency of administration; size and tolerance of the individual; severity of the condition; risk of side effects; and the route of administration. One of skill will recognize that the dose can be modified depending on the above factors or based on therapeutic progress. The term "dosage form" refers to the particular format of the pharmaceutical, and depends on the route of administration. For example, a dosage form can be in a liquid form for nebulization, e.g., for inhalants, or a saline solution, e.g., for injection.

As used herein, the terms "treat" and "prevent" are not intended to be absolute terms. Treatment can refer to any delay in onset, reduction in the frequency or severity of symptoms, amelioration of symptoms, improvement in patient comfort and/or respiratory function, etc. The effect of treatment can be compared to an individual or pool of individuals not receiving a given treatment, or to the same patient prior to, or after cessation of, treatment.

"Treating" or "treatment" as used herein (and as well-understood in the art) also broadly includes any approach for obtaining beneficial or desired results in a subject's condition, including clinical results. Beneficial or desired clinical results can include, but are not limited to, alleviation or amelioration of one or more symptoms or conditions, diminishment of the extent of a disease, stabilizing (i.e., not worsening) the state of disease, prevention of a disease's transmission or spread, delay or slowing of disease progression, amelioration or palliation of the disease state, diminishment of the reoccurrence of disease, and remission, whether partial or total and whether detectable or undetectable. In other words, "treatment" as used herein includes any cure, amelioration, or prevention of a disease. Treatment may prevent the disease from occurring; inhibit the disease's spread; relieve the disease's symptoms (e.g., ocular pain, seeing halos around lights, red eye, very high intraocular pressure), fully or partially remove the disease's underlying cause, shorten a disease's duration, or do a combination of these things.

"Treating" and "treatment" as used herein include prophylactic treatment. Treatment methods include administering to a subject a therapeutically effective amount of an active agent. The administering step may consist of a single administration or may include a series of administrations. The length of the treatment period depends on a variety of factors, such as the severity of the condition, the age of the patient, the concentration of active agent, the activity of the compositions used in the treatment, or a combination thereof. It will also be appreciated that the effective dosage of an agent used for the treatment or prophylaxis may increase or decrease over the course of a particular treatment or prophylaxis regime. Changes in dosage may result and become apparent by standard diagnostic assays known in the art. In some instances, chronic administration may be required. For example, the compositions are administered to the subject in an amount and for a duration sufficient to treat the patient.

The term "prevent" refers to a decrease in the occurrence of pulmonary disease symptoms in a patient. As indicated above, the prevention may be complete (no detectable symptoms) or partial, such that fewer symptoms are observed than would likely occur absent treatment.

The term "therapeutically effective amount," as used herein, refers to that amount of the therapeutic agent sufficient to ameliorate the disorder, as described above. For example, for the given parameter, a therapeutically effective amount will show an increase or decrease of at least 5%, 10%, 15%, 20%, 25%, 40%, 50%, 60%, 75%, 80%, 90%, or at least 100%. Therapeutic efficacy can also be expressed as "-fold" increase or decrease. For example, a therapeutically effective amount can have at least a 1.2-fold, 1.5-fold, 2-fold, 5-fold, or more effect over a control.

The term "diagnosis" refers to a relative probability that a pulmonary disease is present in the subject. Similarly, the term "prognosis" refers to a relative probability that a certain future outcome may occur in the subject. For example, in the context of the present invention, prognosis can refer to the likelihood that an individual will develop a pulmonary disease, or the likely severity of the disease (e.g., severity of symptoms, rate of functional decline, survival, etc.). The terms are not intended to be absolute, as will be appreciated by any one of skill in the field of medical diagnostics.

EXAMPLES

Example 1: Novel Lipid Nanoparticles for In Vivo Lung Targeted mRNA and siRNA Delivery The rapidly expanding utilization of nucleic acids as a therapeutic tool has presented the field with the task of optimizing and innovating delivery methods. Lipid nanoparticles are a common delivery vehicle due to their ability to facilitate cellular uptake while protecting the payload from extracellular enzyme degradation. Organ and tissue specific delivery of sensitive payloads such as mRNA is of great importance in tailoring therapeutic functionality. This is commonly achieved using biomolecular targeting via ligand or receptor expression on the surface of the nanoparticle. However, manipulation of the inherent properties of nanoparticles affords the opportunity to tailor the location of delivery to a specific organ of interest.

Applicants have developed novel lipid nanoparticles that are specifically optimized for use in vivo, and engineered to inherently target and deliver nucleic acid payloads (mRNA and siRNA) to murine lungs and spleen without the use of biomolecular targeting. Development of the lipid nanoparticle was performed using multivariable Design of Experiment modeling, which allowed Applicants to understand and optimize the lipid formulation components and composition. Characterization of the lipid nanoparticles showed uniform size and high encapsulation efficiency. Following multiple design iterations, in vivo functional testing to assess biodistribution identified a novel formulation capable of exclusively targeting lung tissue and achieving highly efficient mRNA transfection. Transfection efficiency was measured following in vivo systemic delivery of a chemically modified luciferase encoding mRNA. Quantification was performed using the IVIS imaging system to measure in vivo and ex vivo bioluminescence measurements.

Example 2: Development of Novel Lipid Nanoparticles for In Vivo Lung Targeted mRNA Delivery Abstract.

The rapidly expanding utilization of mRNA as a therapeutic tool has presented the field with the task of optimizing and innovating delivery methods. As the applications for RNA based therapeutics continues to rise, a parallel emerging need to improve upon and develop novel technology has come to the forefront. Lipid nanoparticles area common delivery vehicle for mRNA due to their ability to facilitate cellular uptake while protecting the mRNA from extracellular enzyme degradation. Organ and tissue specific delivery of mRNA is of great importance in tailoring therapeutic functionality. This is commonly achieved using biomolecular targeting via ligand or receptor expression on the surface of the nanoparticle.

Applicants have developed novel lipid nanoparticles that are specifically optimized for use in vivo, and engineered to inherently target and deliver mRNA to murine lungs and spleen without the use of biomolecular targeting. Development of the lipid nanoparticle was performed using multivariable Design of Experiment modeling, which allowed Applicants to understand and optimize the lipid formulation components and composition. Characterization of the lipid nanoparticles showed uniform size and high encapsulation efficiency. Following multiple design iterations, in vivo functional testing to assess biodistribution identified a novel formulation capable of exclusively targeting the lung tissue and achieving highly efficient mRNA transfection. Transfection efficiency was measured following in vivo systemic delivery of a chemically modified luciferase encoding mRNA. Quantification was performed using the IVIS imaging system to measure in vivo and ex vivo bioluminescence measurements. Lung specific expression levels could be modulated by varying the dose of mRNA, and significant protein expression was sustained over the course of 48 hours following a single administration. This novel lipid nanoparticle is well tolerated in vivo, with no qualitative gross toxicity, and quantitatively analyzed by a comprehensive cytokine profiling performed on murine serum samples. Further optimization of biodistribution to achieve exclusive targeting to the lung is currently underway, and preliminary data indicates that variance in charge ratio enhances delivery and expression exclusively to the lung, and depletes expression in other organs.

Introduction

Due to the unstable nature of mRNA, protection against degradation during the delivery phase is a serious challenge to overcome in the field of mRNA therapeutics. Applicants have developed efficient lipid nanoparticle (LNP) systems that encapsulate and protect the mRNA from degradation and clearance in the blood; thus translating to improved efficacy and reduced toxicity in vivo. Optimization of Applicant's LNP systems has maximized delivery efficiency with organ specific uptake patterns such as the lung and spleen via intravenous delivery.

Materials and Methods.

Figure 1B:
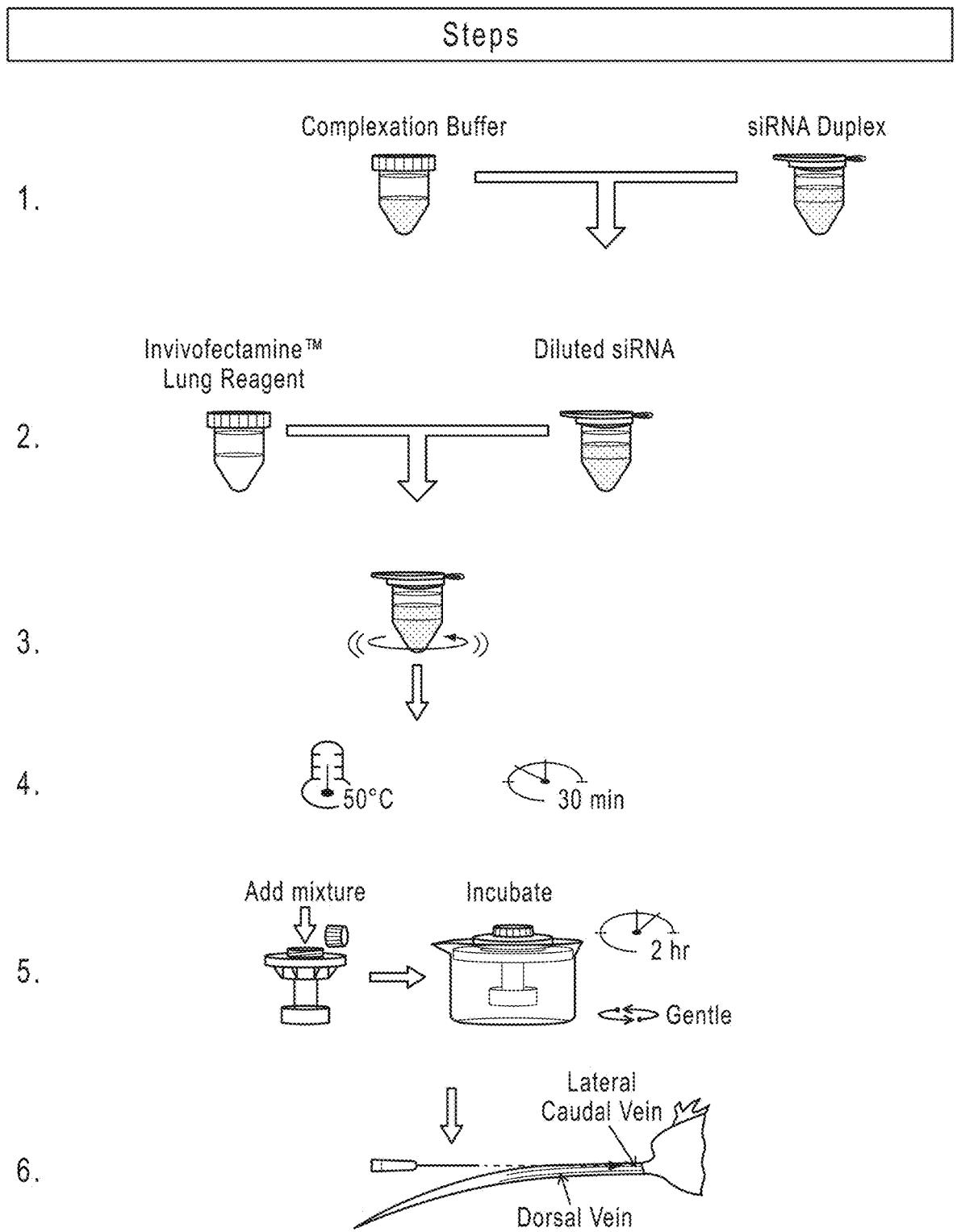

Based on mixture Design of Experiment optimization, new LNP formulations were made, complexed with mRNA using the previously developed protocol shown in FIGS. 1A-1C, and the subsequent LNPs were screened for delivery in vivo using a luciferase readout. Top performing formulations were then used to model and predict second generation formulations for optimized tissue specific expression. These new formulations were then tested in vivo to identify the best LNP formulation.

Figure 2:
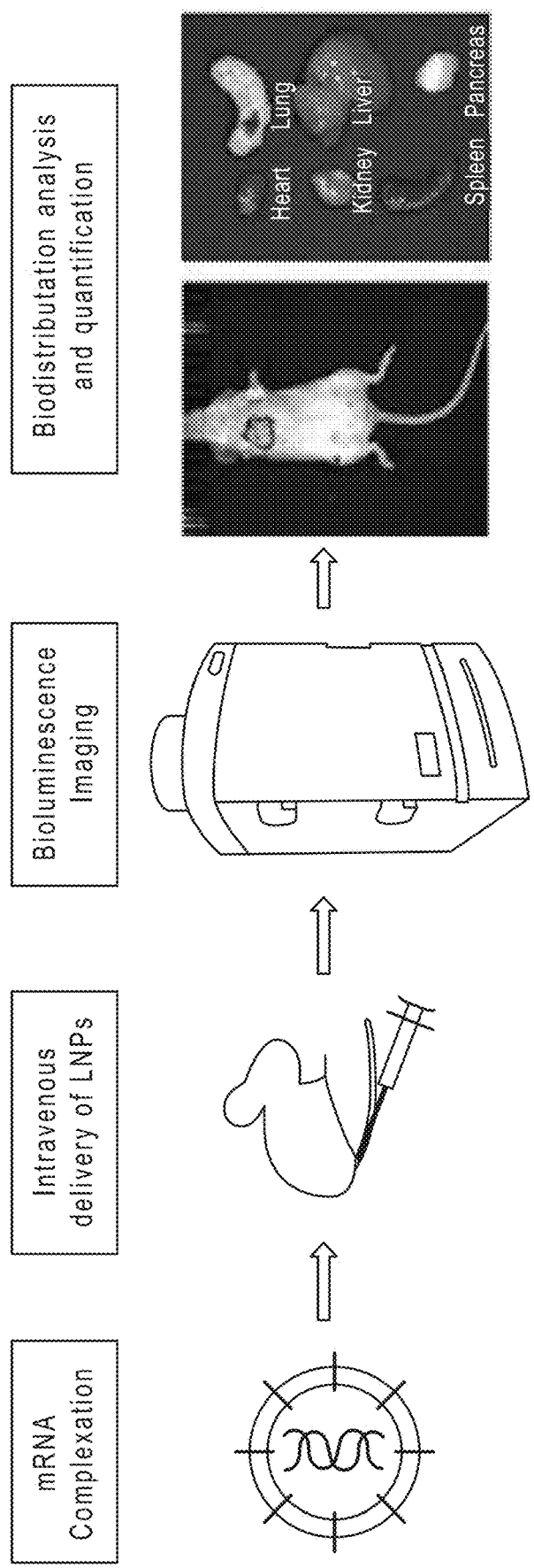
FIG. 2. In vivo luciferase assay workflow for LNP testing.

Firefly Luciferase mRNA was complexed with each LNP formulation and injected intravenously (FIG. 2). Following 4 hours incubation, Luciferin substrate was injected IP, and luciferase expression was measured in vivo and ex vivo via the IVIS Lumina LT. Bioluminescence (p/sec/cm^2/sr) was quantified with Living Image® Software (FIG. 2).

Results.

Figure 3A:
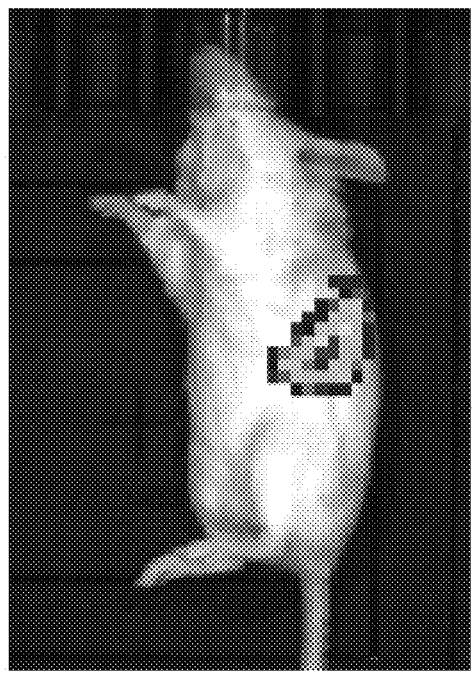
FIGS. 3A-3E. Systemic delivery of LNPs results in varied biodistribution patterns. Whole animal in vivo imaging revealed organ specific biodistribution patterns.
Figure 3B:
Figure 3C:
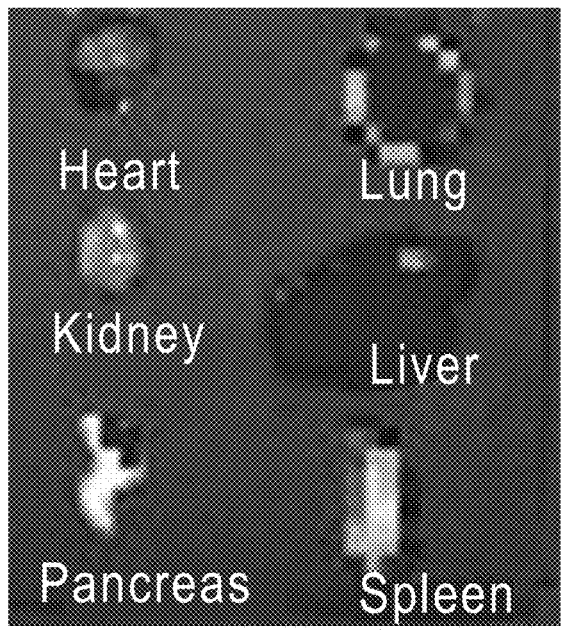
Figure 3D:
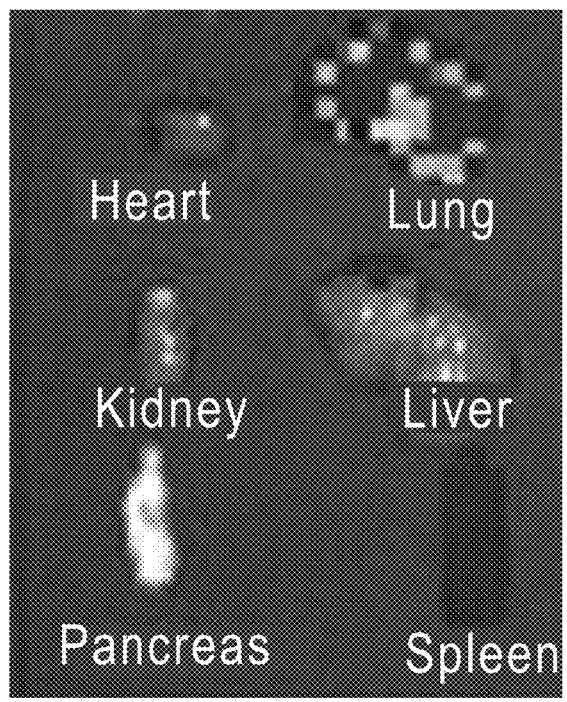
Figure 3E:
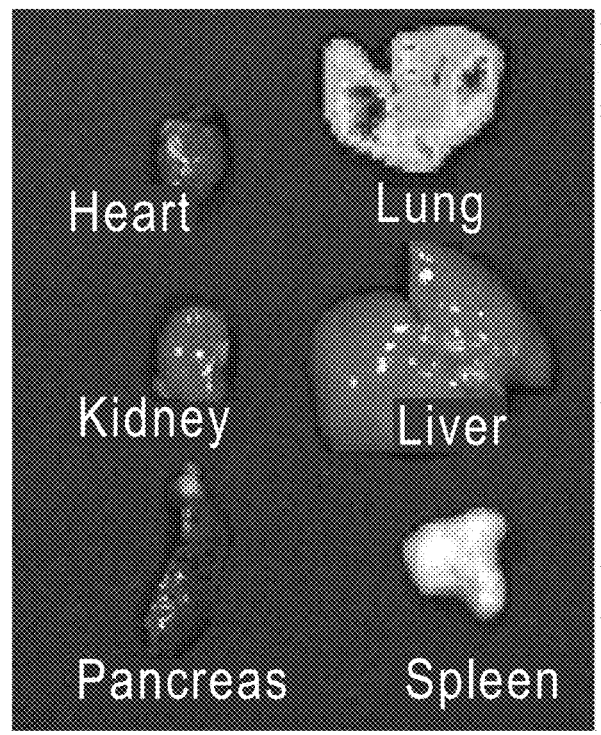

First pass screening of LNPs revealed organ specific delivery patterns based on formulation composition or N/P ratio variance. Whole animal in vivo imaging indicated organ specific patterns (FIGS. 3A-3B), and ex vivo analysis allowed for extensive evaluation of biodistribution patterns (FIG. 3C-3E). Using the performance data from the first generation of LNPs, expression was optimized using DoE design to maximize tissue specific performance, focusing mainly on enhancement of expression in the spleen and lung.

Figure 4A:
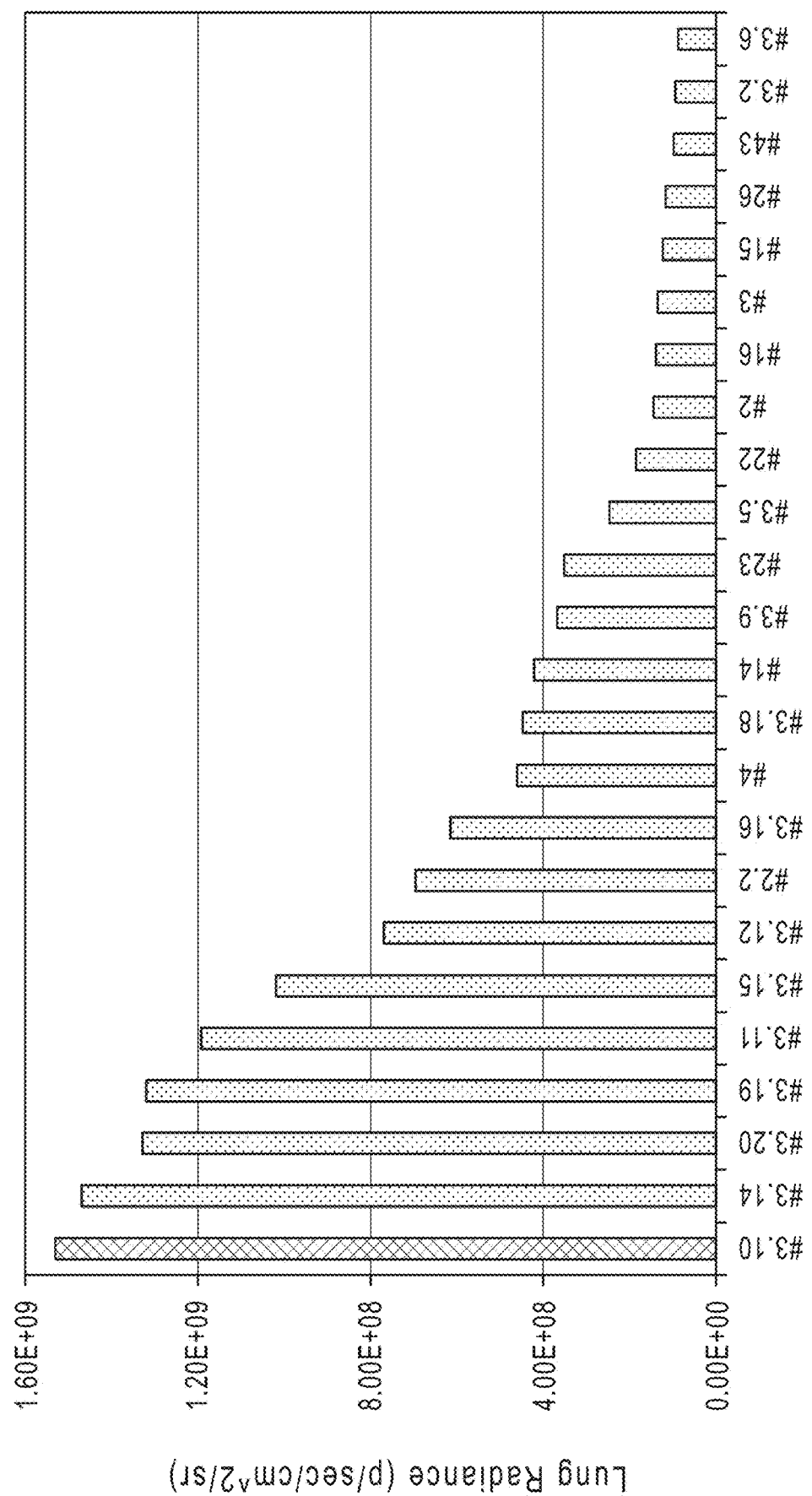

Over 100 new LNP formulations, spanning 3 generations of optimization were screened for performance. For screening, mRNA encoding for firefly luciferase was complexed with each newly designed formulation and injected intravenously. Ex vivo quantification of bioluminescence signal in isolated lung tissue (FIG. 4A) or isolated spleen tissue (FIG. 4B) from BALB/c mice, 4-hrs post IV injection is summarized in the graphs. The bioluminescence (p/sec/cm^2/sr) was quantified using Living Image® Software.

Figure 5A:
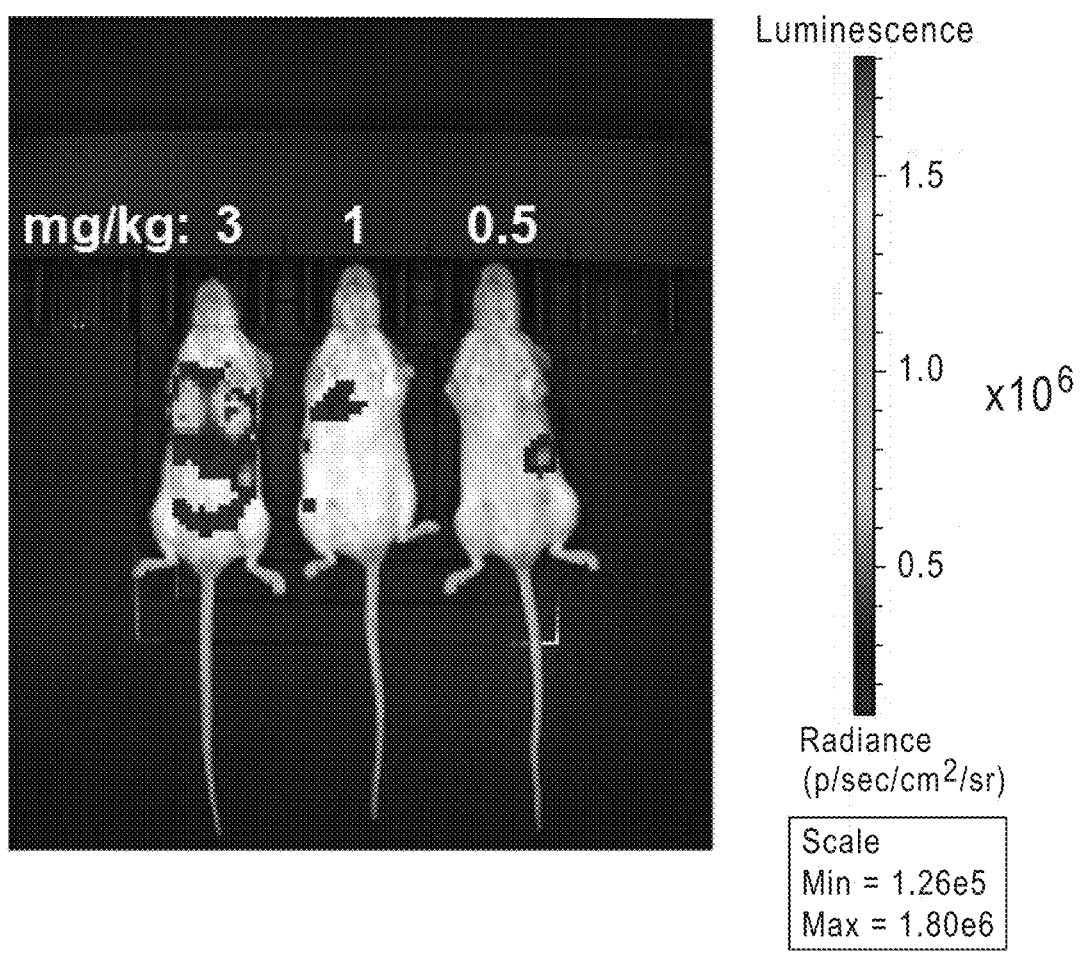
FIGS. 5A-5C. Dose dependent protein expression.
Figure 5B:
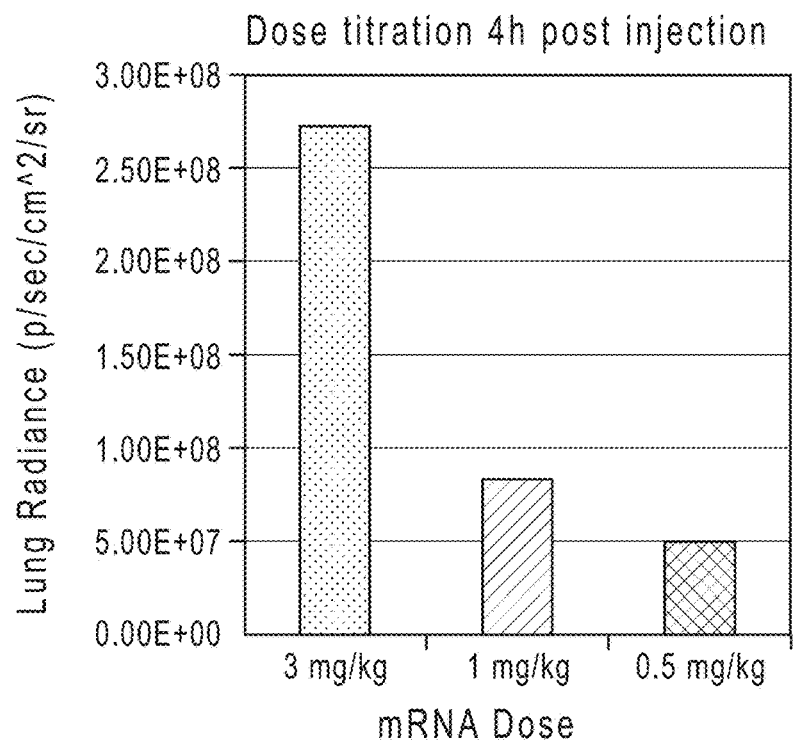
Figure 5C:
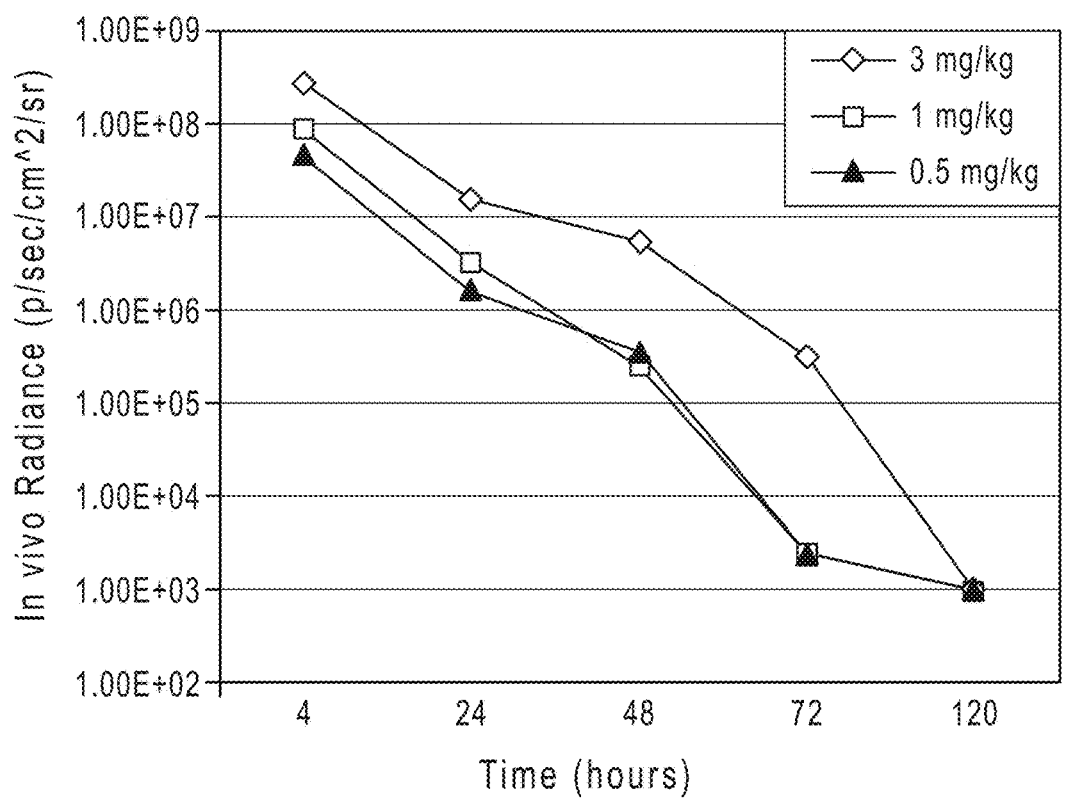

Dose titration of mRNA was performed, and luciferase expression was used as a readout to measure protein expression. Mice were injected at Time 0h, and imaged over the course of 120 hours (5 days). In vivo images, and corresponding quantification at 4 hours is shown in FIGS. 5A-5B. Sustained luciferase activity measurement were repeated over the duration of the experiment on the same mice; measurements were taken using the whole body in vivo imaging technique which is reflected by the lower starting signal values compared to ex vivo measurements. The bioluminescence (p/sec/cm^2/sr) was quantified using Living Image® Software and is summarized in the graph in FIG. 5C.

Figure 6A:
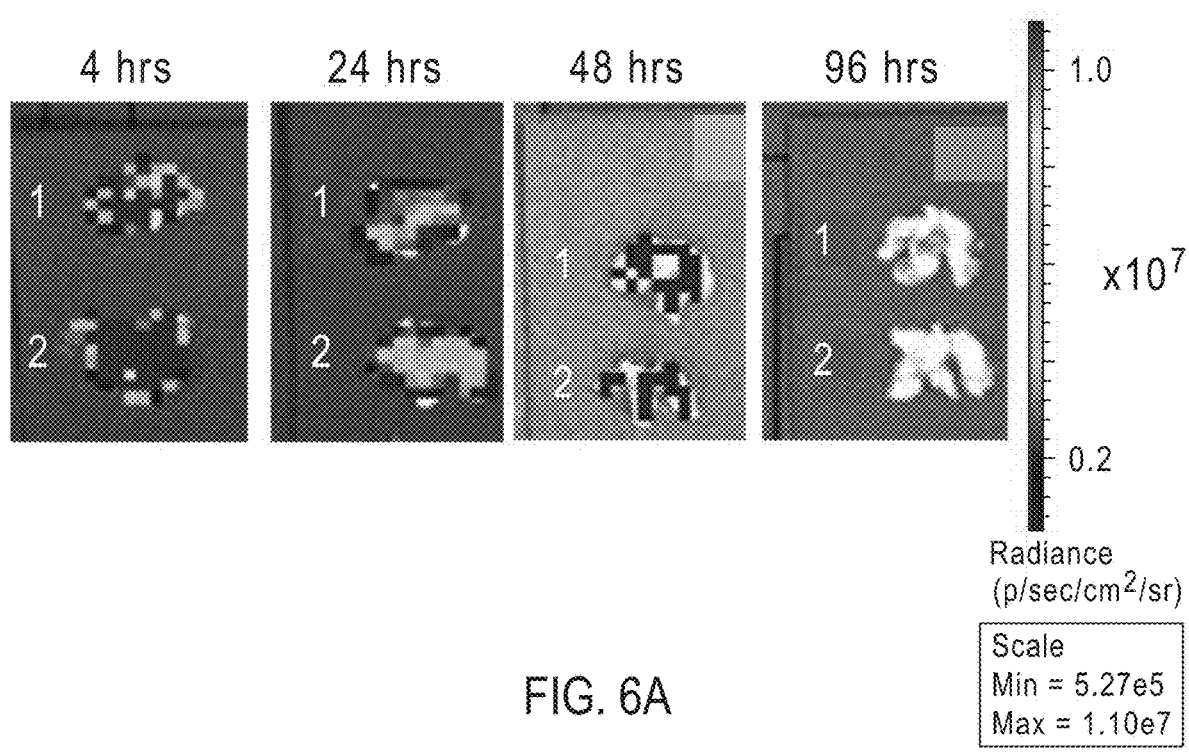
FIGS. 6A-6C. Time course of protein expression.
Figure 6B:
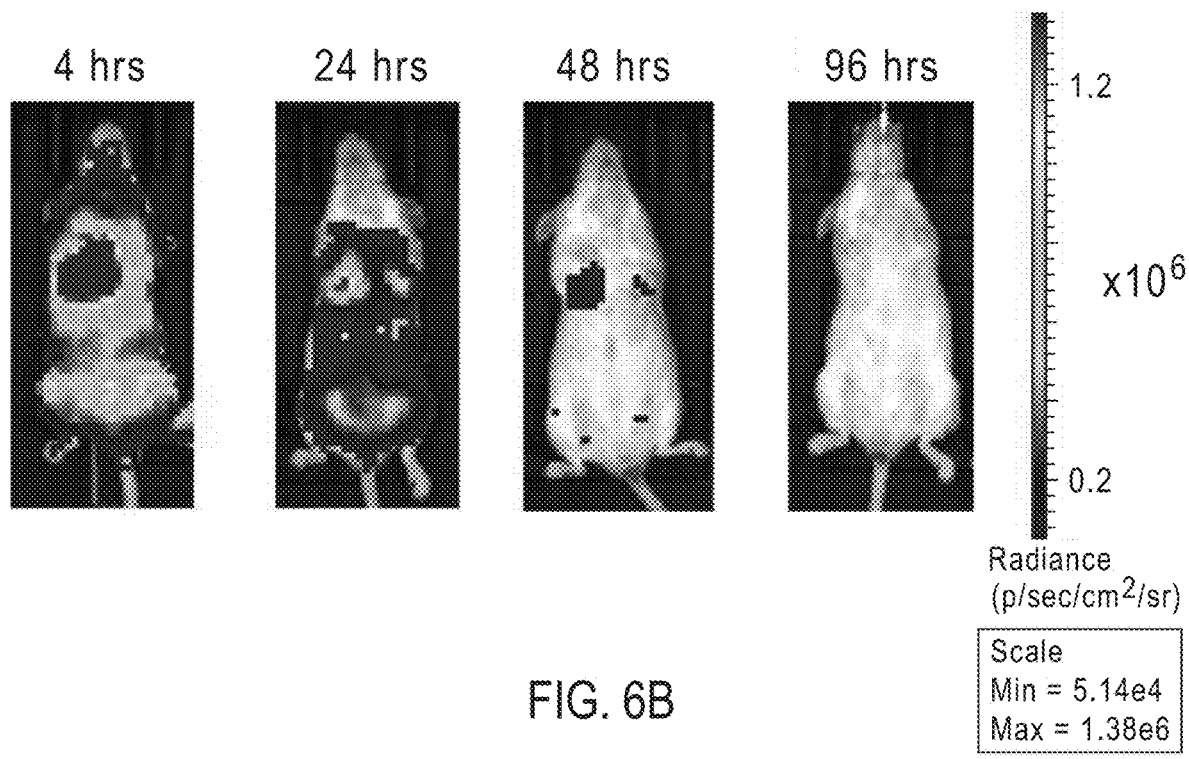
Figure 6C:
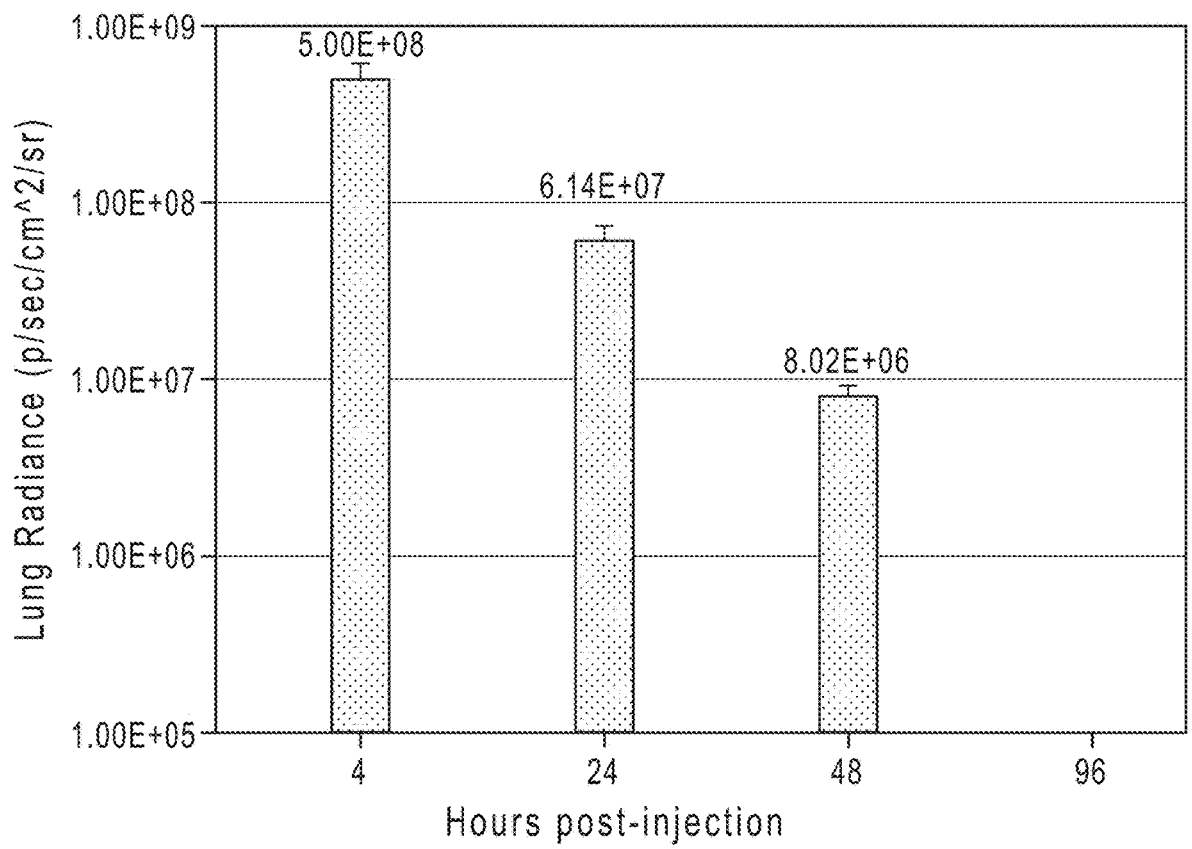
Figure 7A:
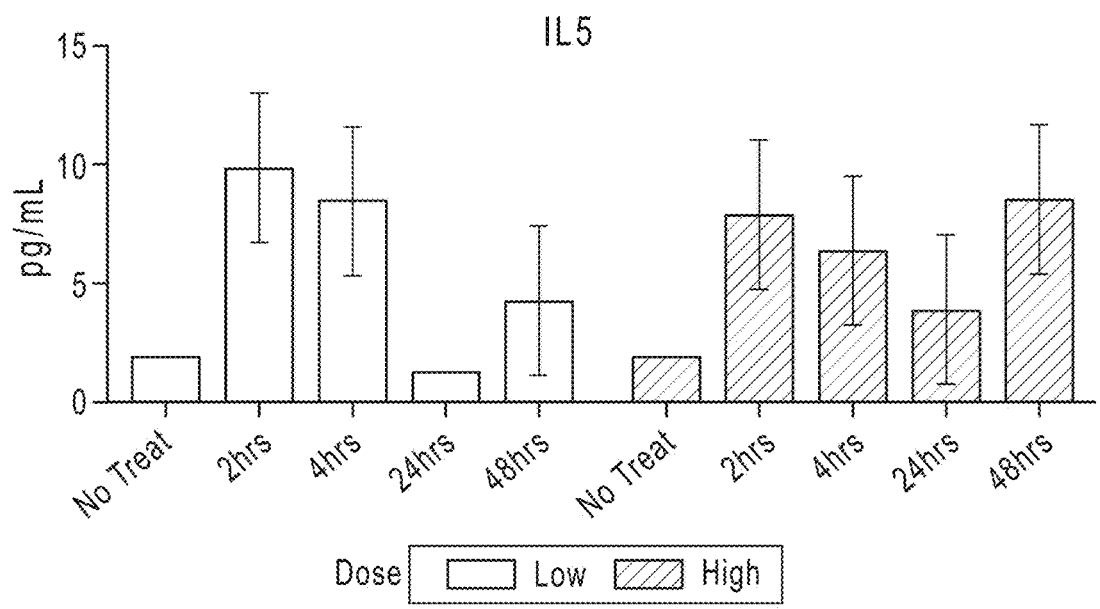
FIGS. 7A-7J. Toxicity-Cytokine panel. Quantification of circulating cytokine levels in mouse serum at 2 hrs, 4 hrs, 24 hrs and 48 hrs post-injection under two mRNA dose conditions: low (1 mg/kg) and high (3 mg/kg).
Figure 7B:
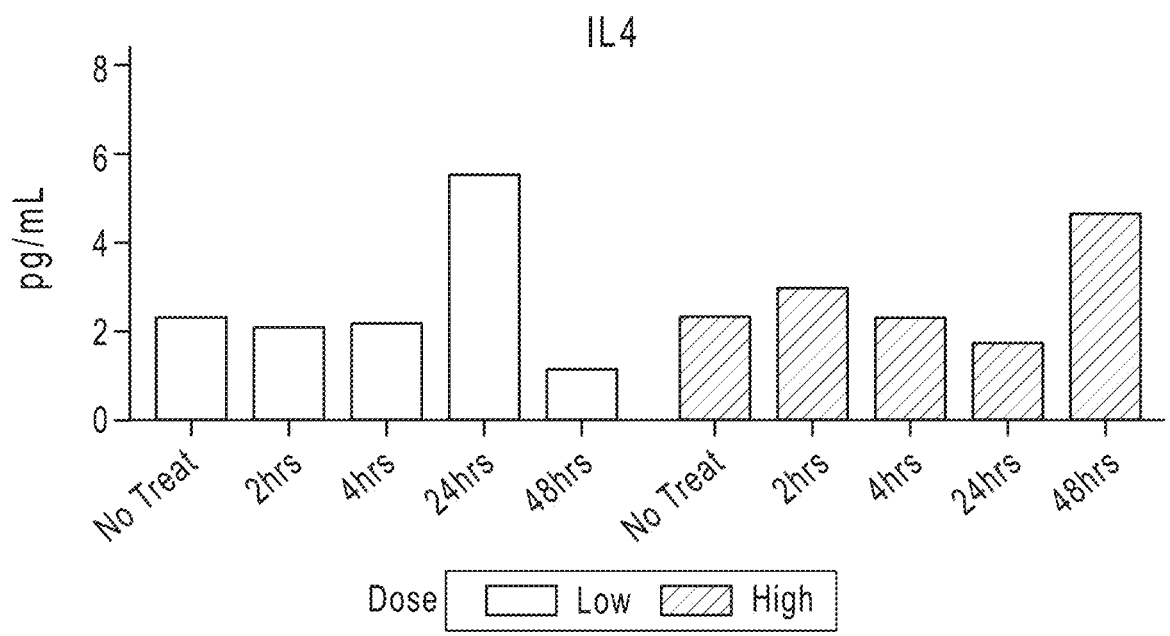
Figure 7C:
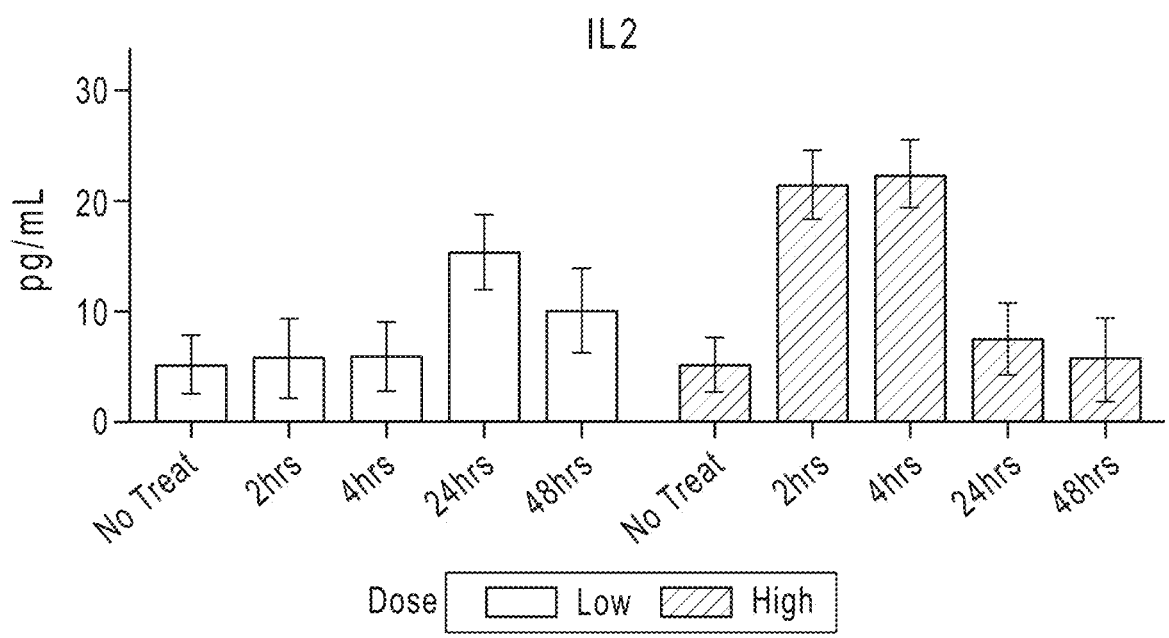
Figure 7D:
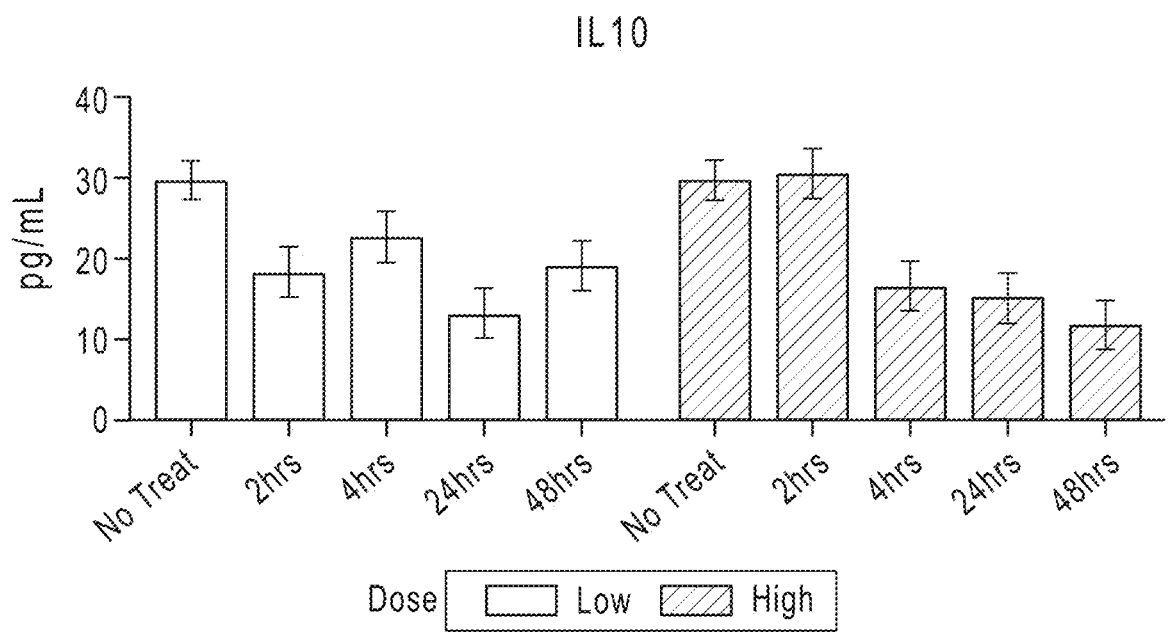
Figure 7E:
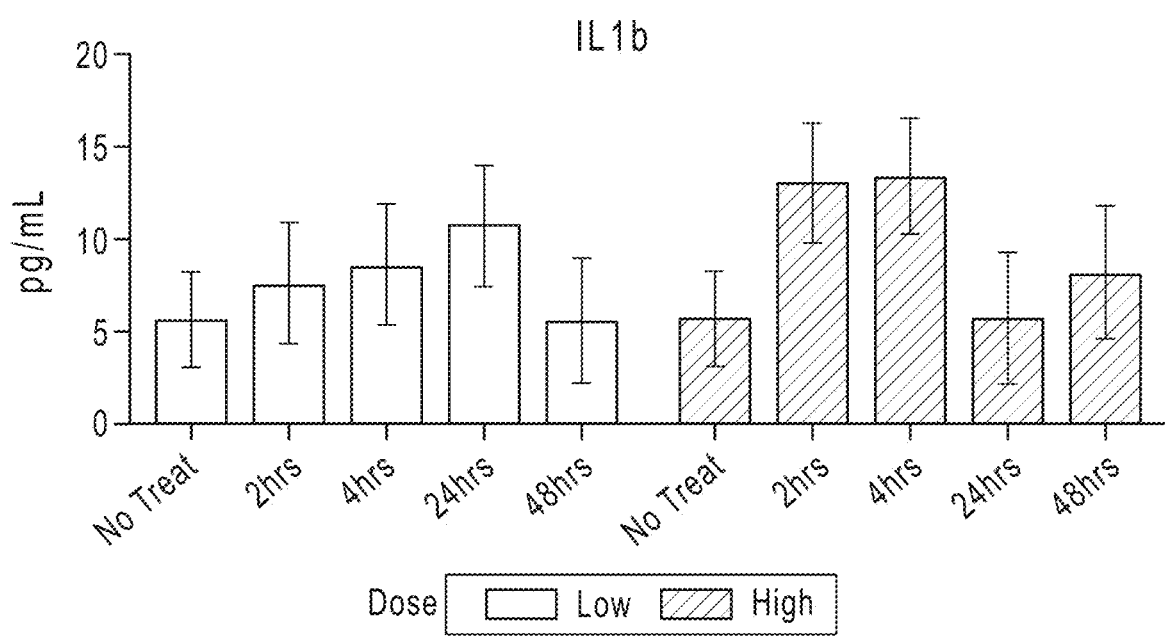
Figure 7F:
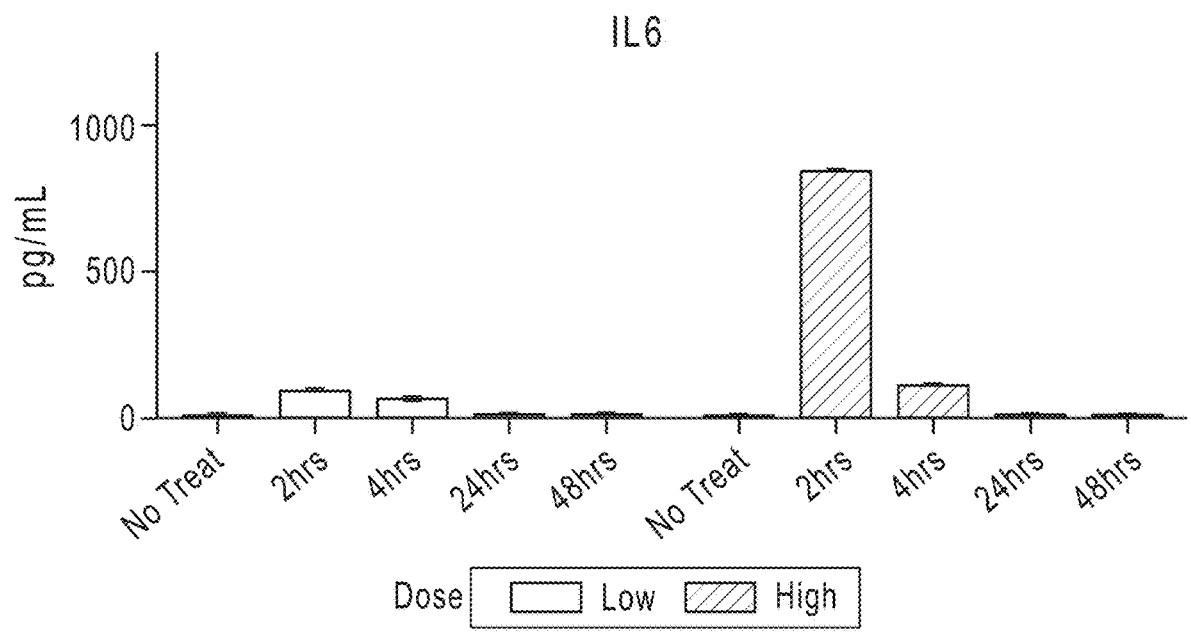
Figure 7G:
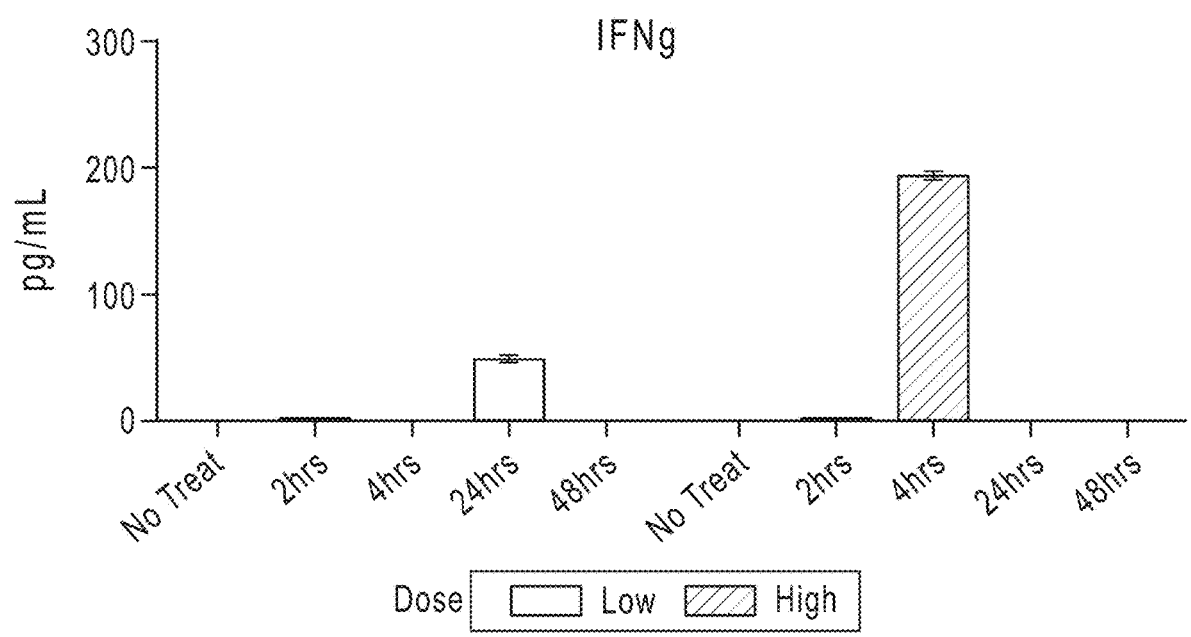
Figure 7H:
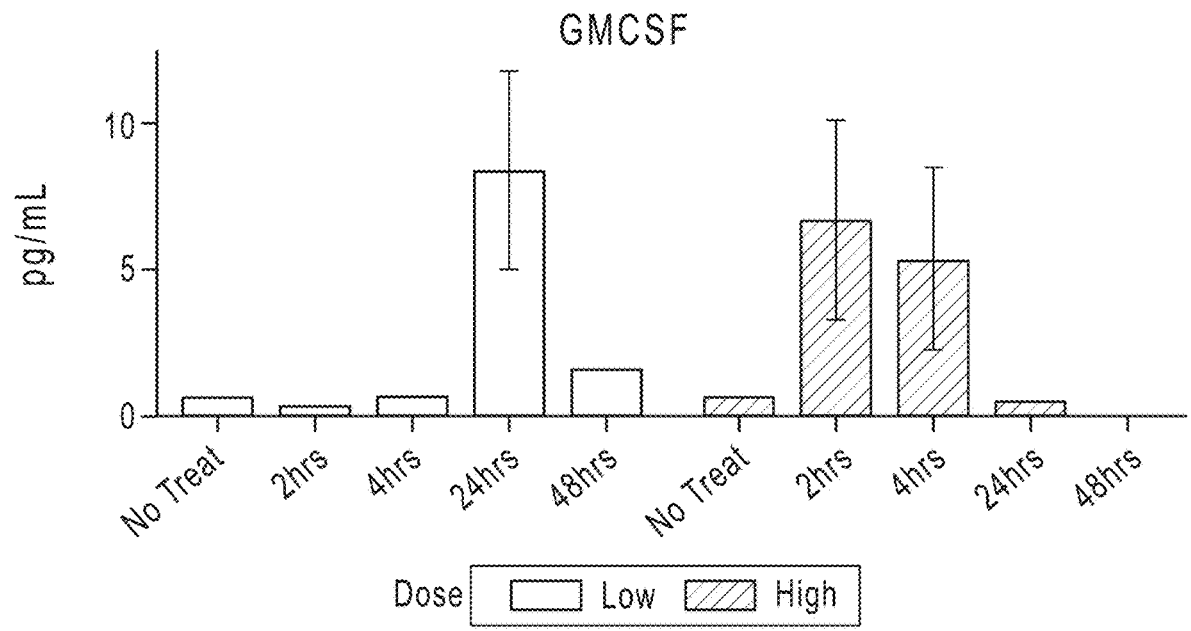
Figure 7I:
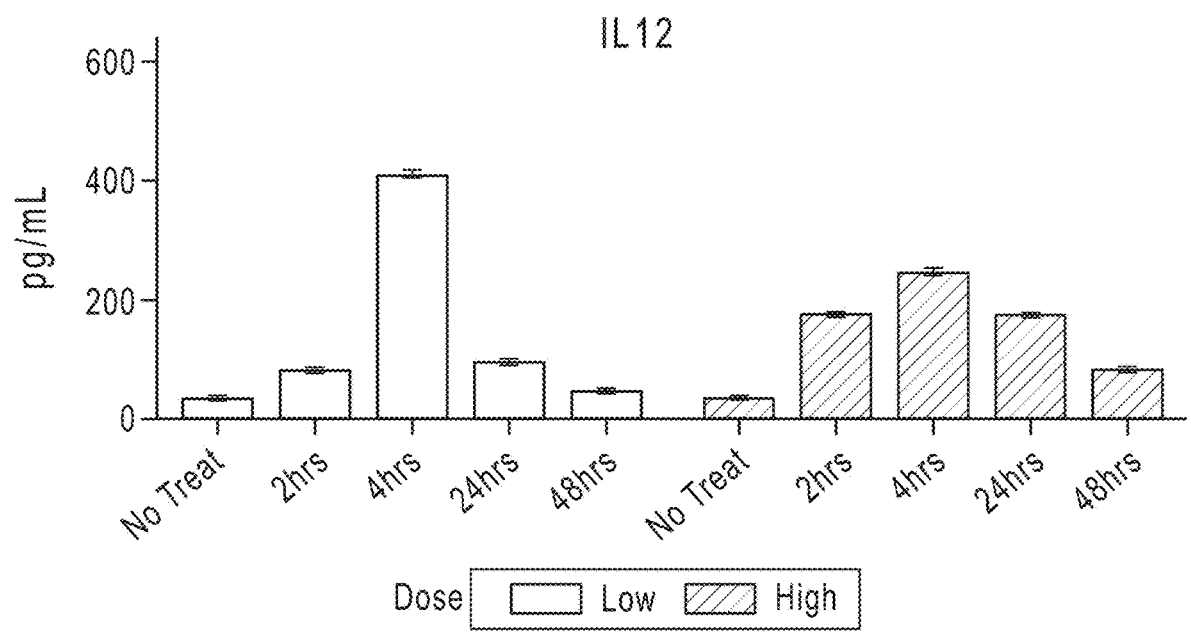
Figure 7J:
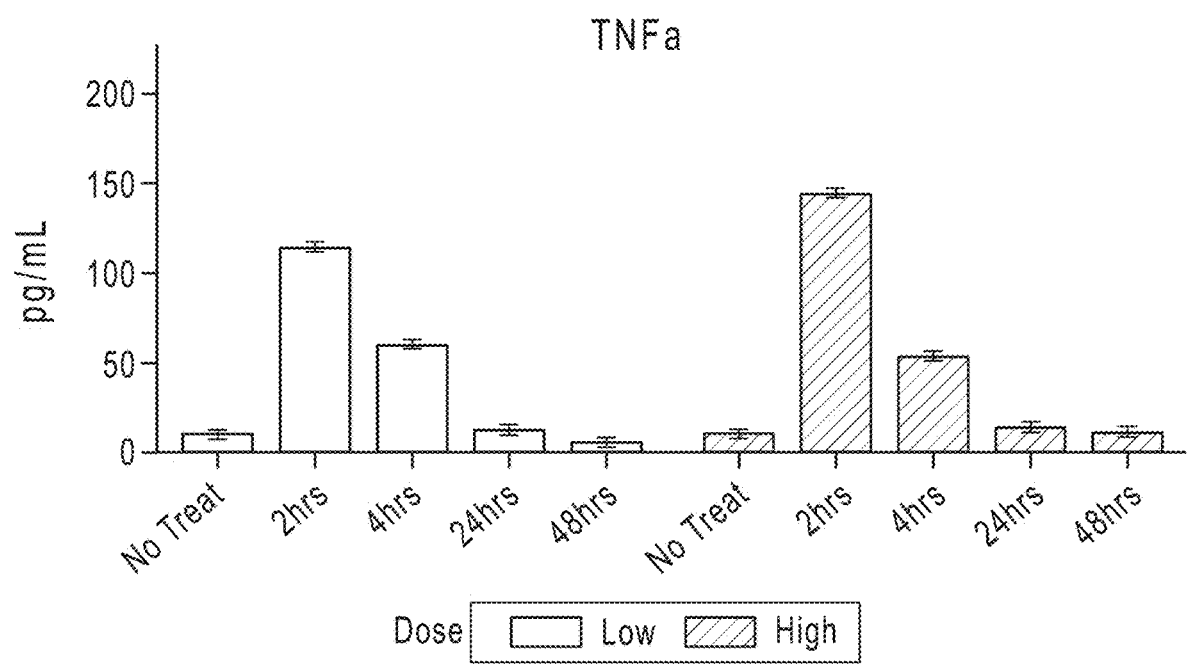

Following optimization of mRNA dose, a time course of luciferase expression levels was performed and performance was measured following removal of the lung tissue and performing ex vivo measurements over the course of 96 hours (FIGS. 6A-6C). Mice were injected intravenously with the LNPs, whole body imaging was performed at each specified time point, and then ex vivo measurements were obtained on isolated lung tissue.

Quantification of circulating cytokine levels in mouse serum at 2 hrs, 4 hrs, 24 hrs and 48 hrs post-injection under two mRNA dose conditions: low (1 mg/kg) and high (3 mg/kg) (FIGS. 7A-7J).

Figure 8A:
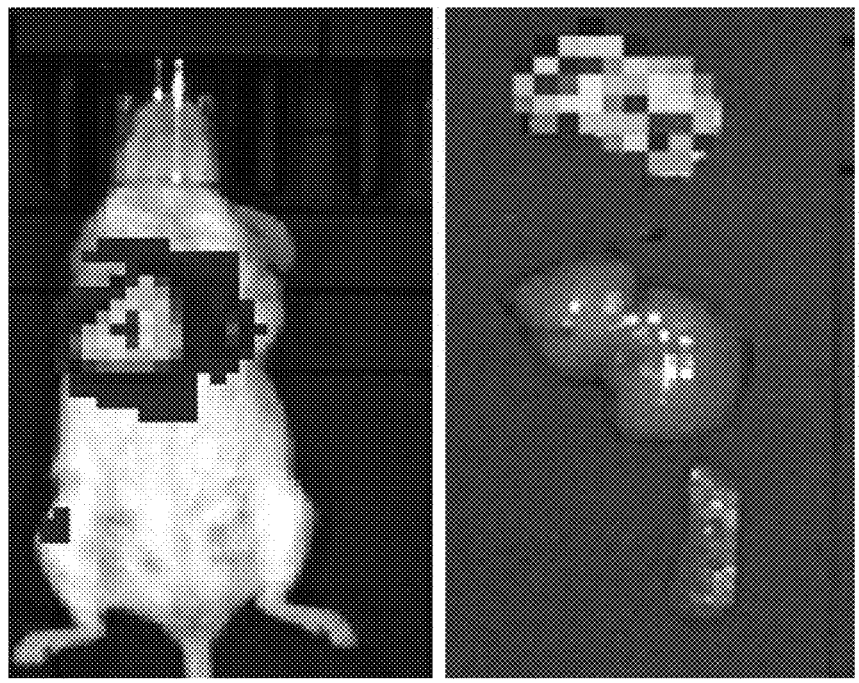
FIGS. 8A-8B. N/P ratio variance allows for tailoring of mRNA delivery and expression, resulting in exclusive tissue expression patterns. In vivo whole animal and ex vivo isolated organ imaging indicates varying N/P ratio can lead to exclusion of protein expression from certain organs resulting in specific expression in the lung (FIG. 8A) or spleen (FIG. 8B).
Figure 8B:
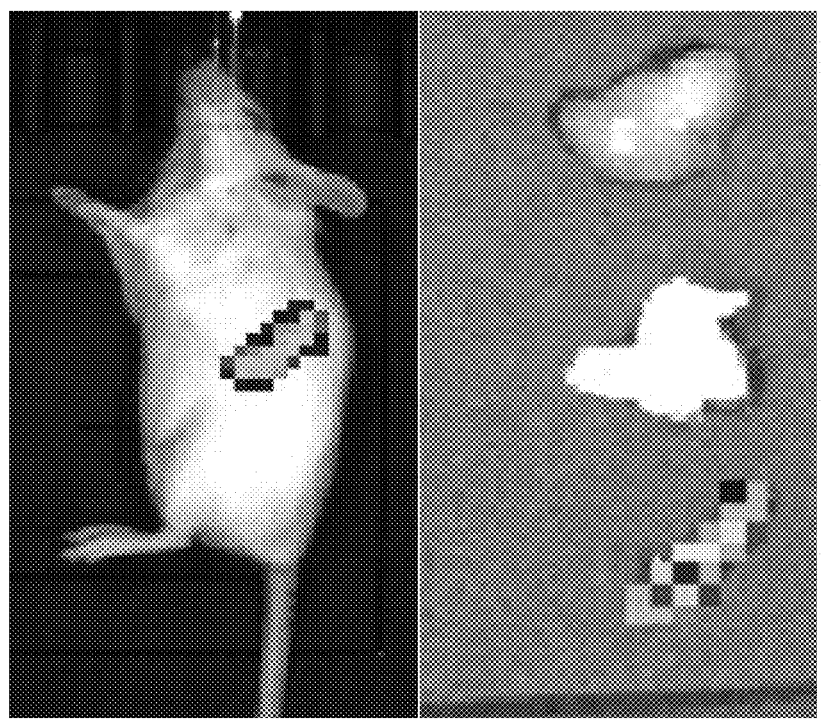
Figure 9:
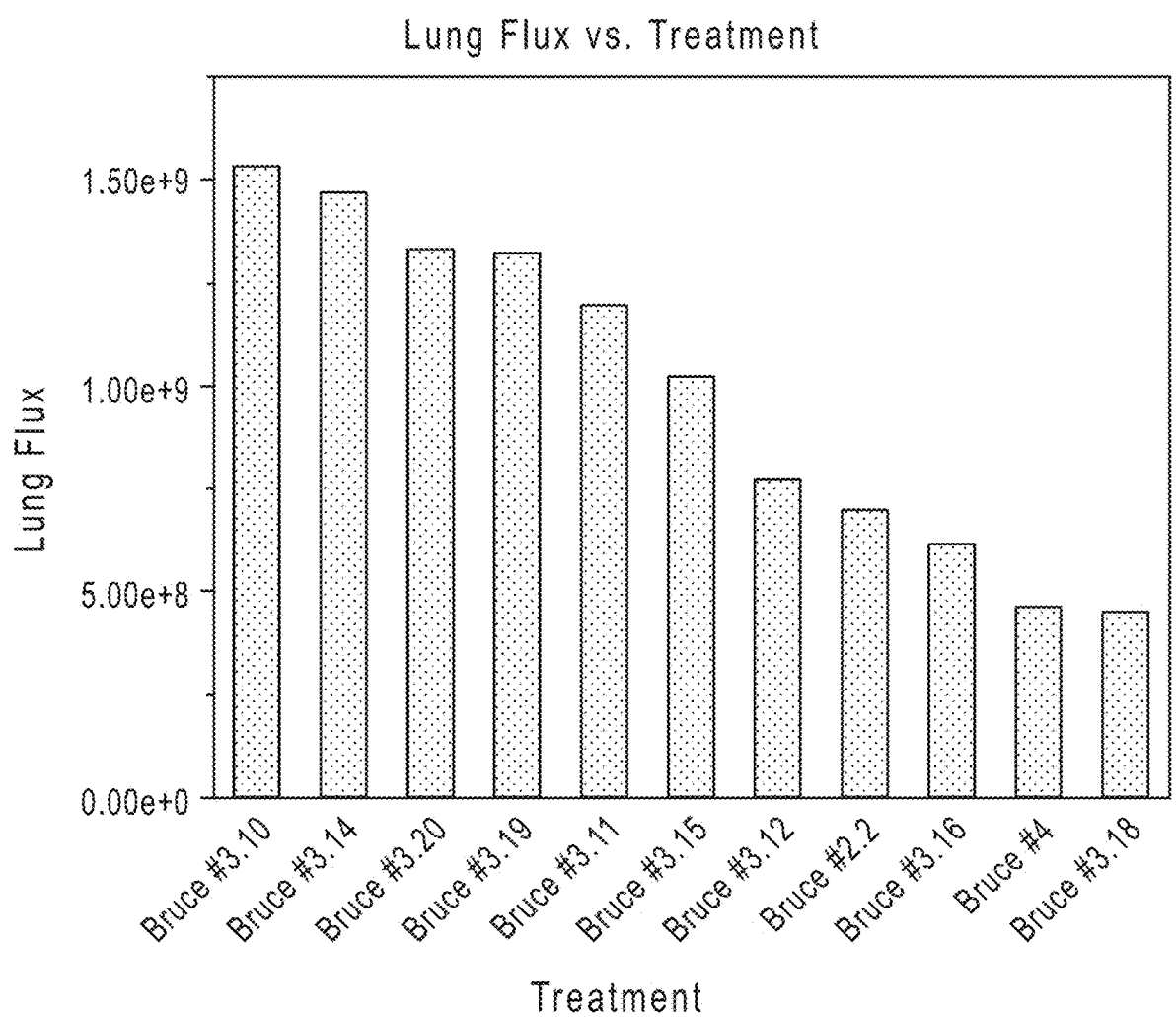
FIG. 9. Lung delivery quantification assay: Luciferase assay.
Figure 10A:
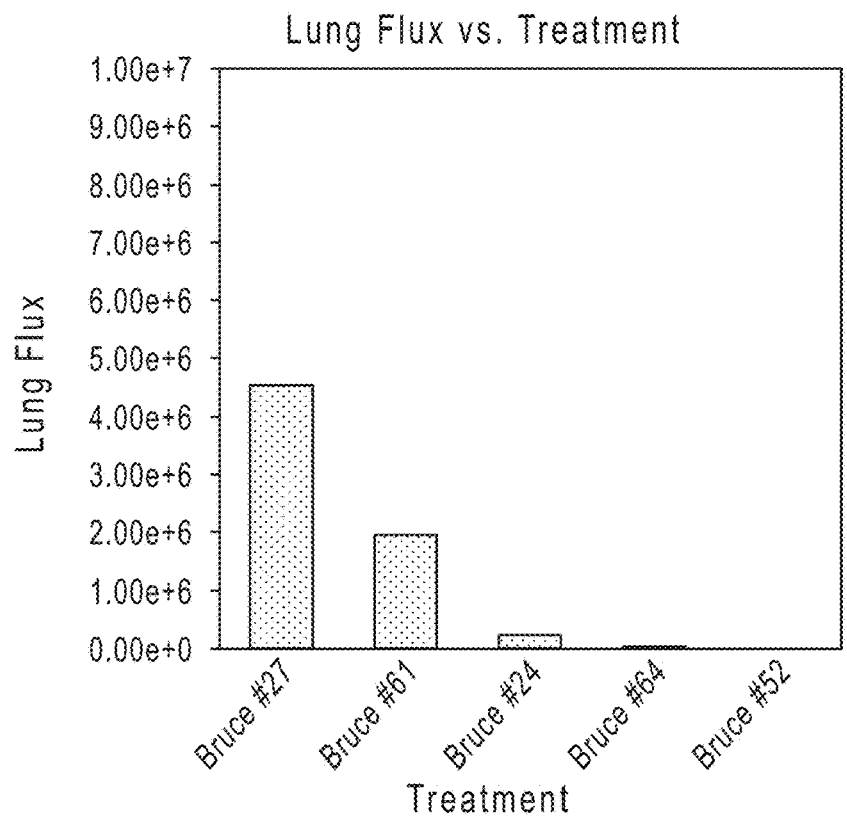
FIGS. 10A-10B. Low performance formulations. Luciferase activity of low performance formulations with (FIG. 10B) and without (FIG. 10A) the best formulation as a benchmark to compare.
Figure 10B:
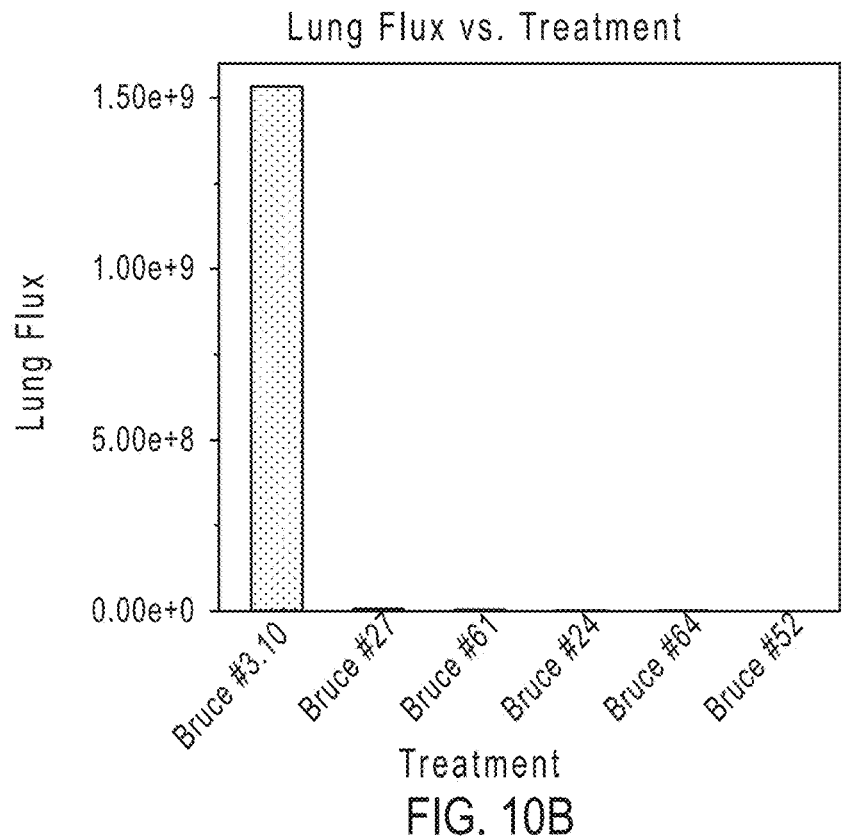
Figure 11A:
FIGS. 11A-11F. Jet PEI® vs Bruce #3.14. In vivo whole animal imaging shows Bruce #3.14 lipid nanoparticle formulation has specific biodistribution patterns (FIG. 11A) compared with Jet PEI® (FIG. 11B). Ex vivo isolated organ tissue imaging also demonstrates that Bruce #3.14 lipid nanoparticle formulation has specific biodistribution patterns (FIG. 11C) compared with Jet PEI® (FIG. 11D).
Figure 11B:
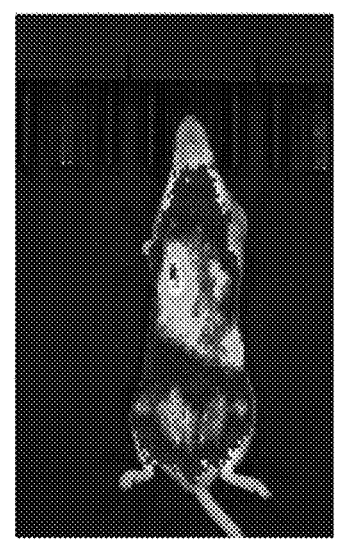
Figure 11C:
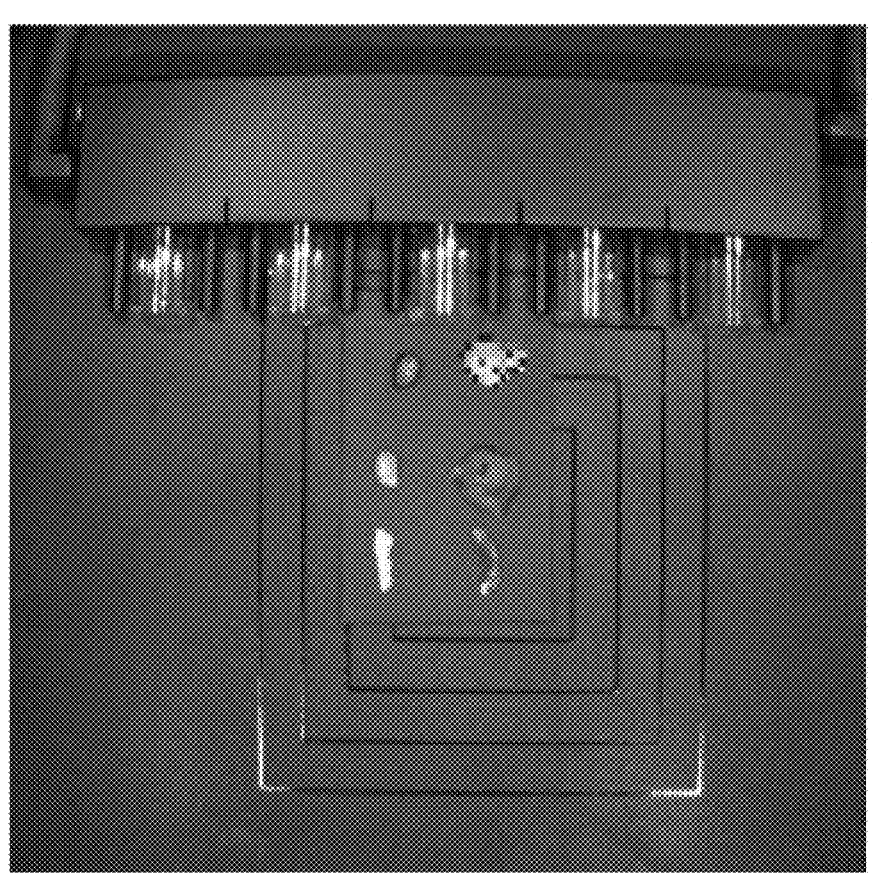
Figure 11C:
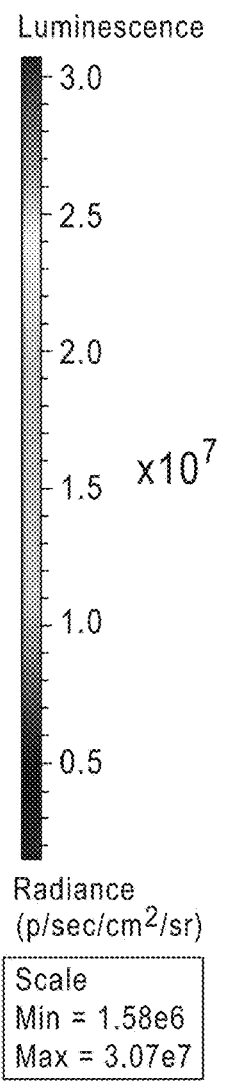
Figure 11D:
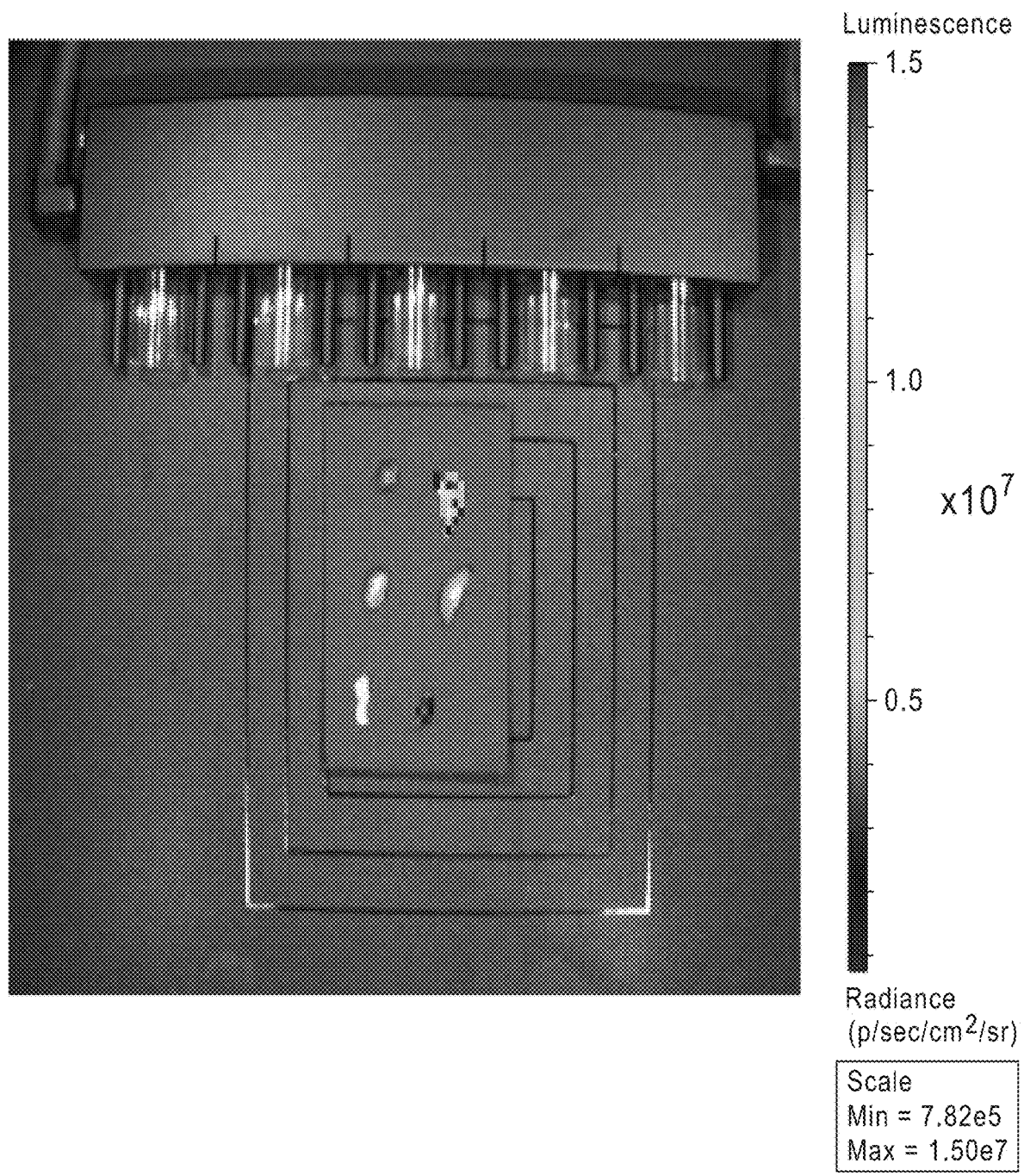
Figure 11E:
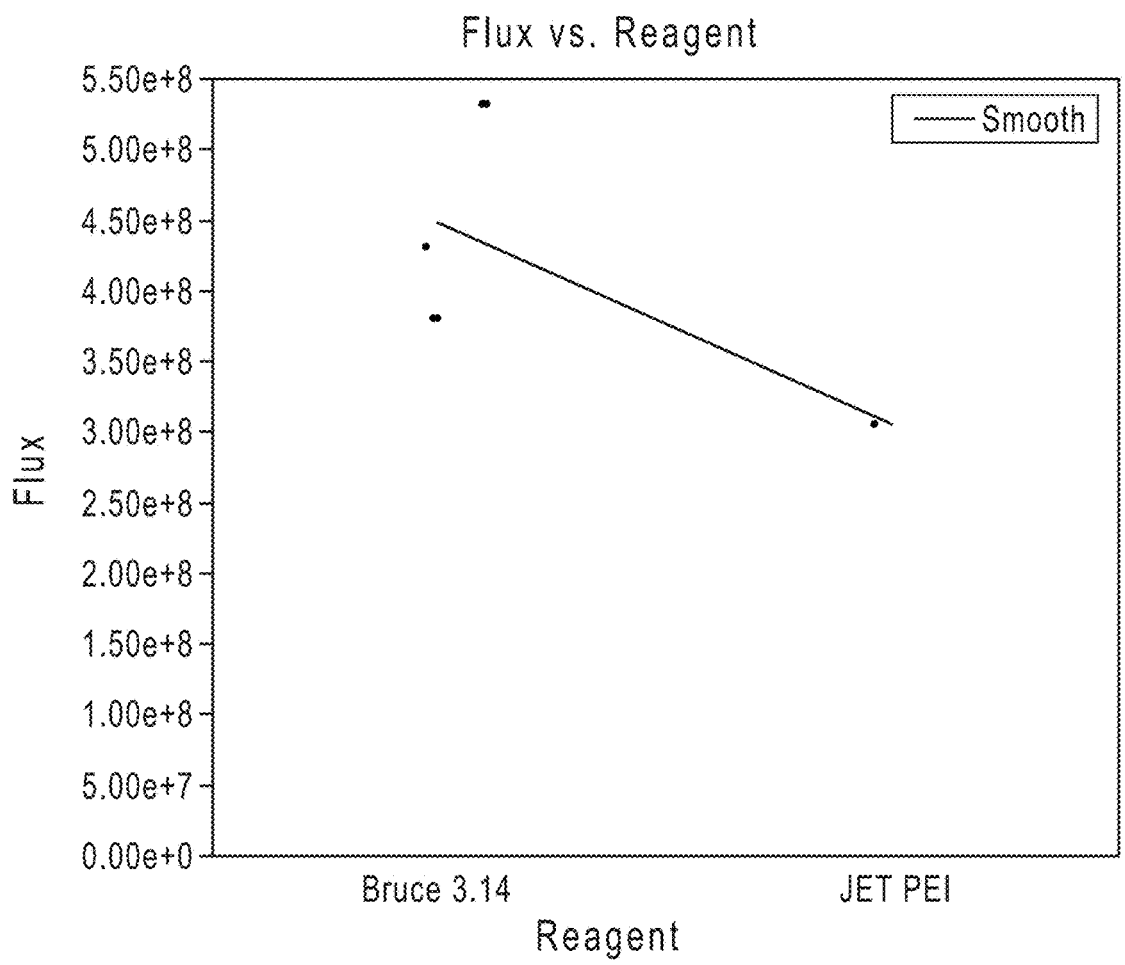
Figure 11F:
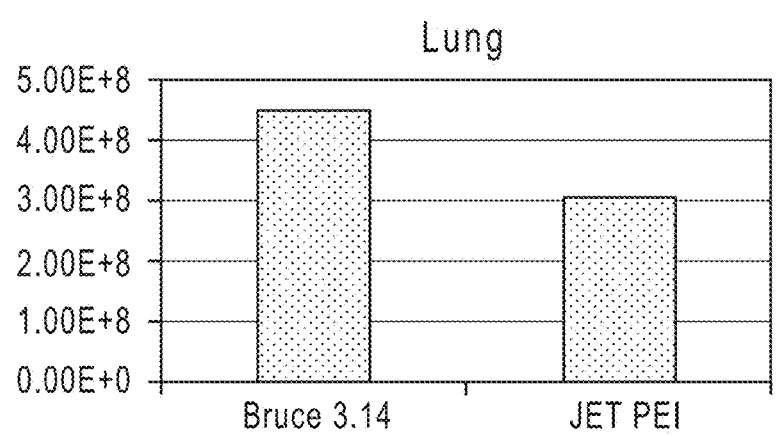
Figure 12A:
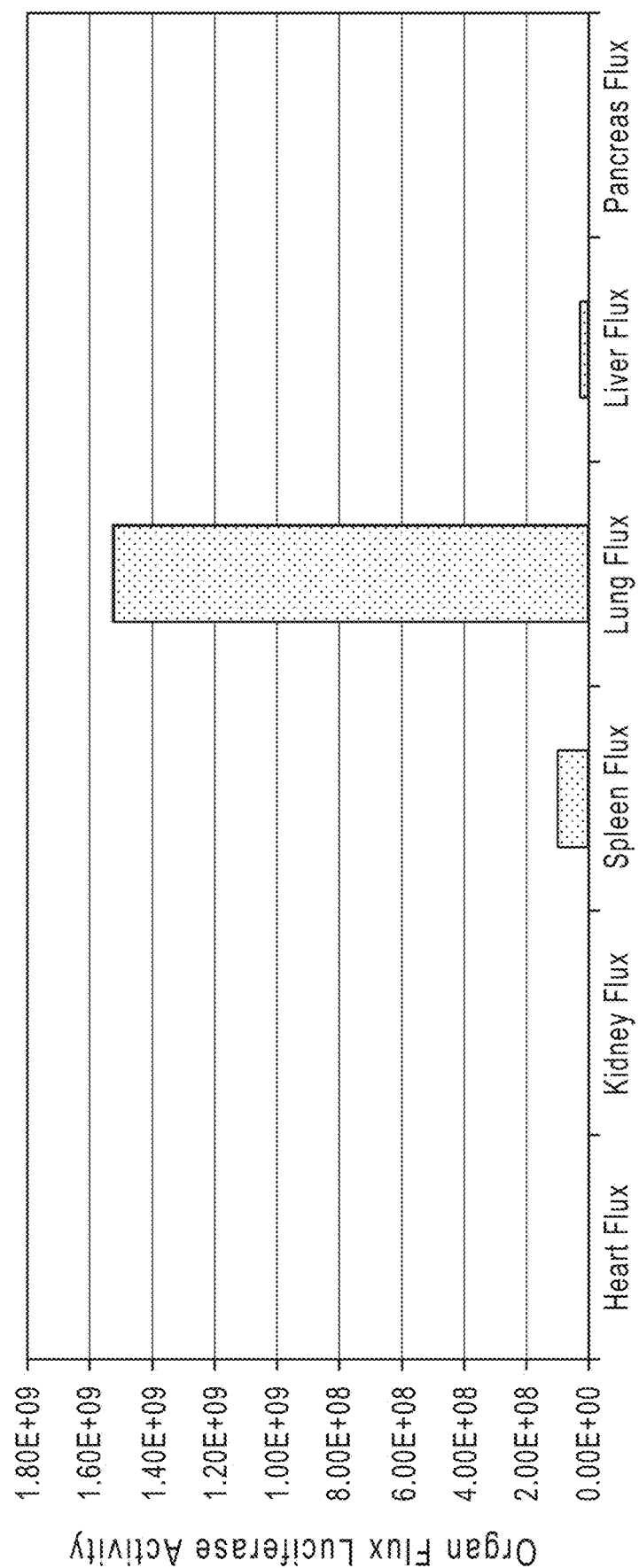
FIGS. 12A-12C. Formulation #3.10 treatment.
Figure 12B:
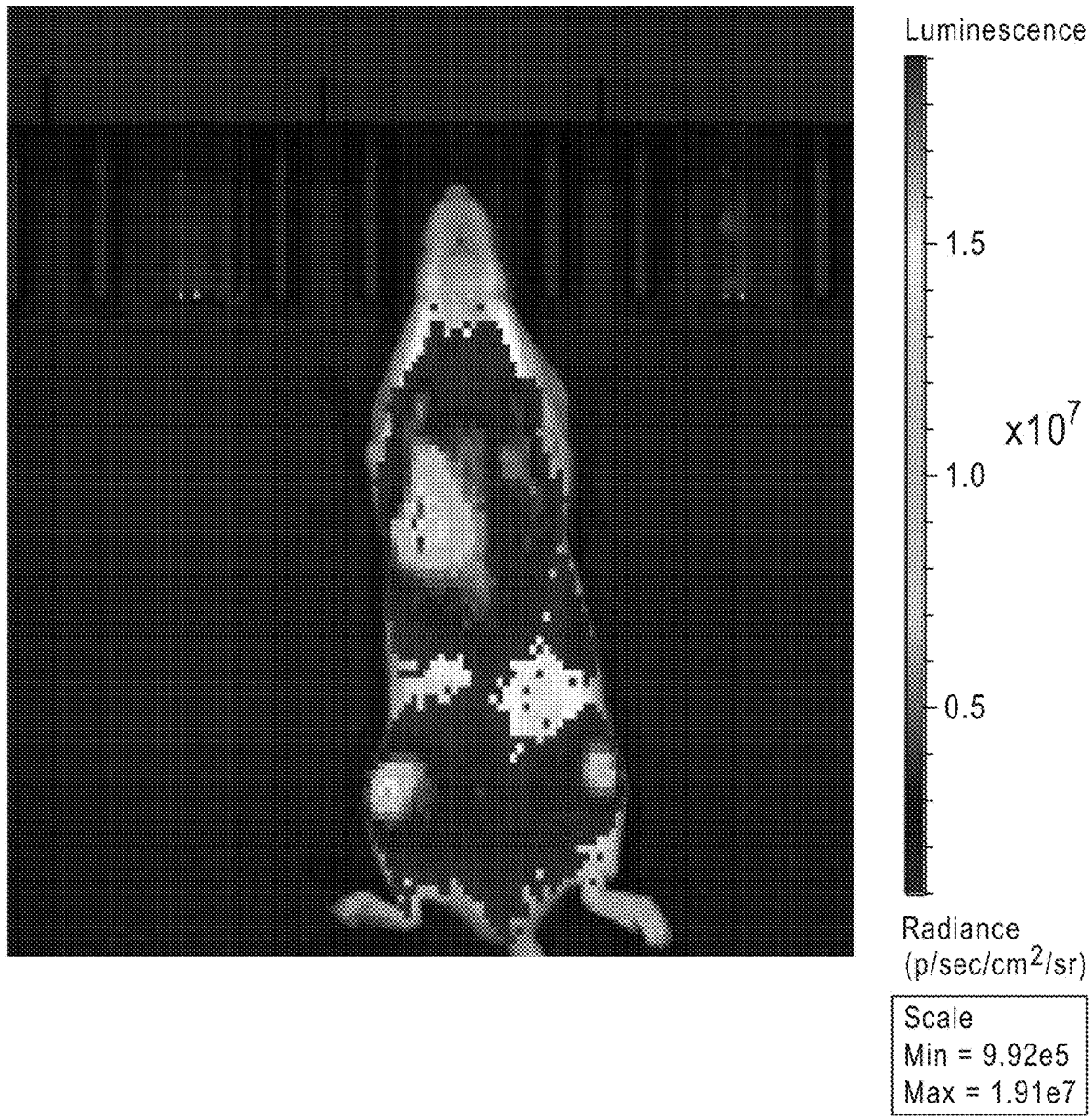
Figure 12C:
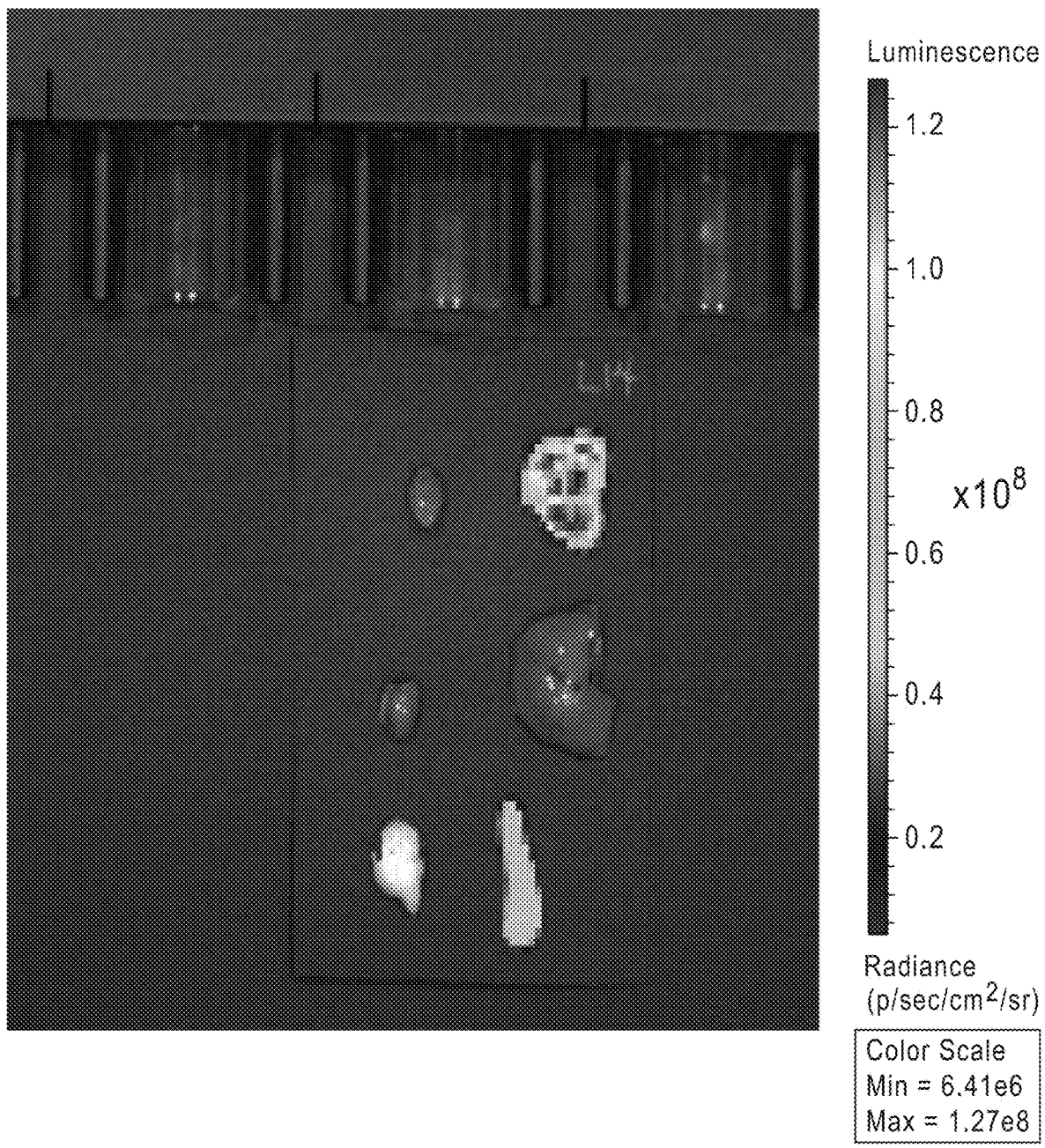
Figure 13A:
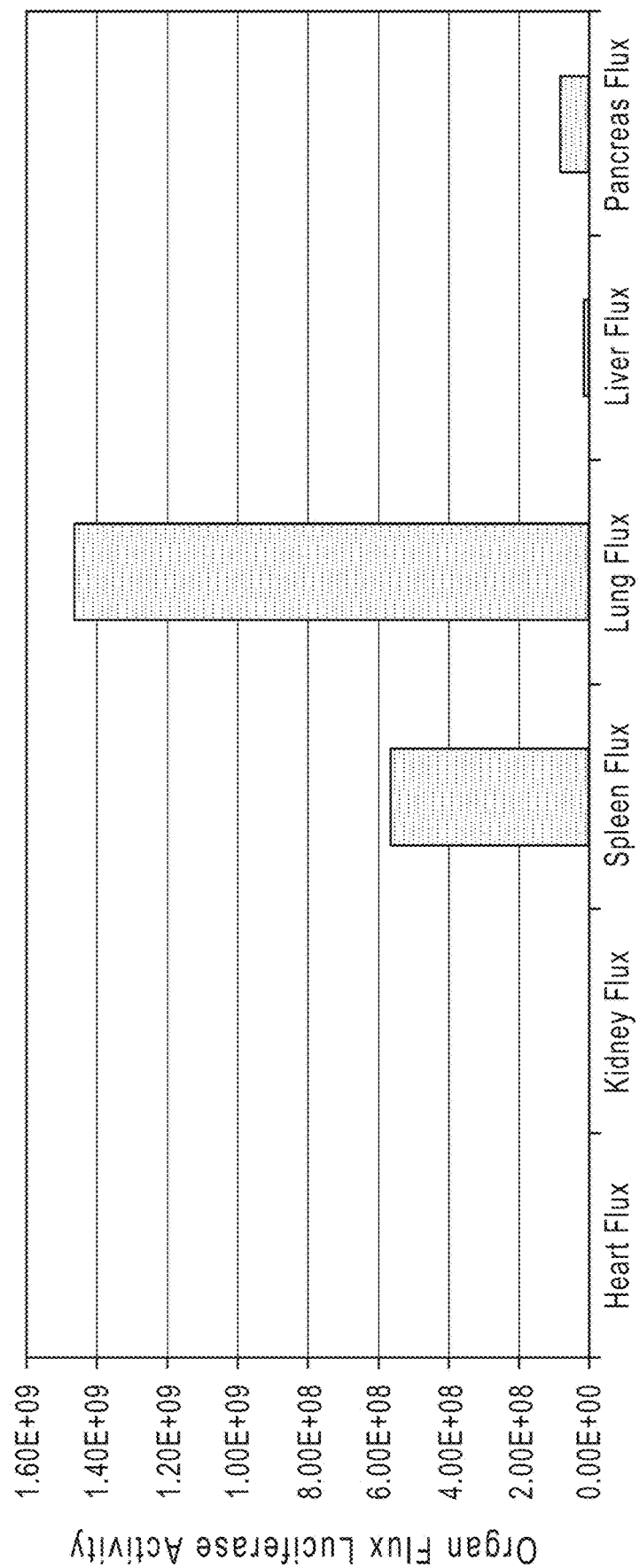
FIGS. 13A-13C. Formulation #3.14 treatment.
Figure 13B:
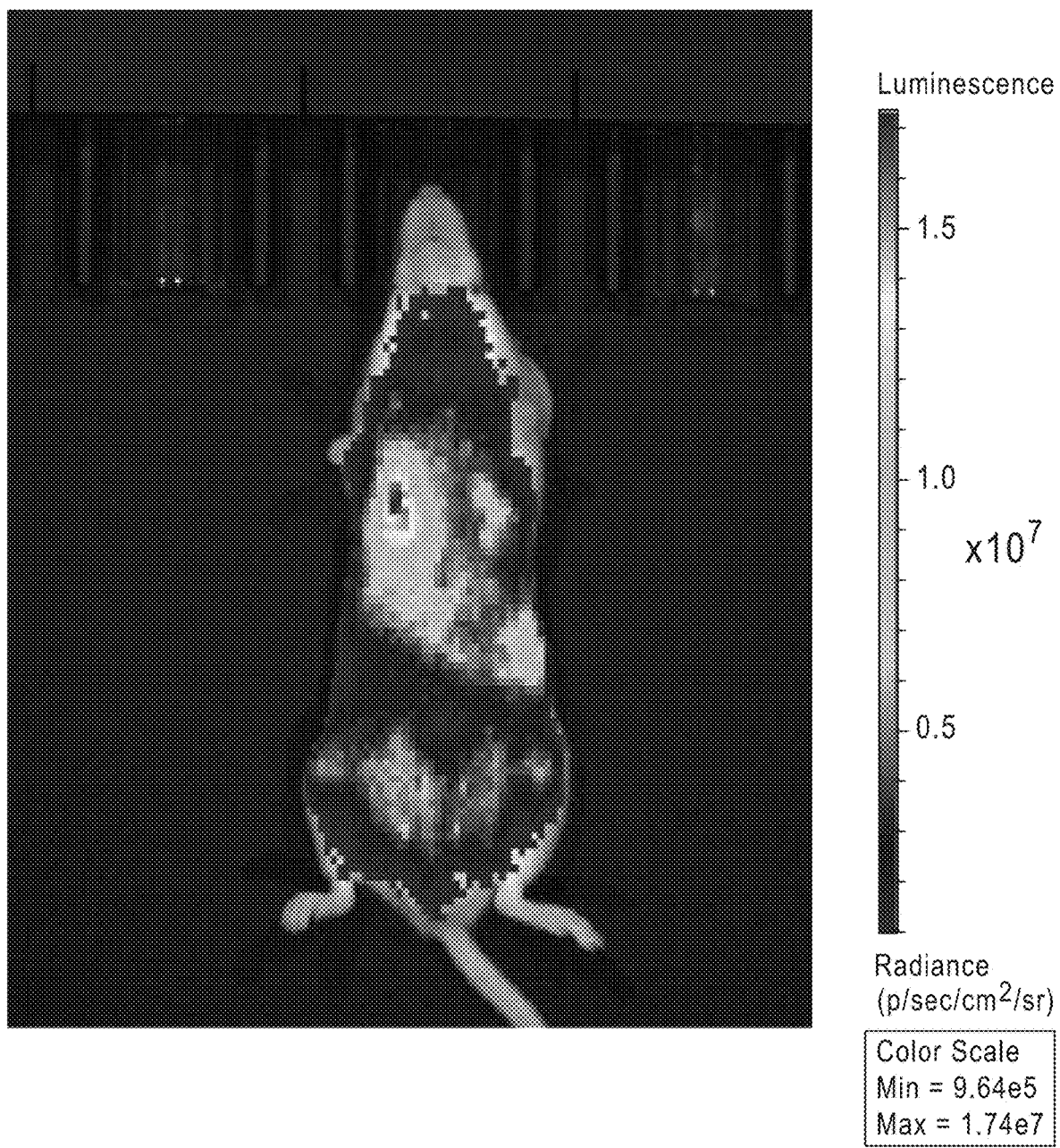
Figure 13C:
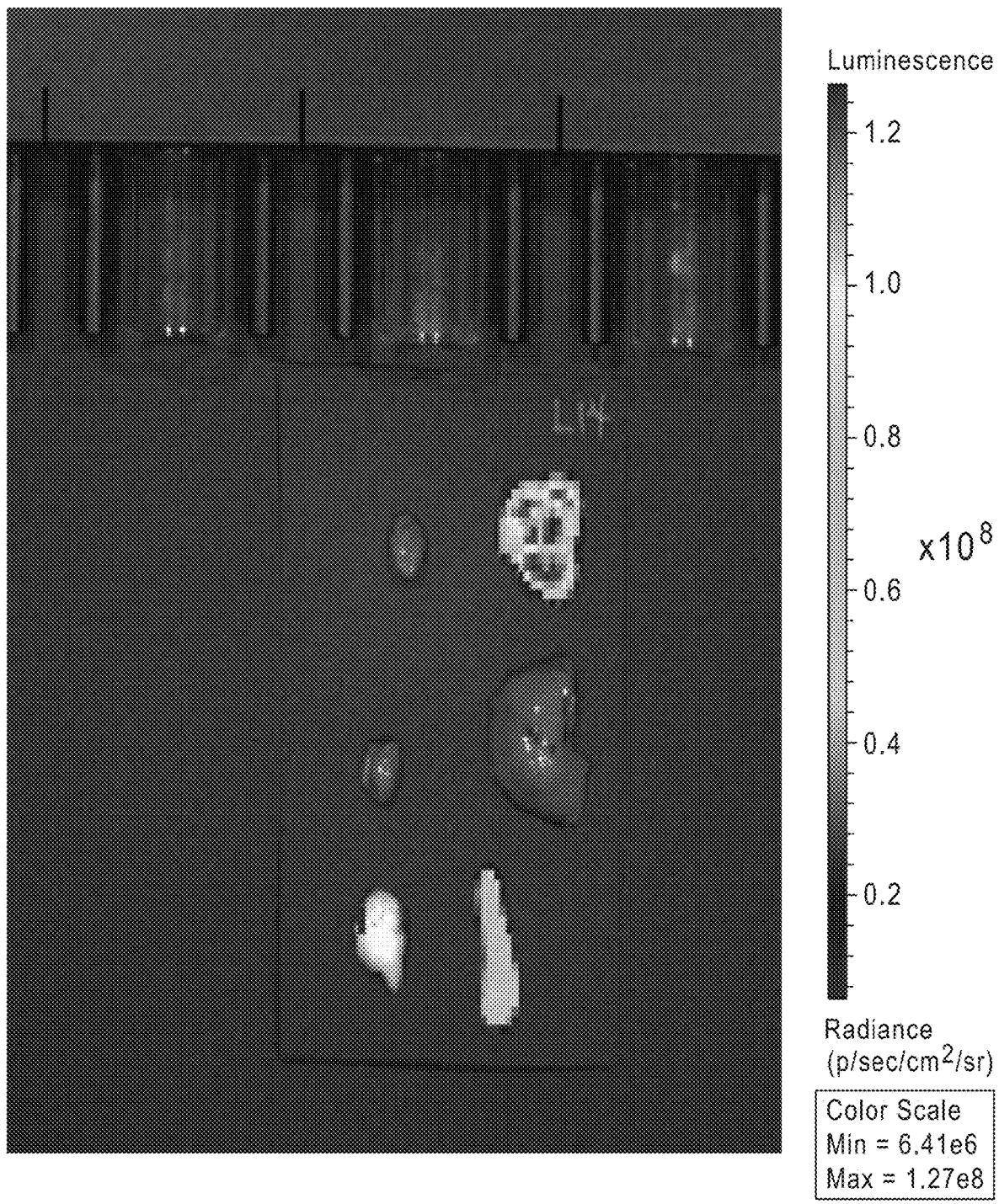
Figure 14A:
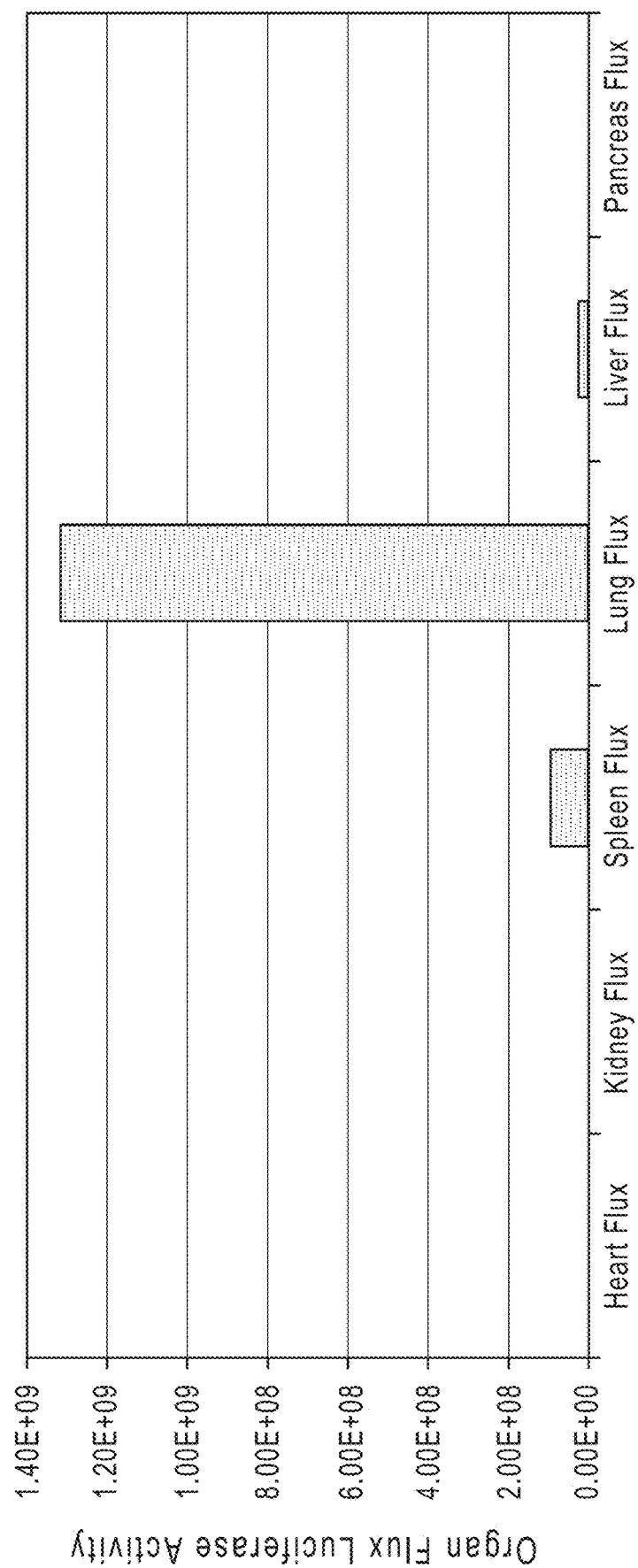
FIGS. 14A-14C. Formulation #3.19 treatment.
Figure 14B:
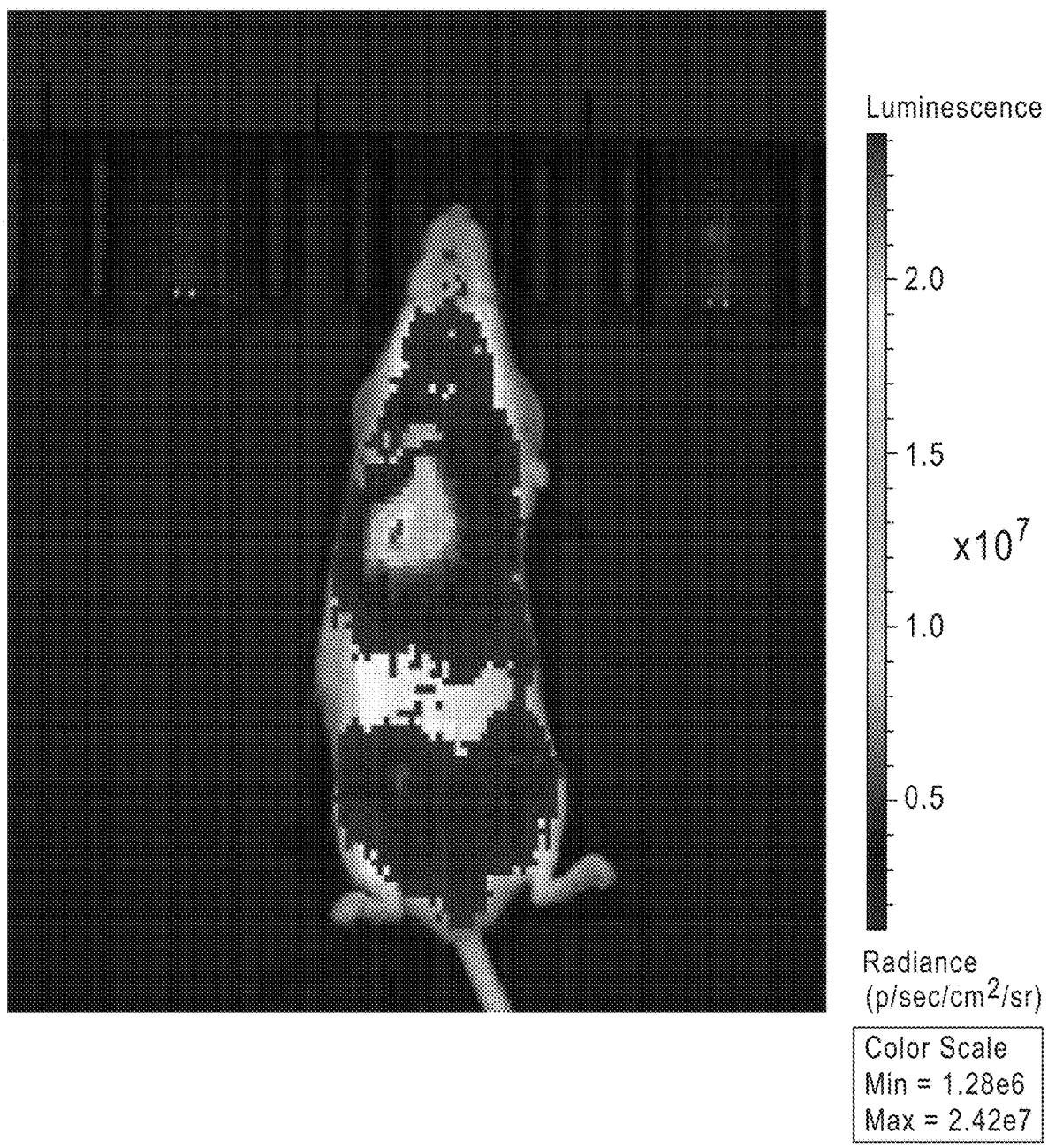
Figure 14C:
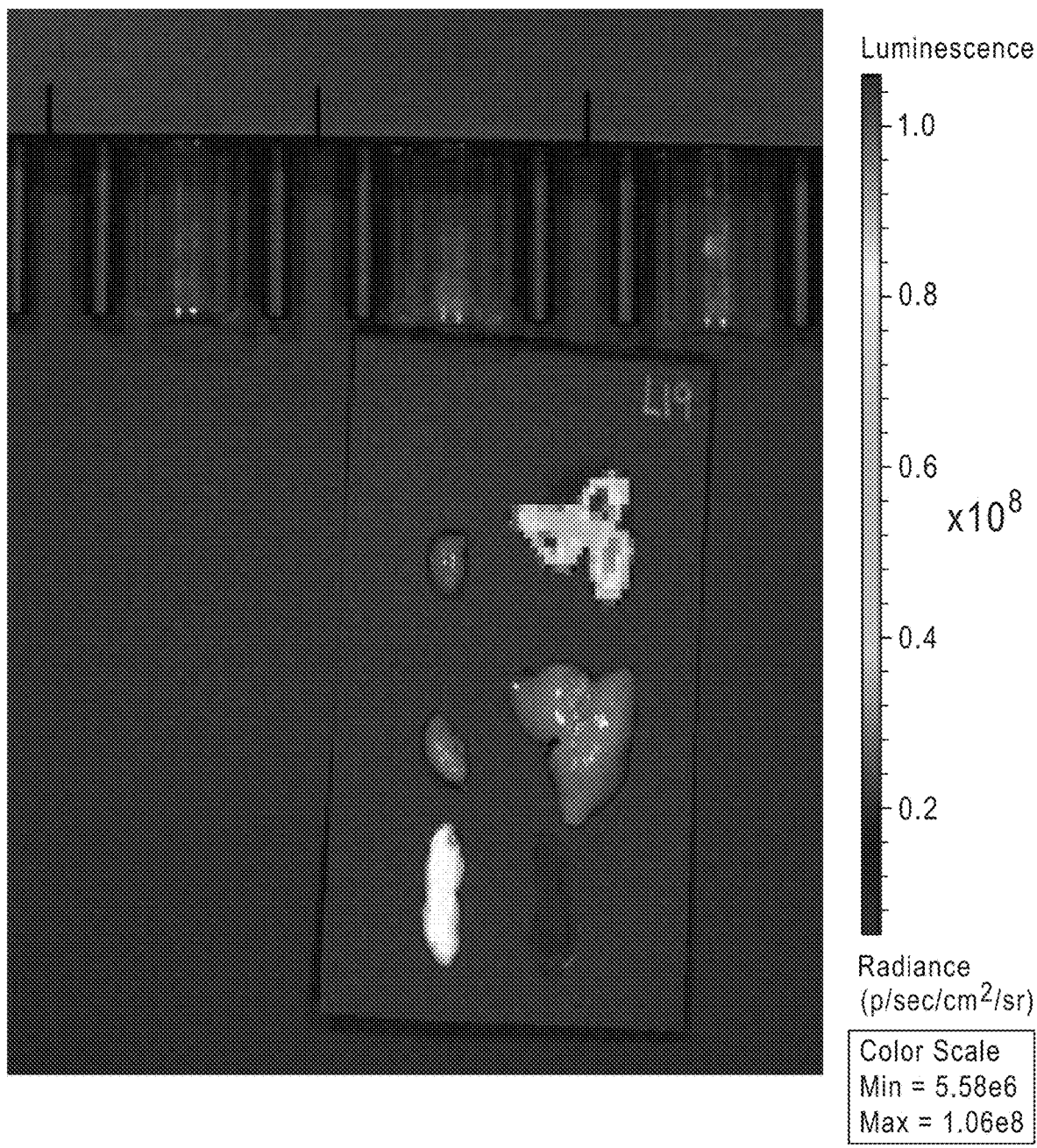
Figure 15A:
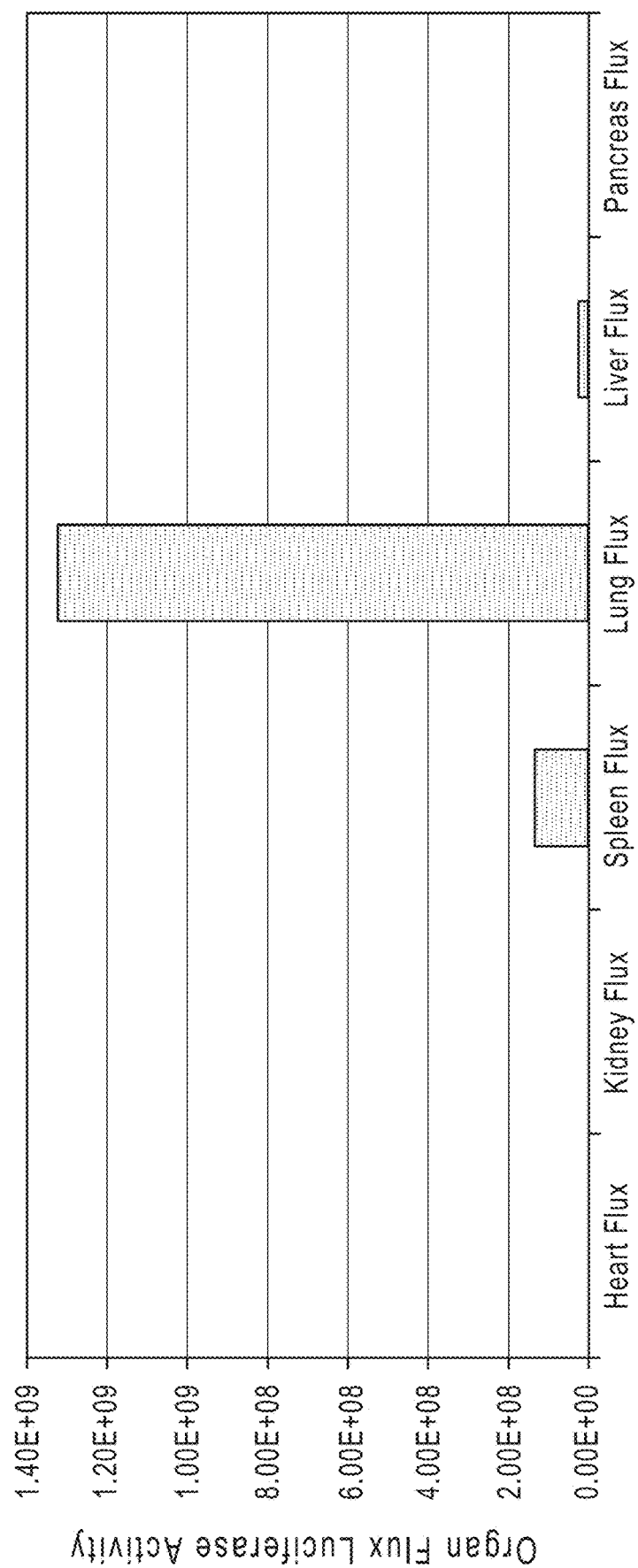
FIGS. 15A-15C. Formulation #3.20 treatment.
Figure 15B:
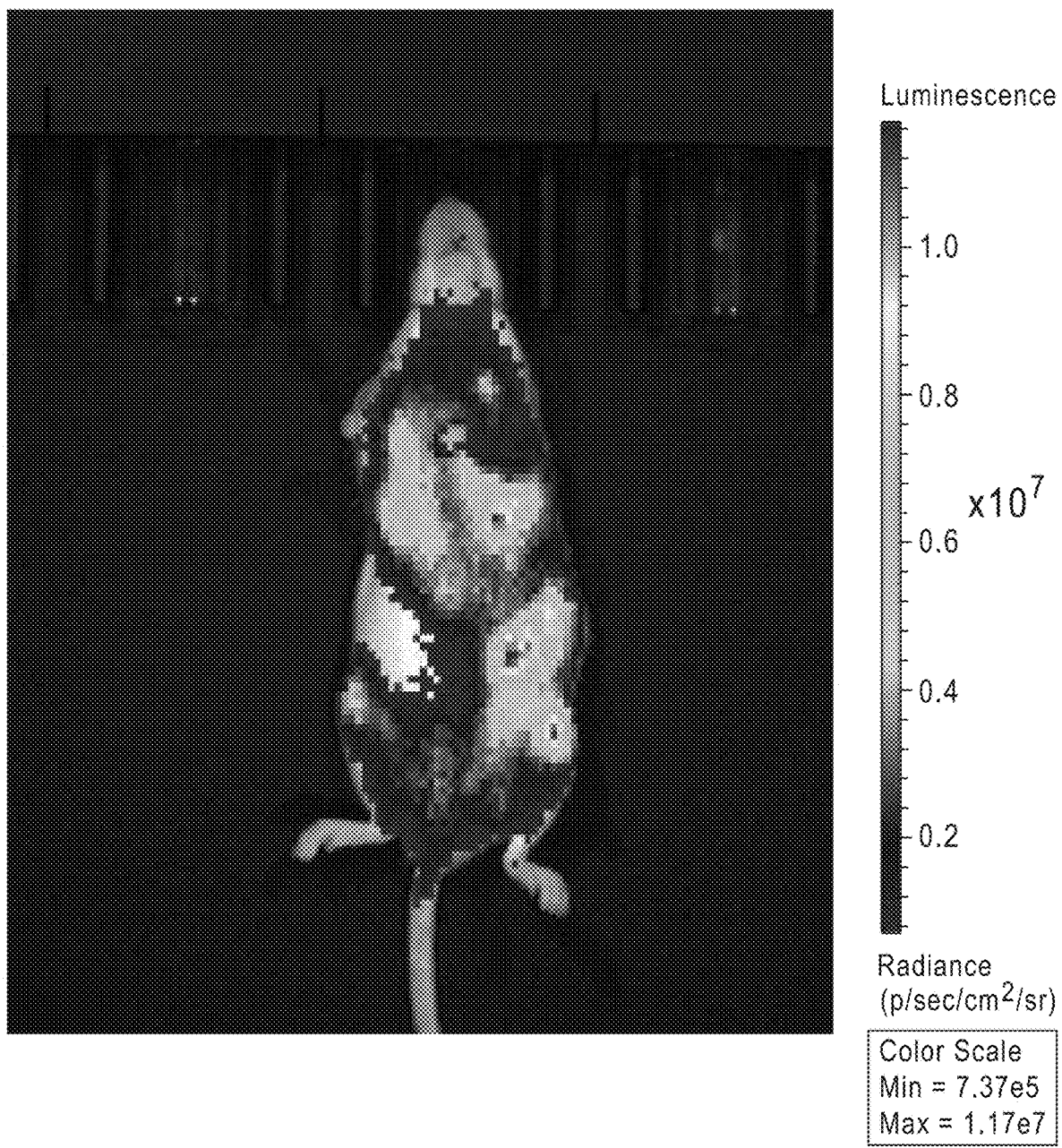
Figure 15C:
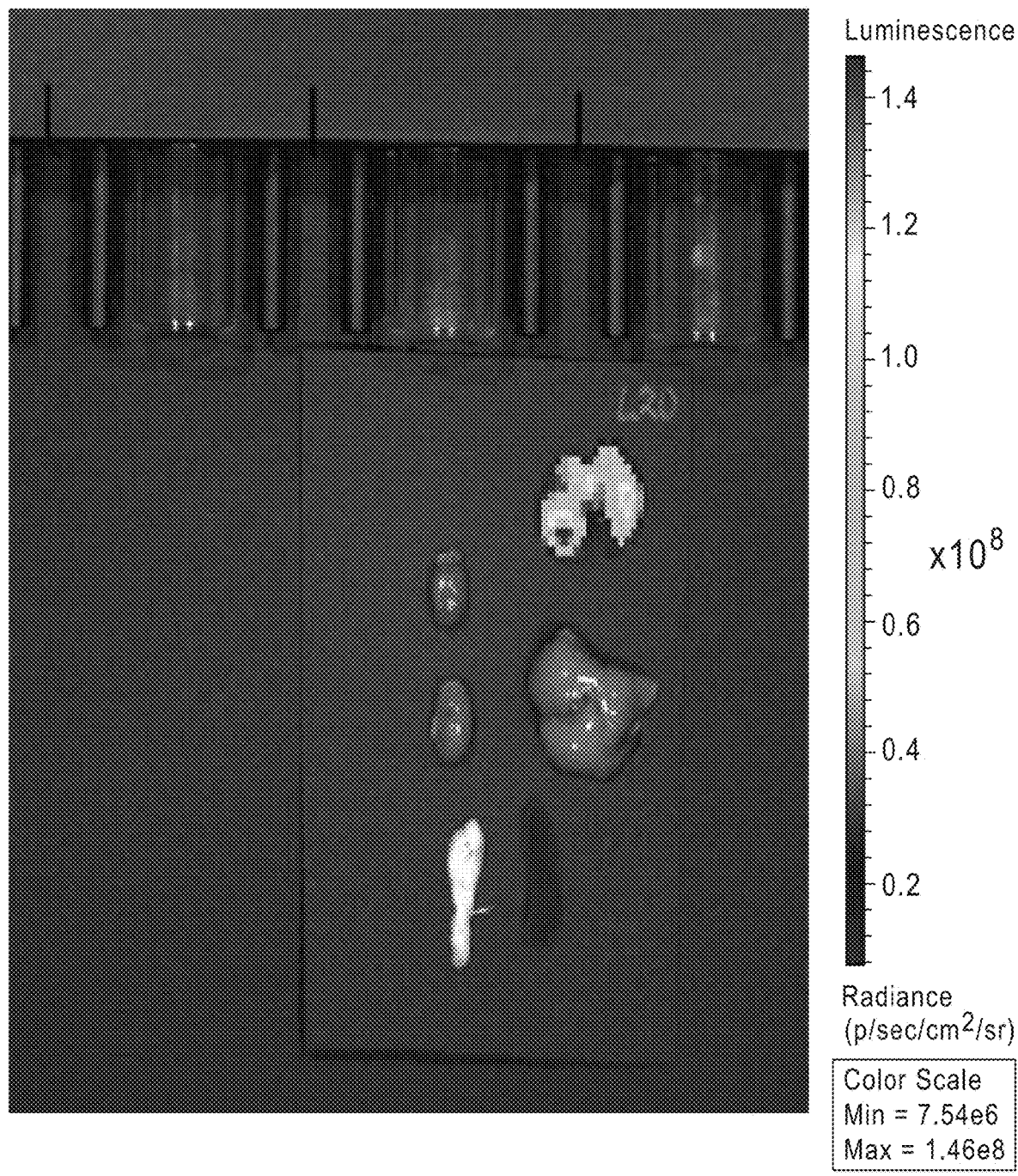
Figure 16A:
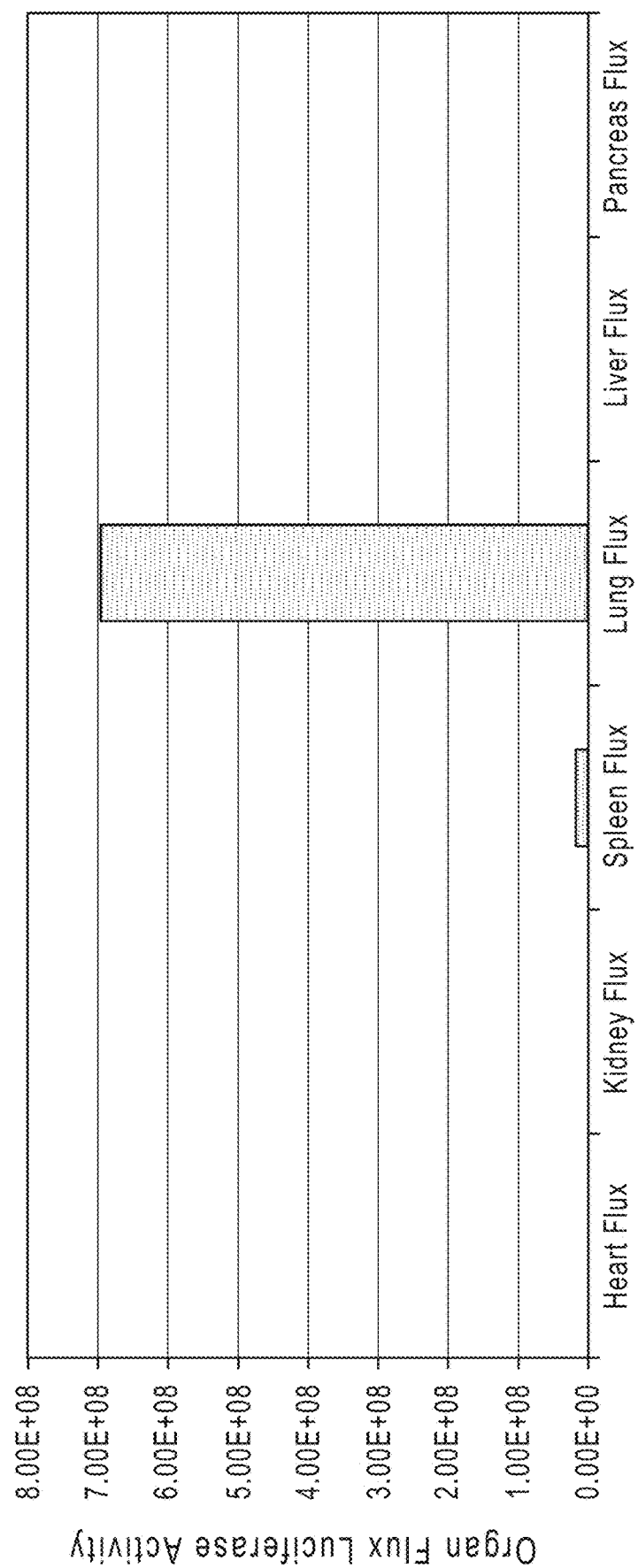
FIGS. 16A-16C. Formulation #2.2 treatment.
Figure 16B:
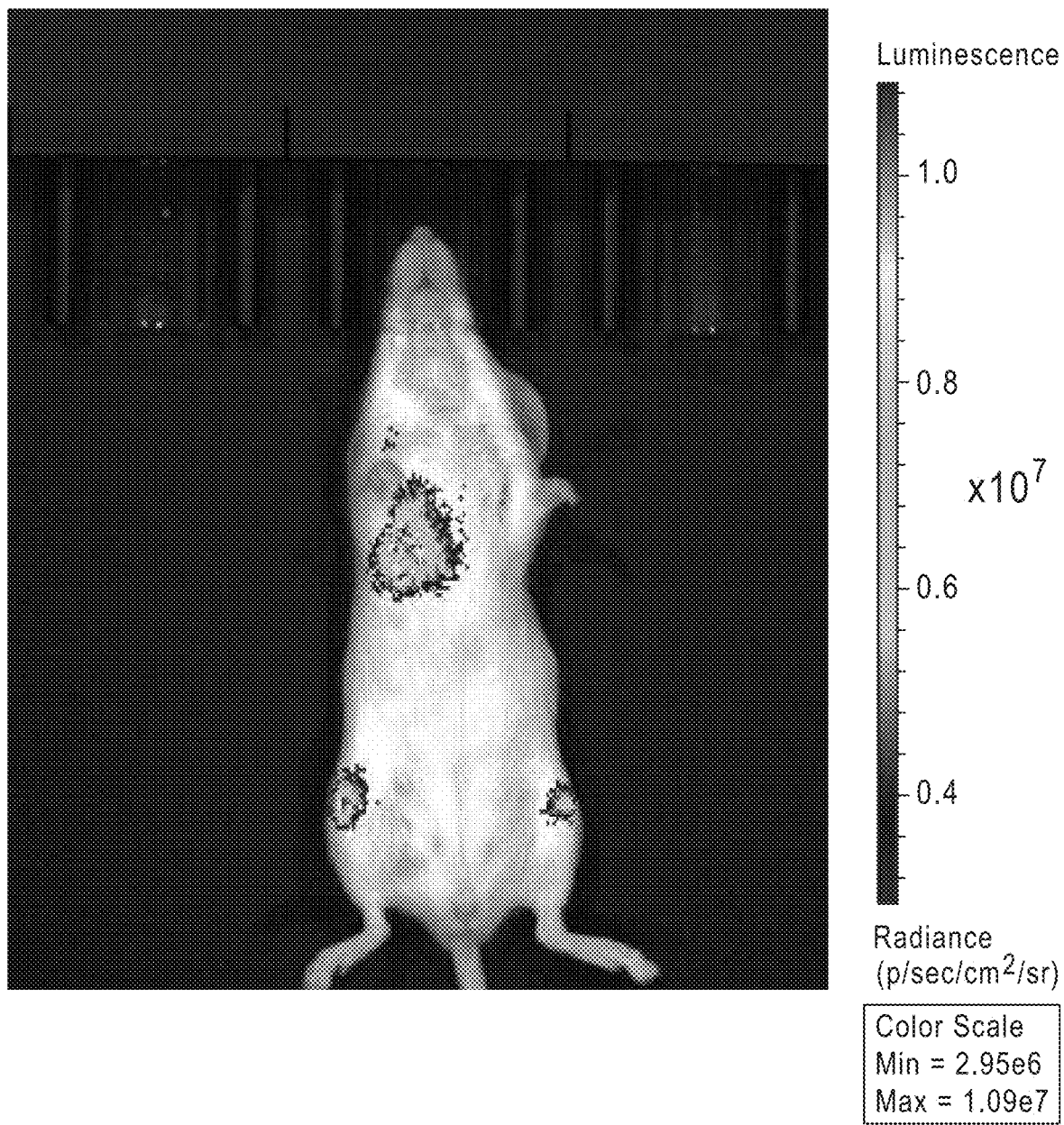
Figure 16C:
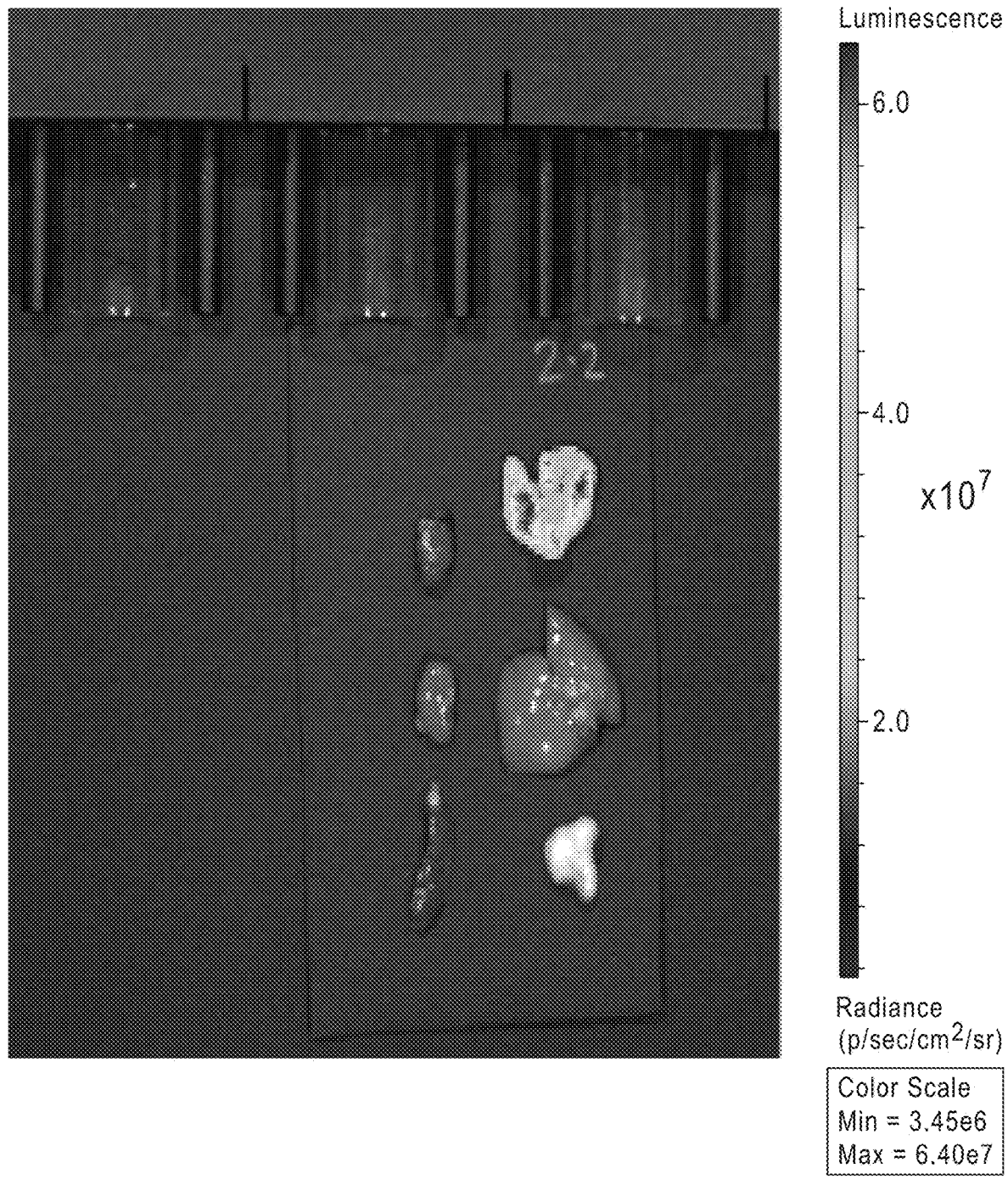
Figure 17A:
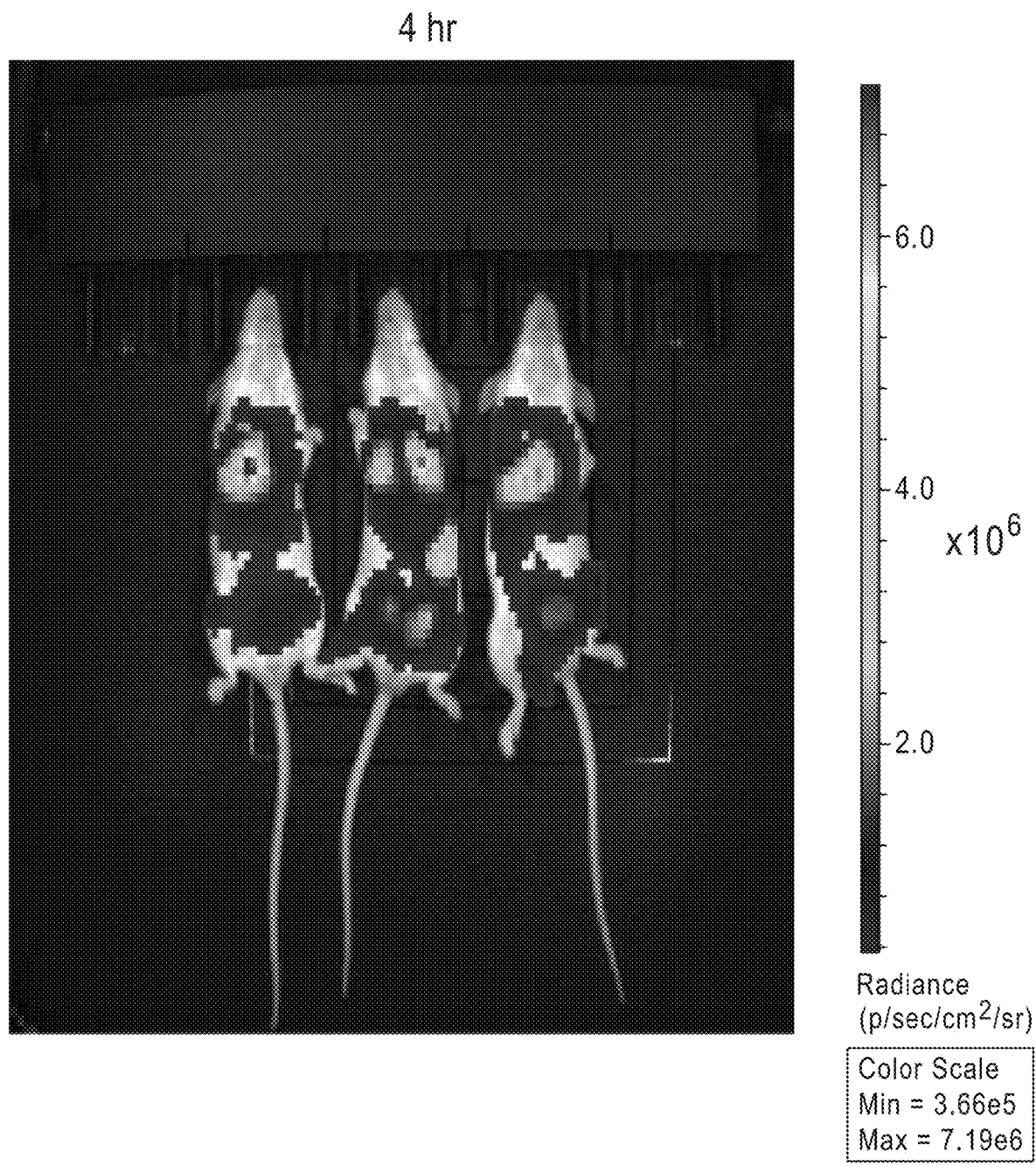
FIGS. 17A-17K. Bruce #3.14 in vivo ex vivo time course (3 mg/kg). In vivo whole animal luminescence at 4 hrs (FIG. 17A), 24 hrs (FIG. 17B), 48 hrs (FIG. 17C), 72 hrs (FIG. 17D), and 96 hrs (FIG. 17E). Ex vivo isolated organ tissue luminescence at 4 hrs (FIG. 17F), 24 hrs (FIG. 17G), 48 hrs (FIG. 17H), 72 hrs (FIG. 17I), and 96 hrs (FIG. 17J).
Figure 17B:
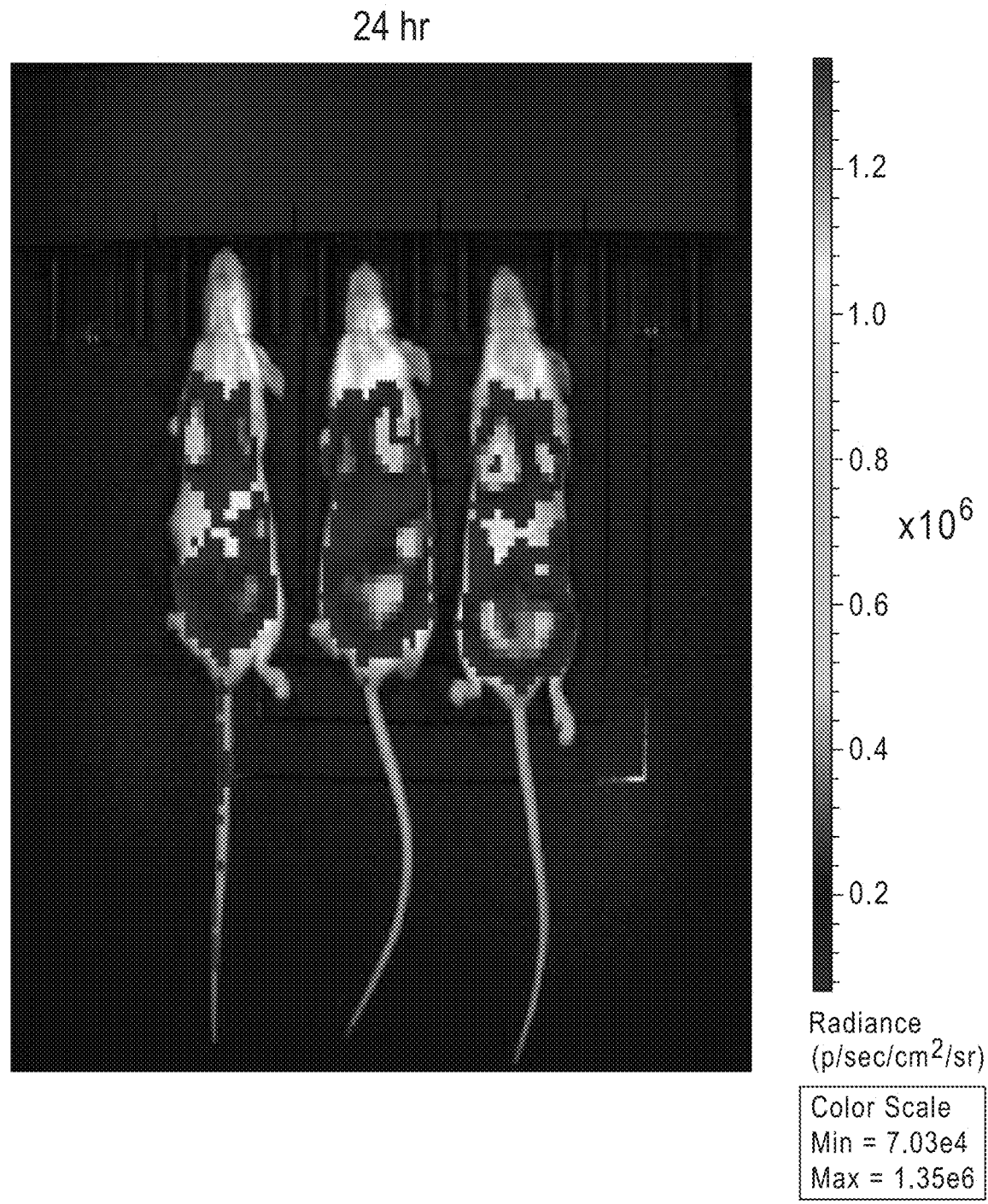
Figure 17C:
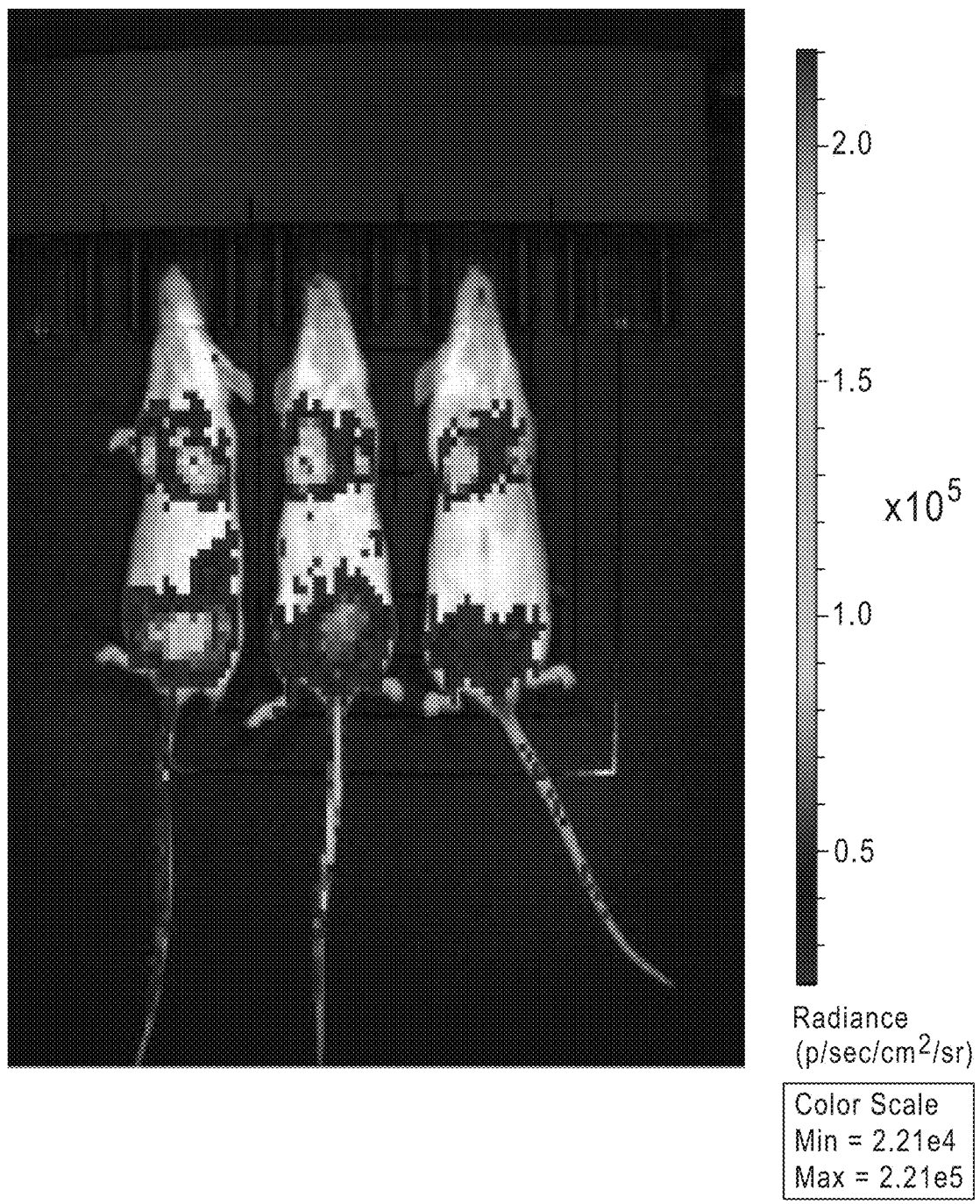
Figure 17D:
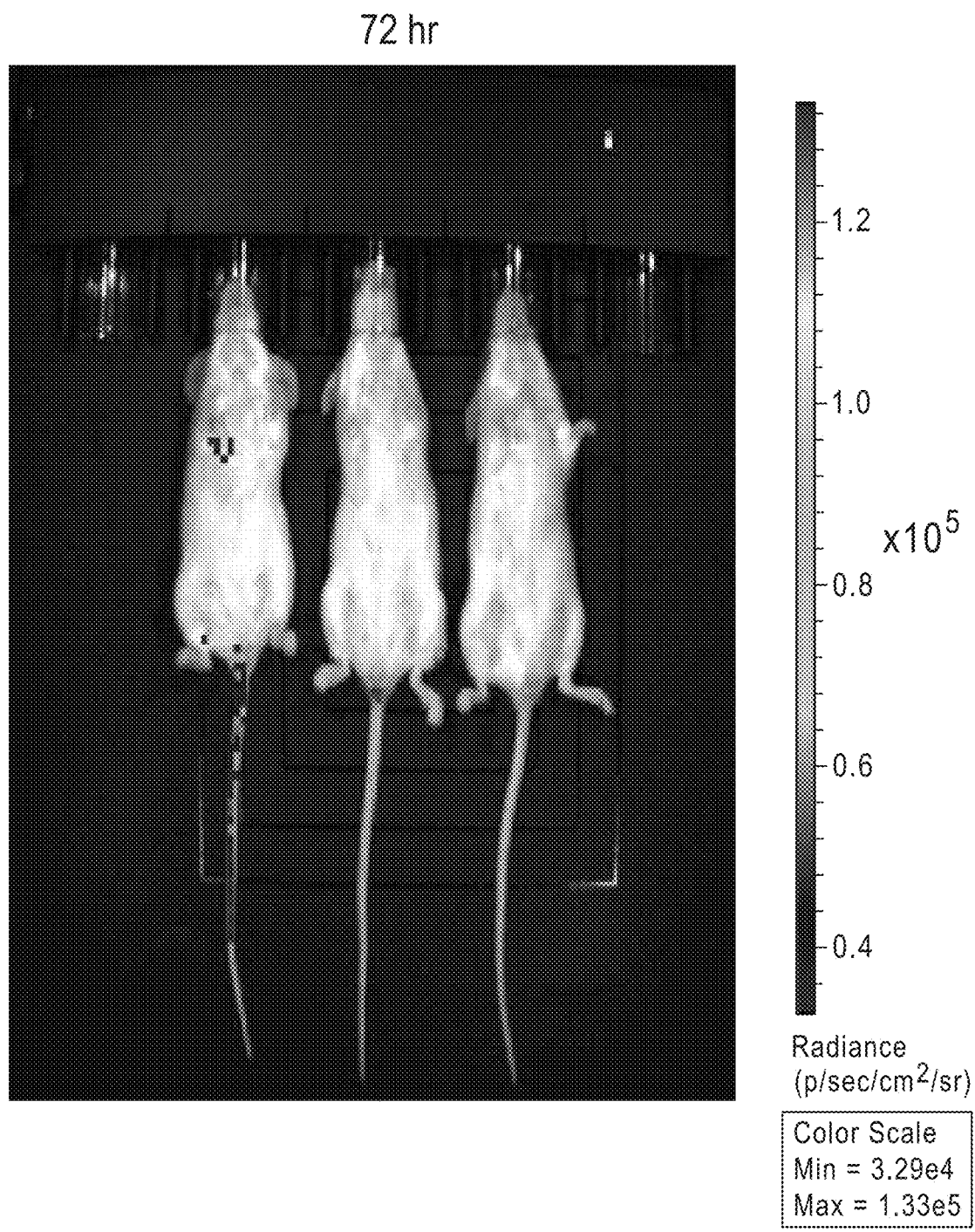
Figure 17E:
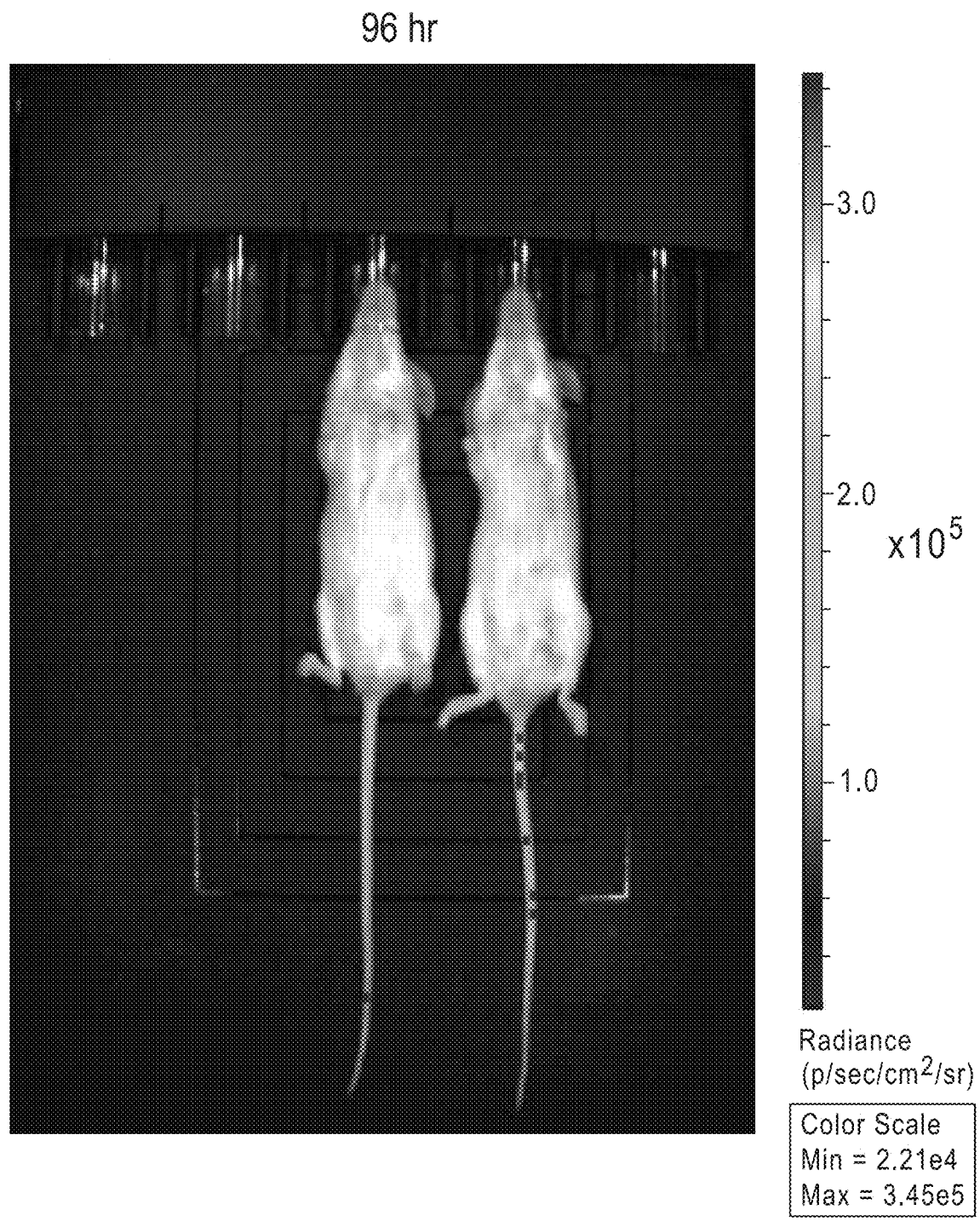
Figure 17F:
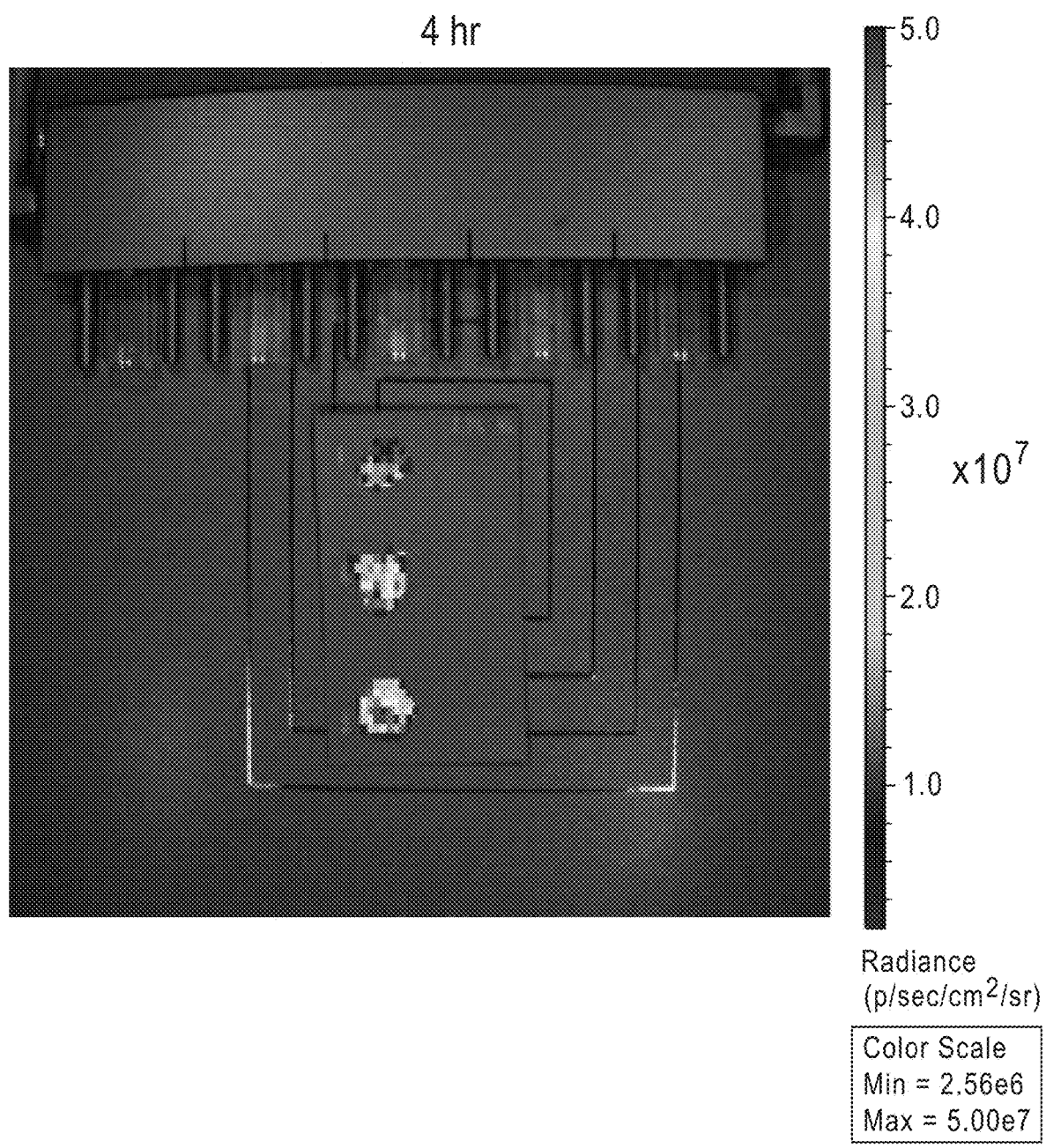
Figure 17G:
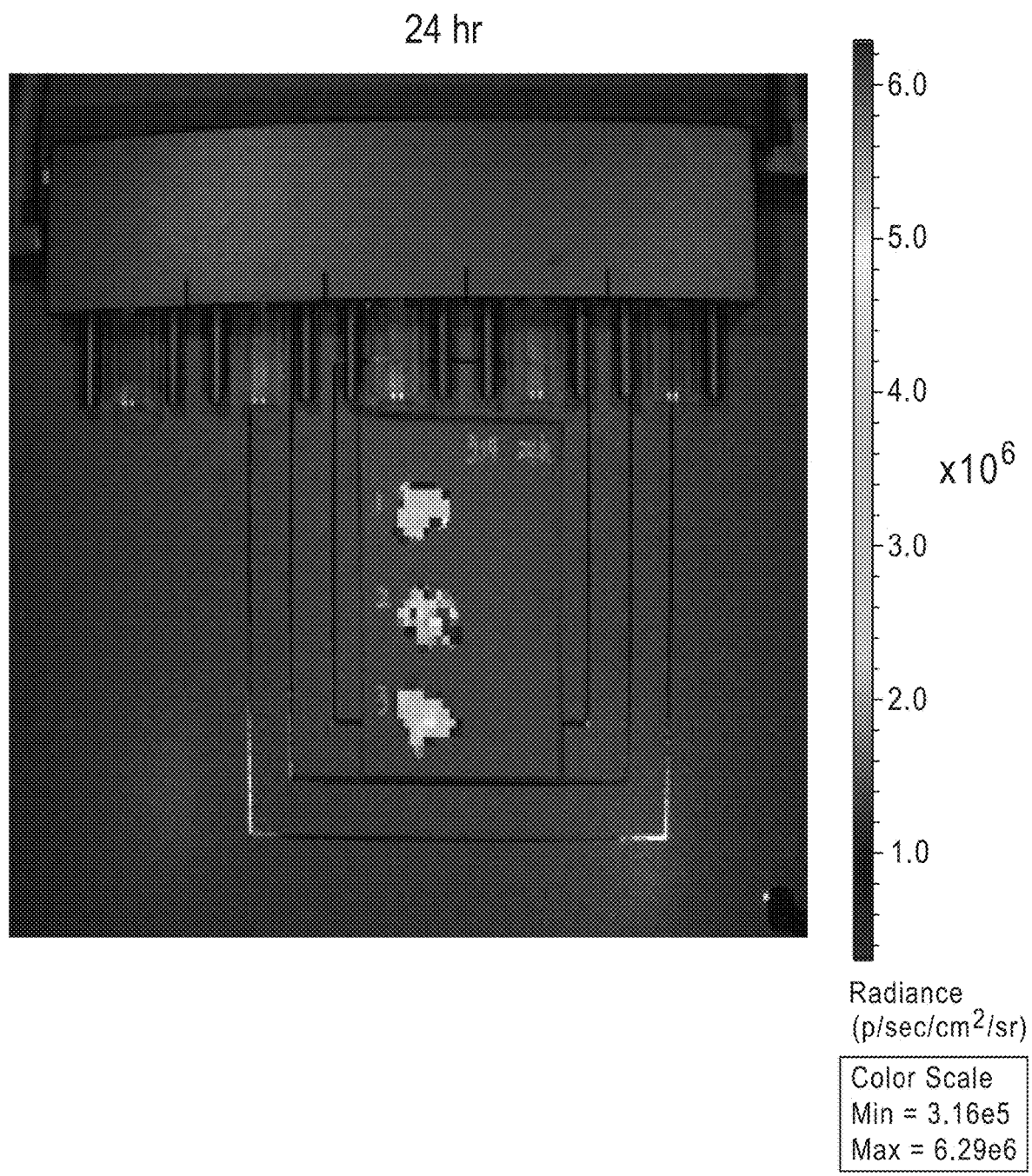
Figure 17H:
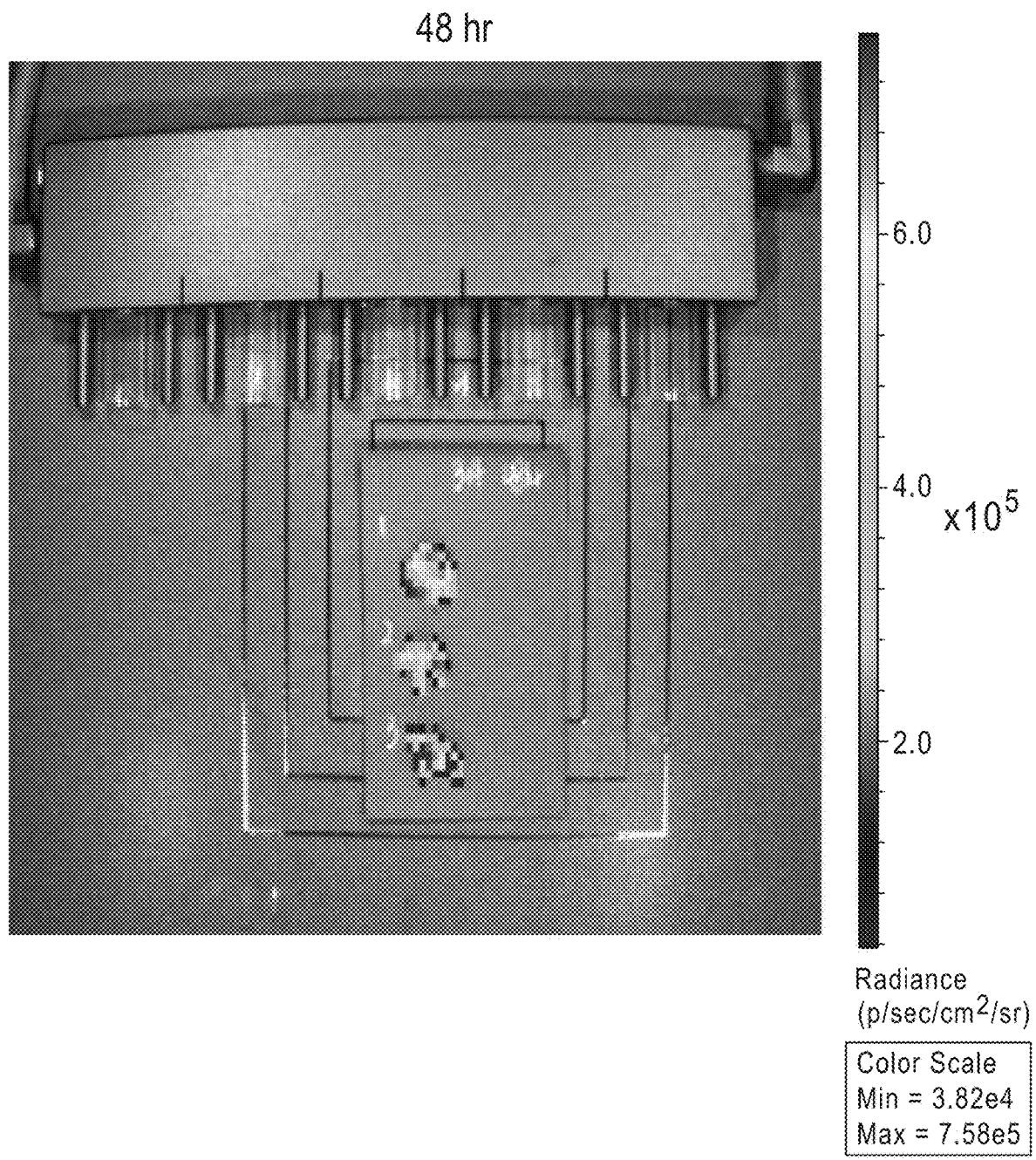
Figure 17I:
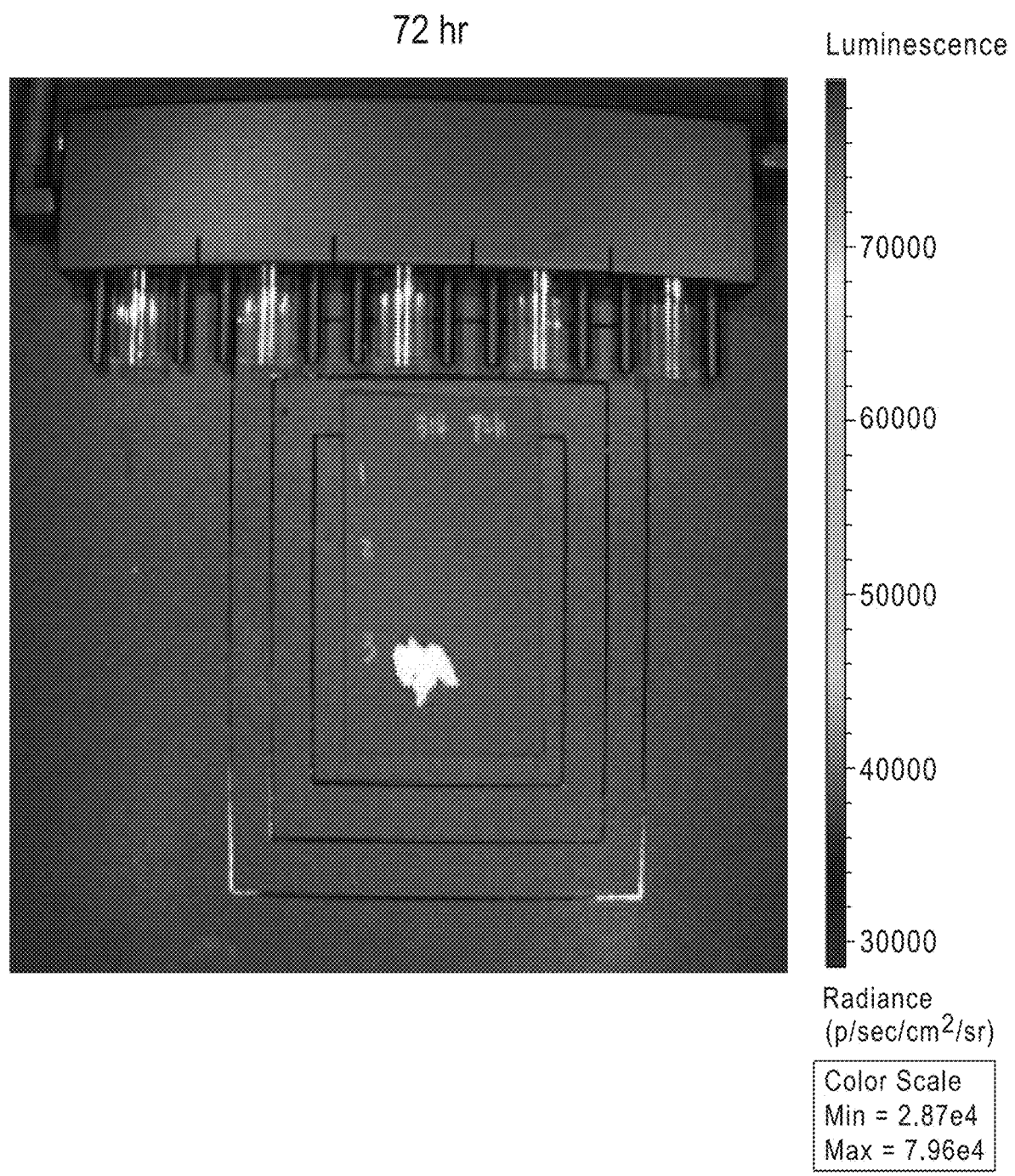
Figure 17J:
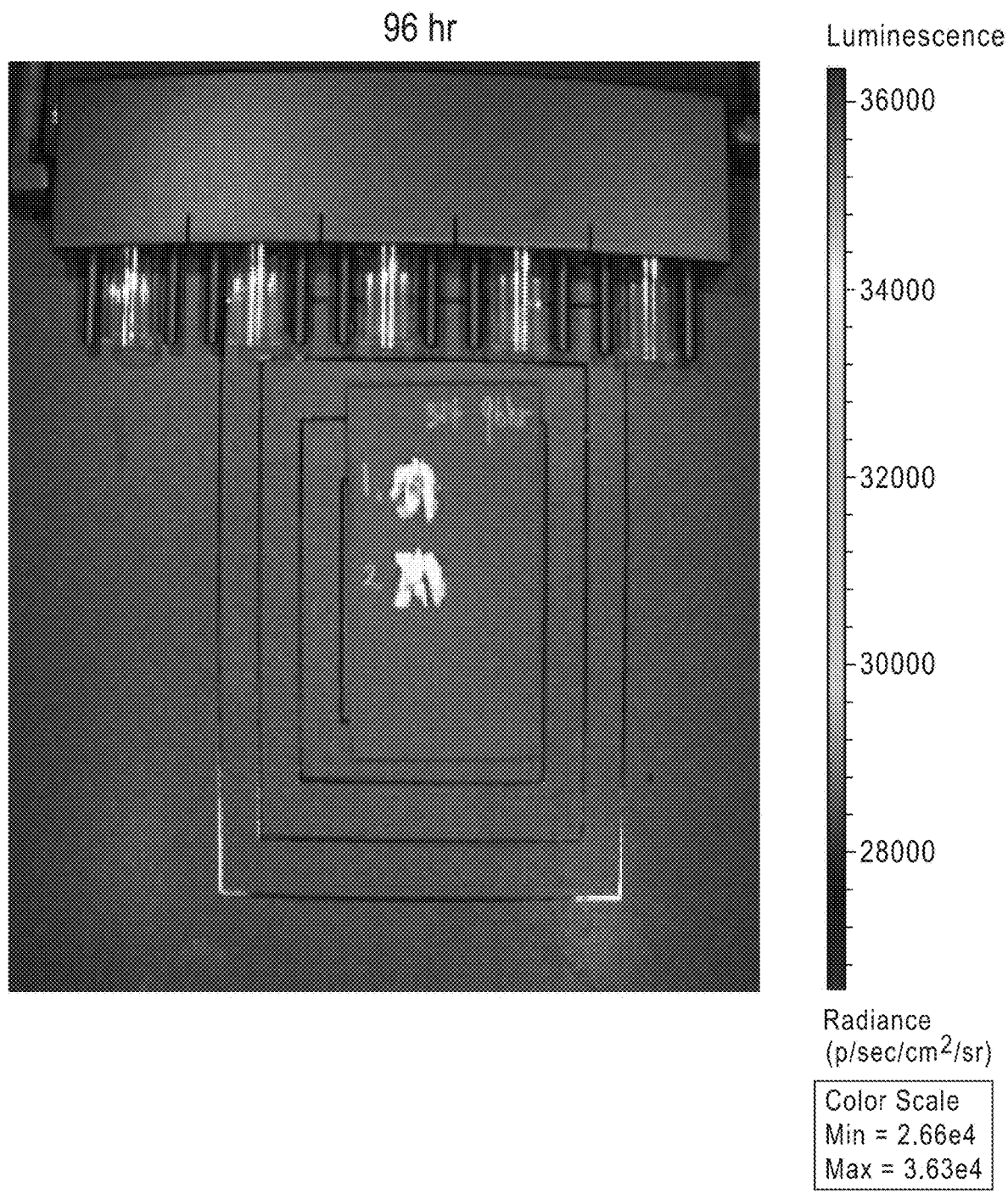
Figure 17K:
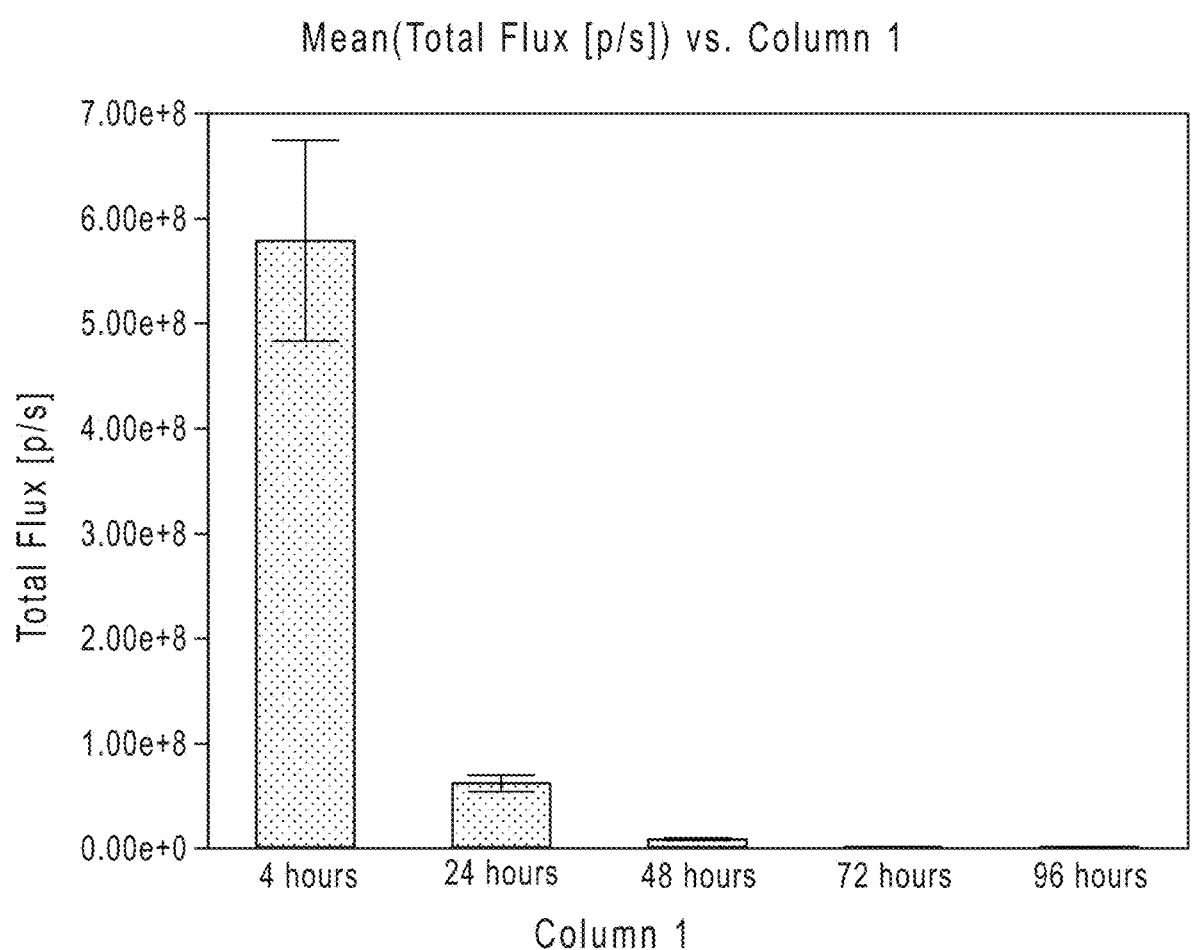
Figure 18A:
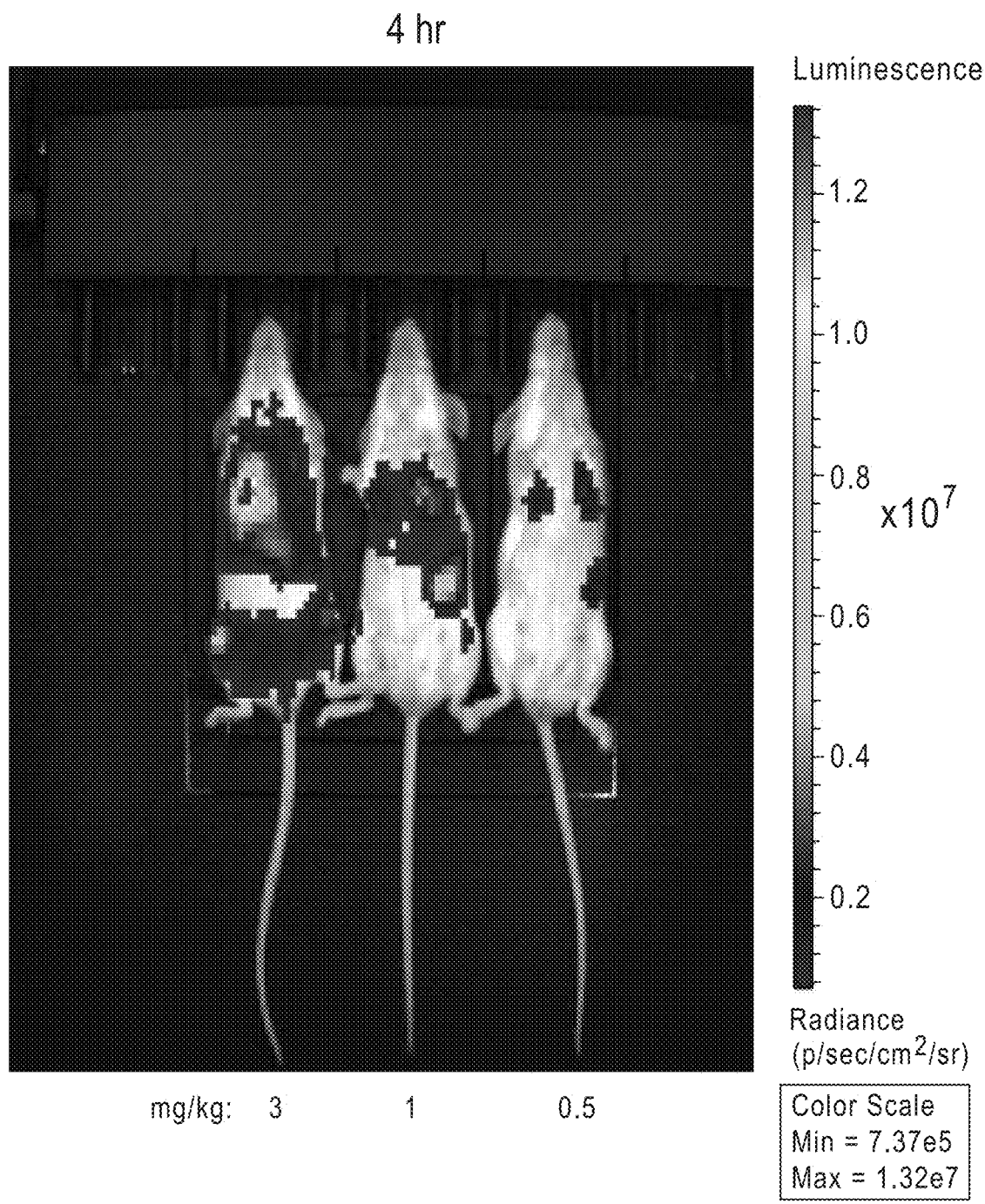
FIGS. 18A-18C. mRNA dose variation and time course 3.14 (3, 1, 0.5 mg/kg). In vivo whole animal luminescence at 4 hrs (FIG. 18A), 24 hrs (FIG. 18B), and 48 hrs (FIG. 18C) for each dose variation.
Figure 18B:
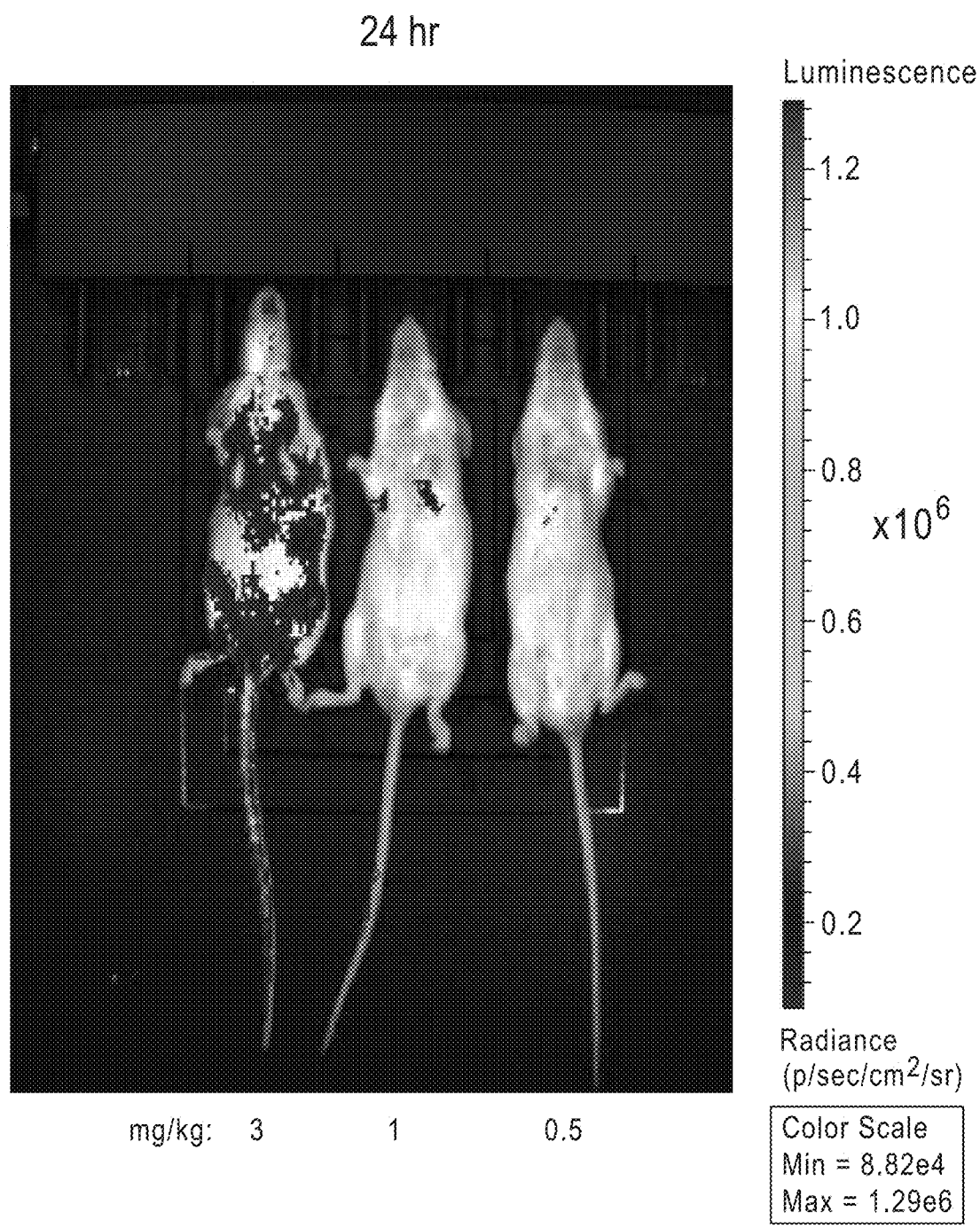
Figure 18C:
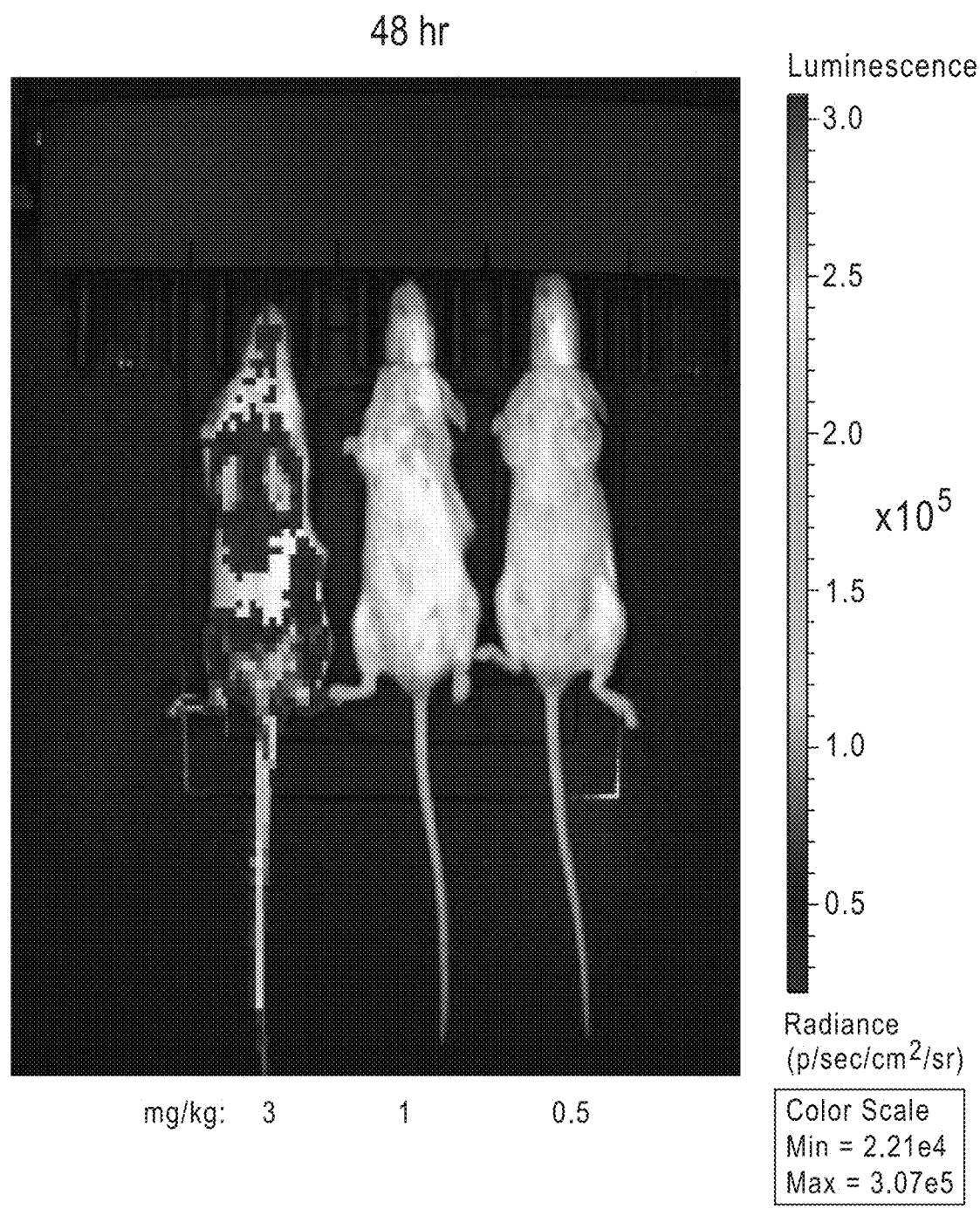

Preliminary results indicate that varying N/P ratio of the LNPs can lead to exclusion of protein expression from certain organs, resulting in a tissue specific biodistribution of mRNA (FIG. 8A-8B).

Conclusion.

LNP formulations were extensively optimized for targeted lung delivery using Design of Experiment based testing. Through in vivo systemic delivery, high fidelity luciferase expression was achieved in lung tissue. Transient expression was sustained for 48 hours post transfection. Modulation of expression was achieved by varying dose of mRNA.

Expression in spleen tissue was also achieved, and specificity of delivery is currently being optimized through variance of N/P ratio. Ongoing and future studies involve: Determination of transfection efficiency of specific cell type populations within the targeted organ of interest, Increase single organ specificity following systemic delivery, Stability of LNP formulation before and after mRNA complexation.

Example 3: Preparation and Complexation

Formulation Preparation.

Prepare stock solutions of the individual lipid components in 100% Ethanol (EtOH) at appropriate concentrations based on individual lipid solubility. Heat to 50° C. to dissolve lipids completely in the EtOH. In a glass vial, combine all 5 lipid components using a pipette in volumes calculated according to Molar ratios listed in Table 1. Dilute the combined lipids using 200 mM Sodium Acetate at a dilution ratio of 1:4 by volume. Seal lid with paraffin. Store at 4° C.

Complexation Preparation.

Concentration of lipid is delivered at a 3 mg/kg concentration. Concentration of mRNA is a 10:1 dilution, so 0.3 mg/mL total mRNA are administered. Label 2 screw-cap plastic sample tubes as 'lipid' and 'mRNA'. Transfer 100 µL of prepared lipid formulation to tube labeled 'lipid'. Calculate amount of mRNA needed for 200 µL total volume of complex. (0.6 mg/mL) Since lipid formulation is at a 25% EtOH solution following the 1:4 dilution with Sodium Acetate, the mRNA needs to be diluted in a 25% EtOH solution. Add 25 µL of 100% EtOH to tube labeled 'mRNA'. Add appropriate volume of mRNA to 'mRNA' tube according to calculations. Bring up the volume of sample to 100 µL using sterile filtered water. Add contents of mRNA tube to lipid tube mixing well. Vortex briefly. Heat complex at 50° C. for 30 minutes. Transfer complex to dialysis columns with an 8-10 kD molecular weight cut off, and allow to dialyze for 2 hours in 100% PBS. Transfer sample to air-tight screw capped sample tube and either use immediately or store at −20° C. until use.

Complex Administration.

If using frozen complex, thaw to room temperature before use. According to the institutional guidelines for the care and use of laboratory animals, complex is administered to mouse via tail vein injection.

Preparation of formulations was performed as follows. Individual powder lipid components were resuspended in 100% Ethanol (EtOH). Stock solutions were prepared in the following concentrations: DHDMS at 50 mg/mL, HDMS at 15 mg/mL, Cholesterol at 25 mg/mL, DOPE at 50 mg/mL and C14 PEG 5000 (Avanti Polar Lipids, #880210) at 100 mg/mL. Lipid solutions were heated to 50° C. using a heat block to achieve complete solubility during formulation preparation.

The 5 formulation components were combined in a glass screw top vial using a pipette in the volumes listed in Table 1, calculated based on the desired molar ratio and the stock concentration of the lipid. Once all five of the components were added at the appropriate volumes to the glass vial, the volume was brought up to 100 µL using 100% EtOH. This volume was then diluted at a ratio of 1:4 using a 200 mM Sodium Acetate solution. The resulting solution was used as the transfection reagent, and stored at 4° C.

Preparation of the lipid/mRNA complexes was performed as follows. The final target concentration of 0.3 mg/mL of mRNA was chosen as the desired concentration for delivery, and the basis of the calculations for sample preparation. 2 screw-cap plastic sample tubes were labeled as 'lipid' and 'mRNA'. 100 µL of the prepared lipid formulation was transferred to tube labeled 'lipid'.

For the mRNA solution preparation: the amount of mRNA needed for a total complex volume of 200 µL, based on the desired 0.3 mg/mL final concentration is 0.6 mg/mL. Based on the concentration of mRNA solution, calculate the necessary volume using the formula $(C1)(V1)=(C2)(V2)$, where $C_1$=stock concentration mRNA, V1=variable, $C_2$=0.6 mg/mL final mRNA concentration and V2=100 µL of solution volume. Stock mRNA was thawed on ice, and mRNA solution was prepared on ice. For experiments, Firefly luciferase mRNA (Trilink® #L-6107) was purchased at a concentration of 2 mg/mL. To achieve the desired concentration, Applicants used 30 µL of the stock mRNA solution. To maintain a concentration of 25% EtOH (lipid formulation is at a 25% EtOH) the mRNA is prepared in a solution of 25% EtOH. To the tube labeled mRNA, 30 µL of undiluted mRNA, 25 µL of 100% EtOH and 45 µL of Ultrapure DNase/RNase-Free distilled water (Thermofisher #10977-015) were combined.

Once both tubes were prepared, mRNA tube was added to the lipid tube and mixed well. Tube was briefly vortexed and then heated at 50° C. for 30 minutes. Following complexation, complex was transferred to a dialysis column with an 8-10 kD molecular weight cut off (Spectrum labs, Float-a-Lyzer dialysis device #G235031) and dialyzed in 100% PBS (Gibco PBS #10010023) for 2 hours. Following dialysis, sample was transferred to screw-capped plastic sample tube, and either used immediately, or stored at −20° C. until use.

Complex administration in vivo was performed as follows: If using frozen complex, thaw to room temperature before use, if using freshly dialyzed samples, proceed immediately. The 200 µL injection volume is according to use of a 20 gram mouse. Adjust volume for mice weighing more or less accordingly. To perform tail vein injection, restrain animal using a restraining device. A warm water bath or heat lamp can be used to help dilate and visualize the vein. Disinfect the tail using alcohol. Insert needle into vein and slowly inject solution into vein, (20-40 µL/second). Successful needle insertion and injection will cause blood to clear from vein. If this does not occur, and resistance is felt upon injection, remove needle and repeat proximal to primary injection site. Following complete injection of the complex solution, withdraw the needle and apply gentle compression to the site of injection to stop bleeding.

3 hours following injection of luciferase mRNA, 50 μL of luciferin substrate was injected IP into the mouse and allowed to incubate for 15 minutes. Immediately, tissues were collected for luciferase activity assay. For experiments, Applicant's utilized an IVIS Lumina LT pre-clinical in vivo imaging system (Perkin-Elmer #IVISLMLT) to measure the luciferase activity in the individual organs. Using Living Image® software, the flux of signal representing bioluminescence from a specified region of interest was measured and quantified.

TABLE 1

Volume of Stock solutions (μL)

Figure 20A:
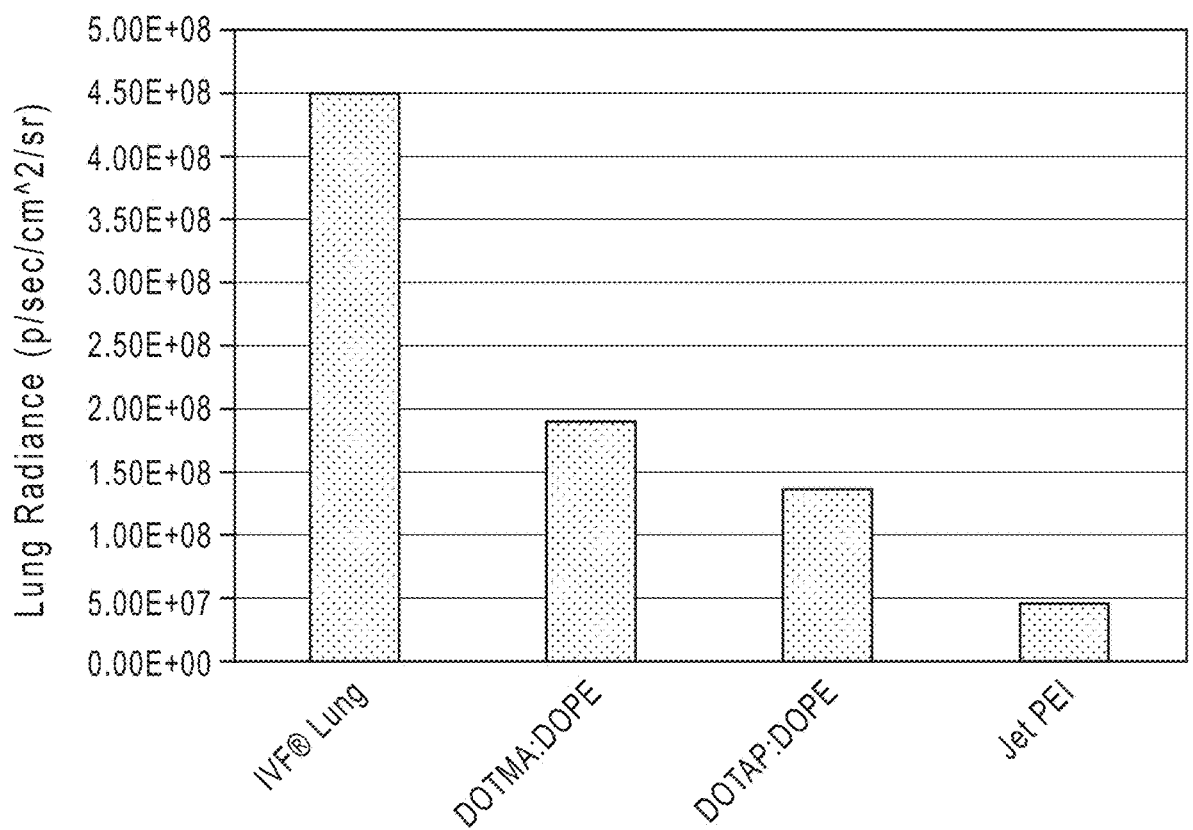
FIGS. 20A-20B. Reagent comparative analysis. Experimental design—Reagents: Four different formulations (IVF® Lung, DOTMA:DOPE, DOTAP:DOPE, Jet PEI®), Route of Delivery: Intravenous (systemic), Payload: Trilink® Firefly luciferase mRNA.
Figure 20B:
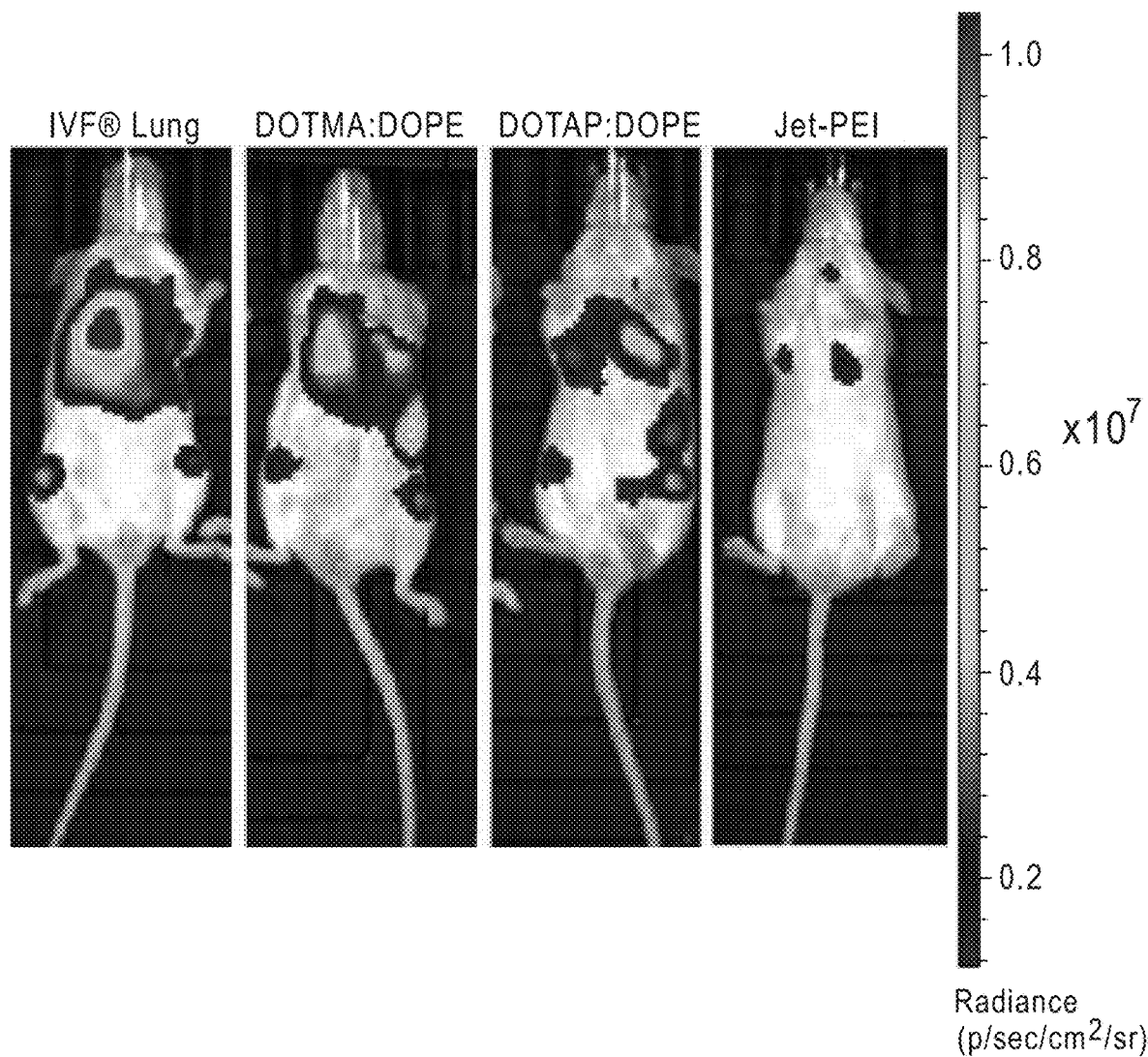

| | DHDMS | HDMS | DOPE | Cholesterol | PEG | EtOH |
|---|---|---|---|---|---|---|
| 3.10 | 62.7 | 568 | 160.9 | 26.1 | 19.2 | 163 |
| 3.14 | 83.6 | 582.9 | 130.8 | 5.2 | 38.5 | 159 |
| 3.19 | 60.1 | 672.6 | 100.6 | 52.3 | 38.5 | 76 |
| 38.53.20 | 47 | 568 | 160.9 | 52.3 | 38.5 | 133.3 |
| 2.2 | 146.3 | 358.7 | 160.9 | 73.2 | 9.6 | 251.3 | ery of formulations through intravenous injection. All formulations delivered Trilink® Firefly luciferase mRNA as a payload. FIGS. 20A-20B show experimental results.

Multiple mRNA sequences were tested to determine delivery of mRNA to organ (i.e., lung) using IVF® Lung. To determine the delivery of Firefly Luciferase, obtained from Trilink® or developed in house, bioluminescence imaging of organ and mouse was used. To determine delivery of lacZ (obtained from Trilink®), histology on lung tissue was completed by staining with beta-gal. To determine delivery

TABLE 2

Top producing lipid nanoparticle formulations.

| Formaton | PEG chain length | PEG Mol Weight | DHDMS | HDMS | DOPE | CHOLESTEROL | PEG |
|---|---|---|---|---|---|---|---|
| Bruce #3.10 | 24 | 5000 | 0.24 | 0.38 | 0.32 | 0.05 | 0.01 |
| Bruce #3.14 | 14 | 5000 | 0.32 | 0.39 | 0.26 | 0.01 | 0.02 |
| Bruce #3.20 | 14 | 5000 | 0.18 | 0.38 | 0.32 | 0.10 | 0.02 |
| Bruce #3.19 | 14 | 5000 | 0.23 | 0.45 | 0.20 | 0.10 | 0.02 |
| Bruce #3.11 | 14 | 5000 | 0.18 | 1.51 | 0.20 | 0.10 | 0.01 |
| Bruce #3.15 | 14 | 5000 | 0.27 | 0.38 | 0.32 | 0.01 | 0.02 |
| Bruce #3.12 | 14 | 5000 | 0.25 | 0.38 | 0.25 | 0.10 | 0.01 |
| Bruce #2.2 | 18 | 750 | 0.28 | 0.24 | 0.32 | 0.14 | 0.02 |
| Bruce #3.16 | 14 | 5000 | 0.18 | 0.47 | 0.32 | 0.01 | 0.02 |
| Bruce #4 | 14 | 2000 | 0.24 | 0.40 | 0.24 | 0.10 | 0.02 |
| Bruce #3.18 | 14 | 5000 | 0.32 | 0.38 | 0.20 | 0.08 | 0.02 |
| MOLAR RANGES | | | 0.18-032 | 024-0.53. | 0.20-0.32 | 0.01-0.14 | 0.01-0.02 |

TABLE 3

Non-targeting, low performance lipid nanoparticle formulation.

| Formaton | PEG chain length | PEG Mol Weight | DHDMS | HDMS | DOPE | CHOLESTEROL | PEG |
|---|---|---|---|---|---|---|---|
| Bruce #23 | 14 | 5000 | 0.10 | 0.40 | 0.10 | 0.38 | 0.02 |
| Bruce #64 | 14 | 5000 | 0.10 | 0.10 | 0.40 | 0.30 | 0.10 |
| Bruce #24 | 14 | 5000 | 3.10 | 0.10 | 0.40 | 0.38 | 0.02 |
| Bruce #52 | 18 | 750 | 0.22 | 0.10 | 0.22 | 0.40 | 0.05 |
| Bruce #61 | 14 | 2000 | 1.22 | 0.22 | 0.22 | 0.24 | 0.10 |
| Bruce #27 | 14 | 5000 | 0.10 | 0.38 | 0.10 | 0.40 | 0.02 |
| WORKING MOLAR RANGES | | | 0.18-0.32 | 0.24-0.51 | 0.20-0.32 | 0.01-0.14 | 0.01-0.02 |

Example 4: Novel In Vivo Platform for Lung Delivery

Figure 19:
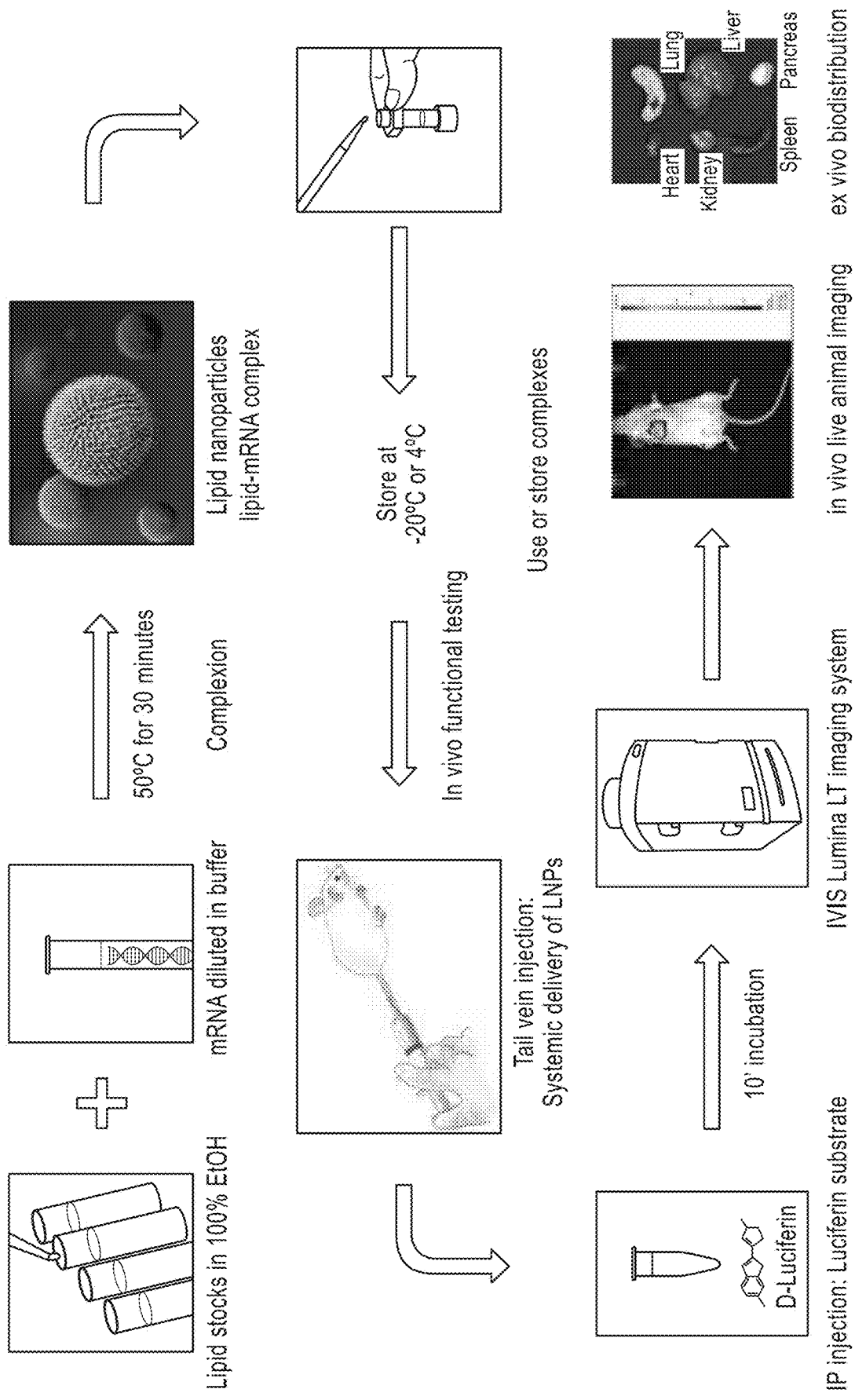
FIG. 19. Diagram of workflow.

FIG. 19 shows Invivofectamine® Lung (IVF® Lung) research and development workflow.

Figure 21:
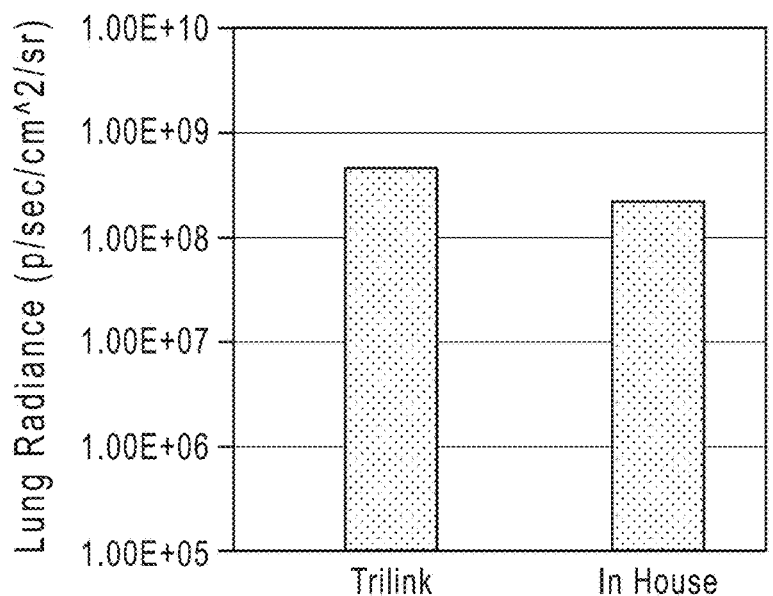
FIG. 21. In vivo screening of different mRNA's encoding for Firefly Luciferase. mRNA expression kinetics can differ based on optimization of mRNA. Experimental design—Reagent: Invivofectamine® Lung, Route of Delivery: Intravenous (systemic), Payload: 2 different mRNAs encoding for Firefly Luciferase (Trilink® and In House). Graph shows lung radiance for each payload used.

Reagent comparative analysis was performed using four different formulations (IVF® Lung, DOTMA:DOPE, DOT-AP:DOPE, and Jet PEI®). Animals received systemic delivery of Cre (obtained from Trilink®) in a lacZ Cre-reporter strain, immunofluorescence staining to detect protein expression was used.

mRNA expression kinetics can differ based on optimization of mRNA. FIG. 21 shows lung radiance following systemic (intravenous) delivery of Invivofectamine® Lung including either Trilink® Firefly Luciferase or in house optimized Firefly Luciferase.

Figure 25A:
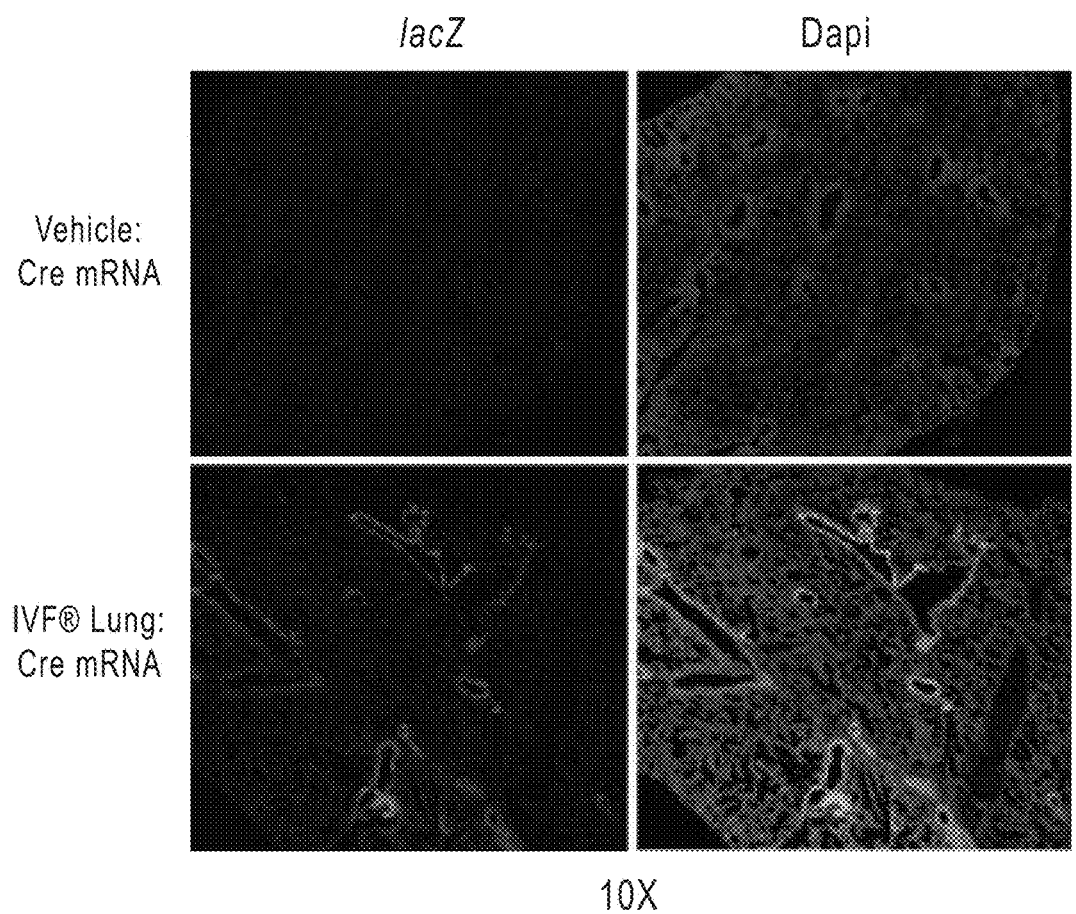
FIGS. 25A-25B. Cre mRNA delivery in lacZ reporter mice. Invivofectamine® Lung delivery in vivo—Immunofluorescent staining for detection of lacZ expression reveals expression throughout the lung tissue, and is distinctly visible in bronchiole structures.
Figure 25B:
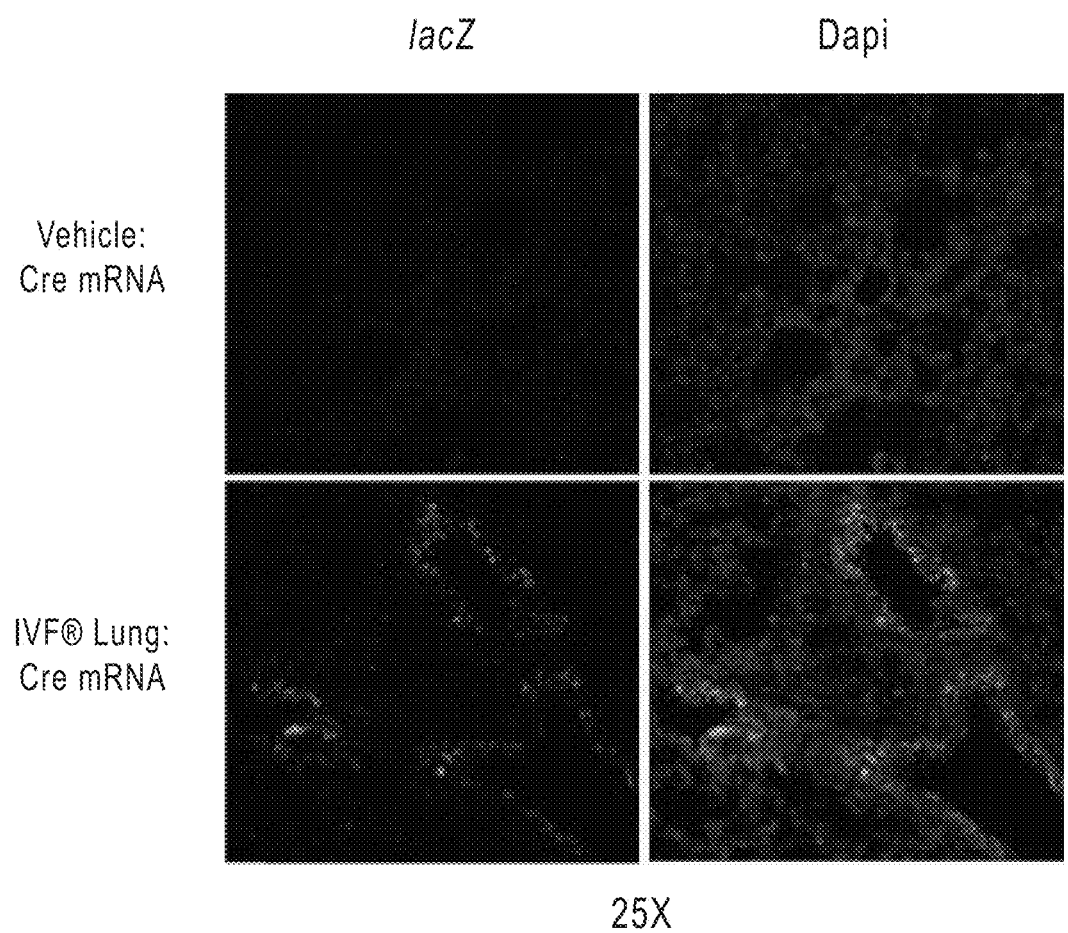

To assess IVF® Lung delivery of lacZ mRNA and IVF® Lung delivery of Cre mRNA animals were injected intravenously with LNP complexed. Tissues was harvested 4 hours post-delivery and immediately cryopreserved. Cryosectioning of isolated lung tissue was subsequently stained for beta-gal and tissue was counterstained for anatomical features (FIGS. 24A-24D) or used for immunofluorescence detection of lacZ protein expression (FIGS. 25A-25B), depending on the experiment. Delivery of mRNA was seen demonstrated by positive 0-gal staining and immunofluorescent staining. Using the reporter strain, specific delivery to the airways is seen with the fluorescent staining.

Figure 22:
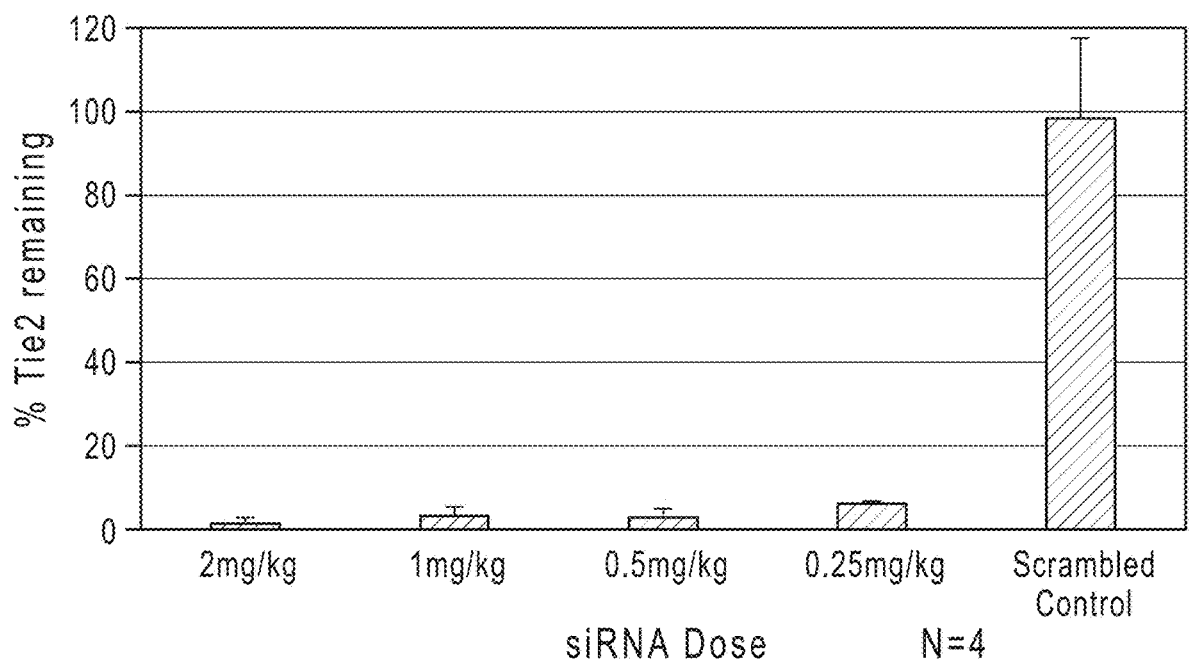
FIG. 22. siRNA knockdown in the lung. Tyrosine kinase receptor Tie2, also known as Tek, plays an important role in embryonic vasculature and persists in adult endothelial cells. It is expressed almost exclusively in endothelial cells. Knockdown analysis was performed on isolated lung tissue 48 hours post IV delivery of LNPs (IVF Rx lung+siRNA) (N=4). Graph shows the percentage of Tie2 remaining.
Figure 23:
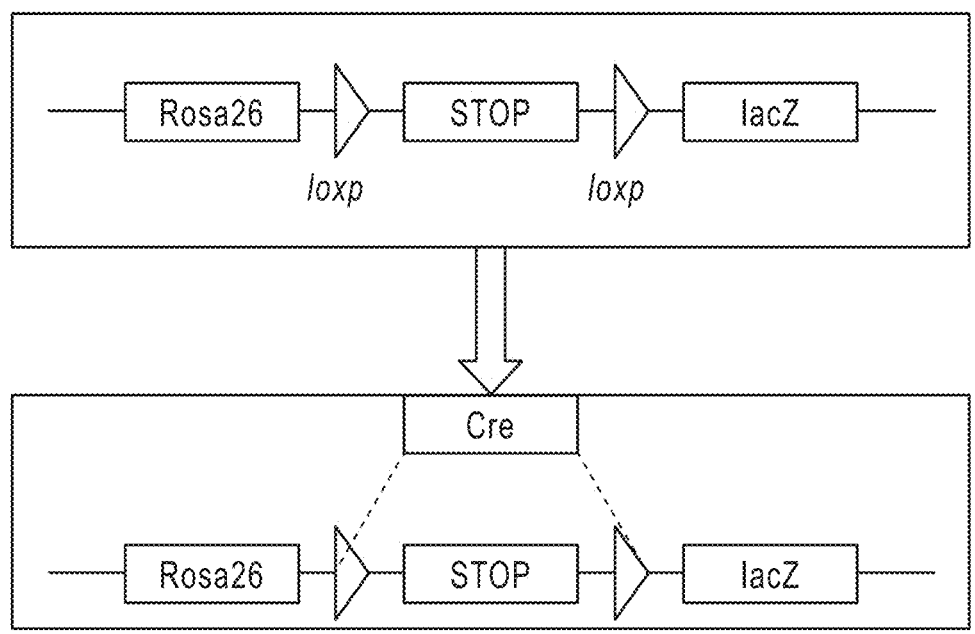
FIG. 23. Cartoon representation of lacZ Cre-reporter strain and the result of delivering Cre mRNA using IVF® Lung.
Figure 24A:
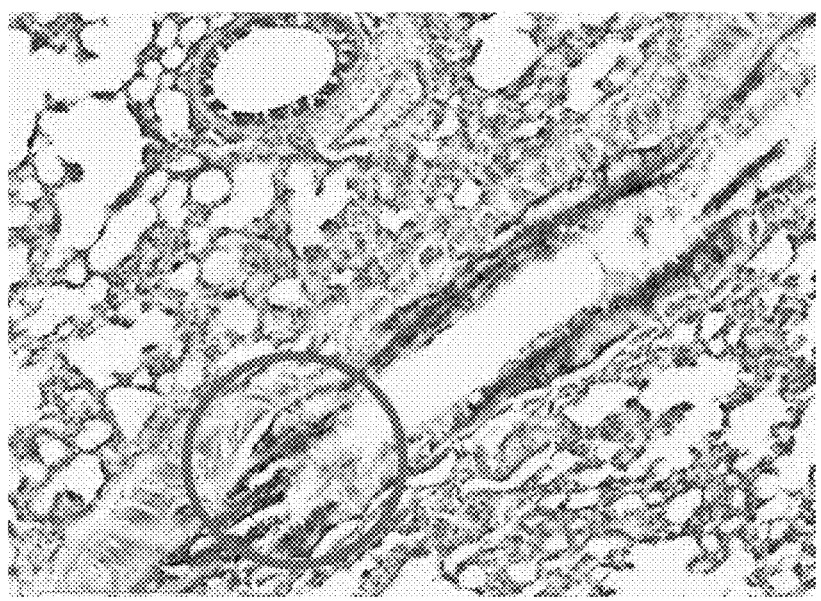
FIGS. 24A-24D. lacZ mRNA delivery in wild type mice.
Figure 24B:
Figure 24C:
Figure 24D:
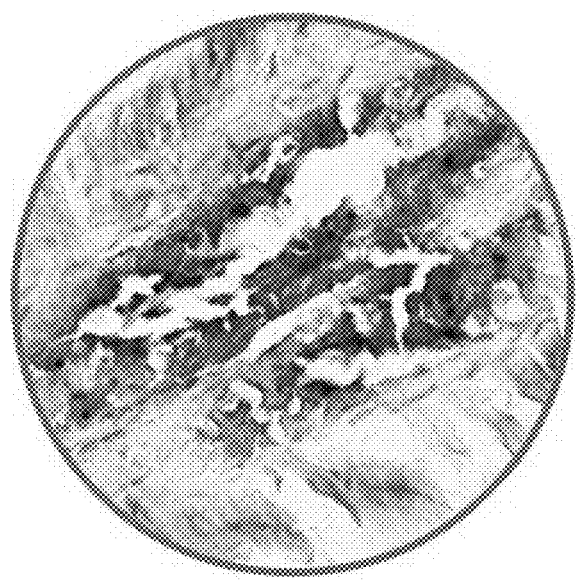

FIG. 22 demonstrates the ability of IVF® Lung to not only delivery siRNA to the lung but to endothelial cells as demonstrated by knockdown of Tie2, and endothelial cell specific marker.

Figure 26:
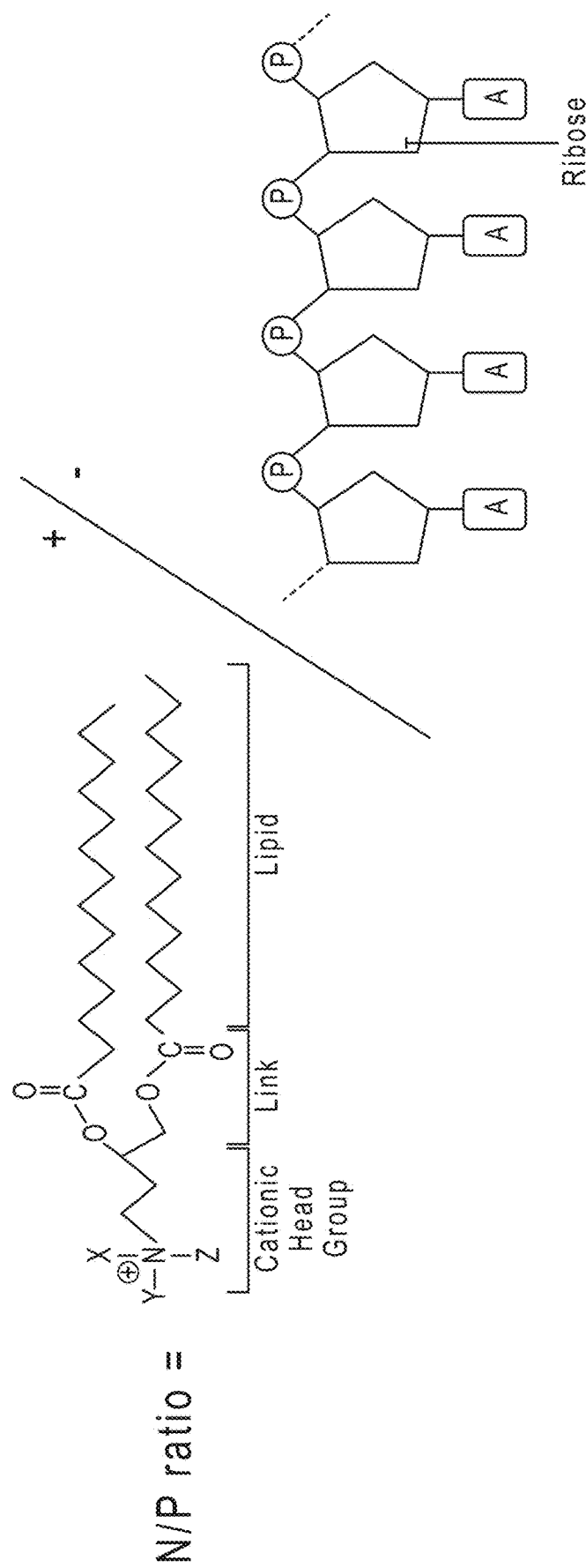
FIG. 26. Cartoon illustration describing the N/P ratio. N/P ratio refers to the positive charge contributed by Nitrogen residues on the cationic lipid versus the negative charge contributed by the Phosphates on the nucleic acid backbone. High N/P=Greater amounts of lipid compared to mRNA. Low N/P=Lower amounts of lipid compared to mRNA. N/P ratio greatly affects the surface charge of the lipid nanoparticle which strongly governs transfection efficiency and affects biodistribution.
Figure 27A:
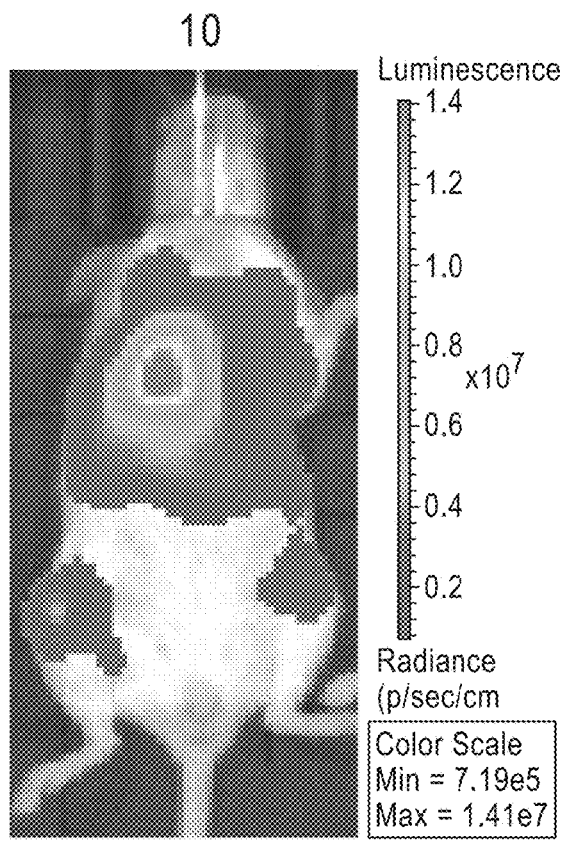
FIGS. 27A-27K. N/P ratio affects biodistribution pattern. In vivo whole animal imaging and ex vivo isolated organ tissue imaging showing the effect of N/P ratio (10, 8, 6, 4, 2) on biodistribution.
Figure 27C:
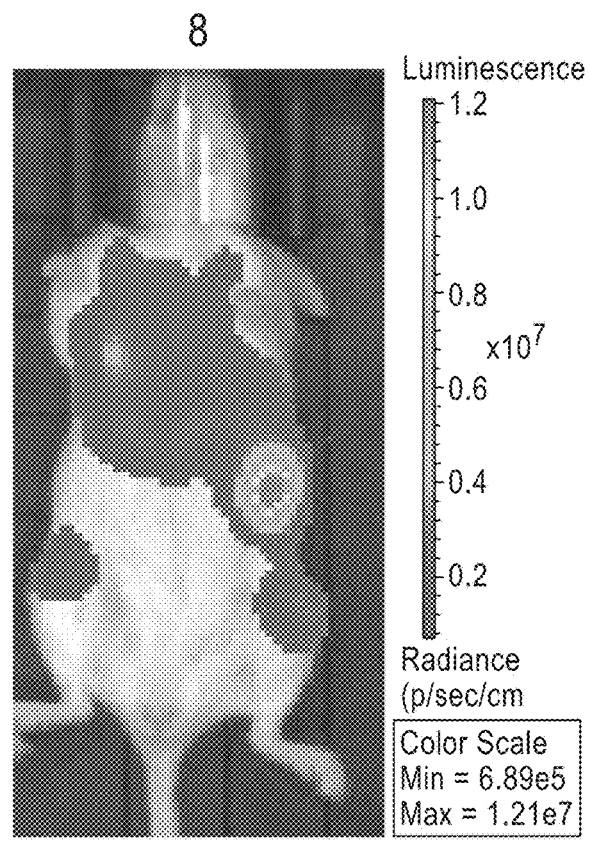
Figure 27B:
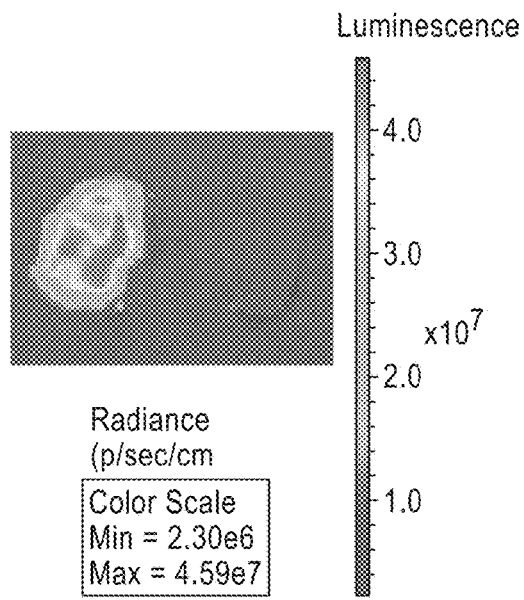
Figure 27D:
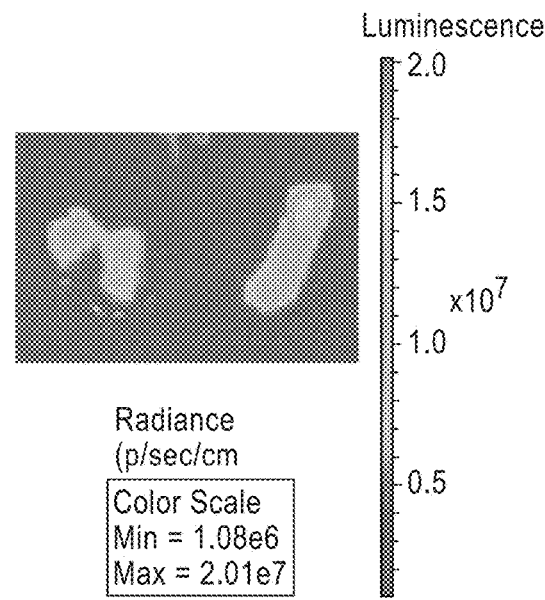
Figure 27E:
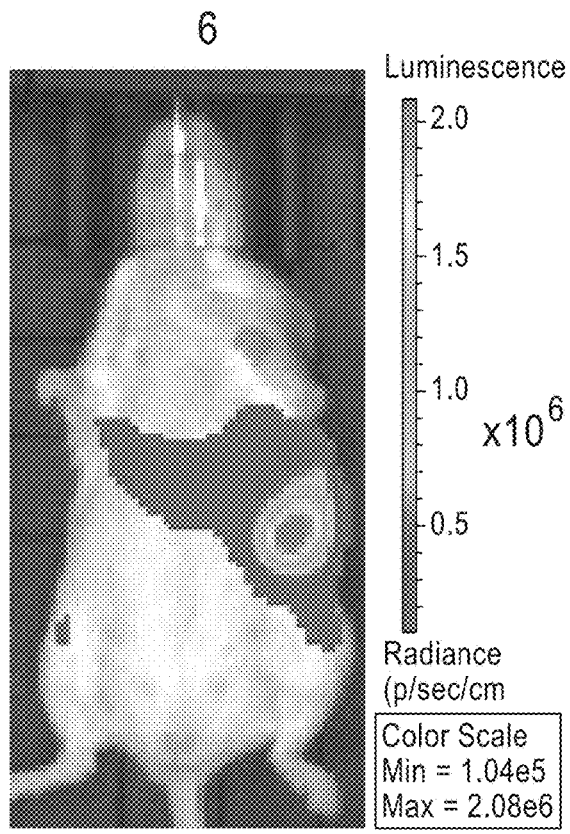
Figure 27G:
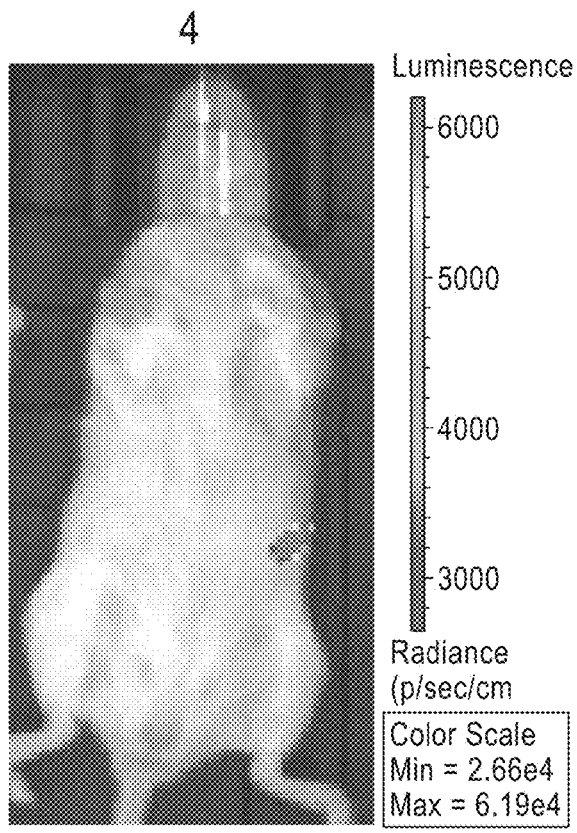
Figure 27F:
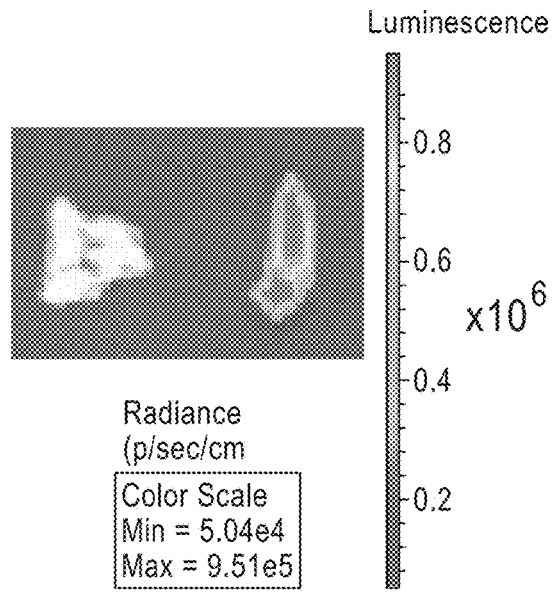
Figure 27H:
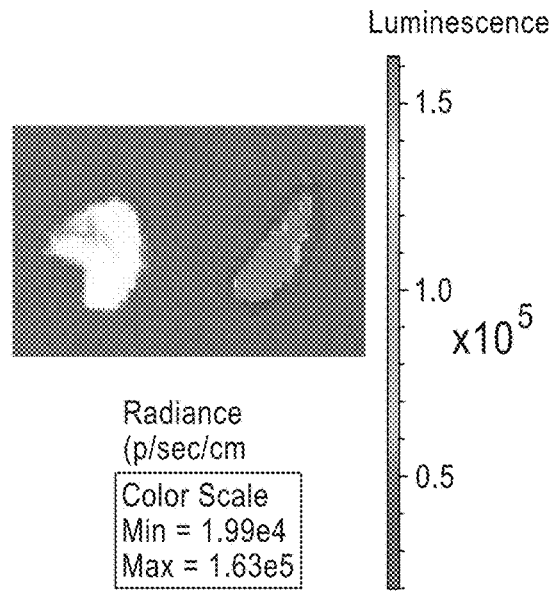
Figure 27I:
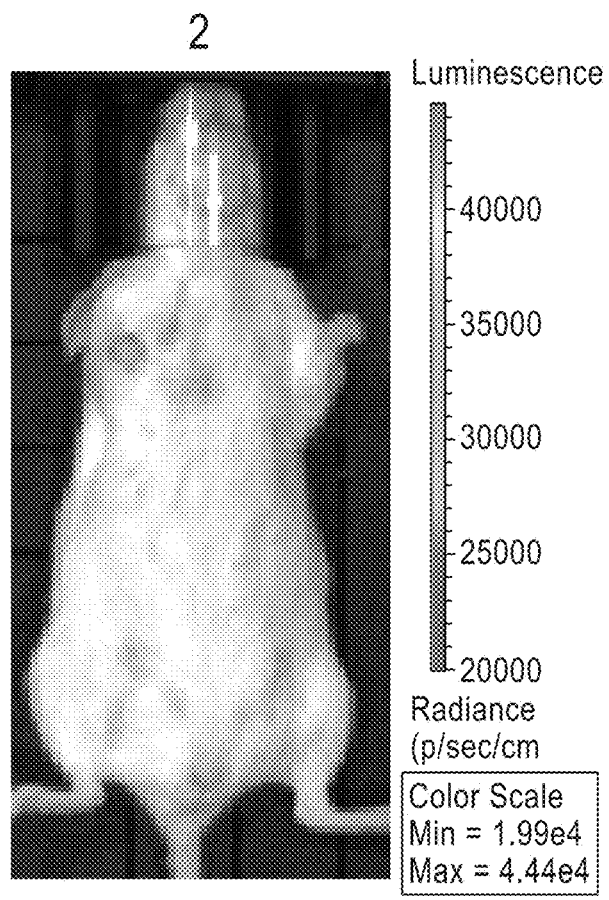
Figure 27K:
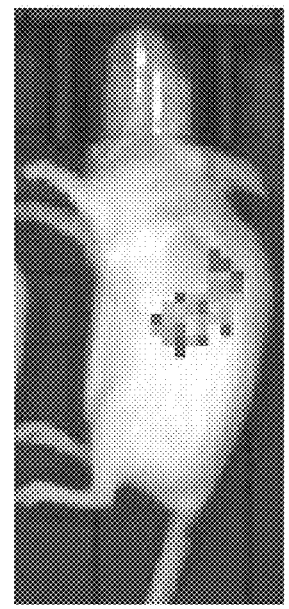
Figure 27J:
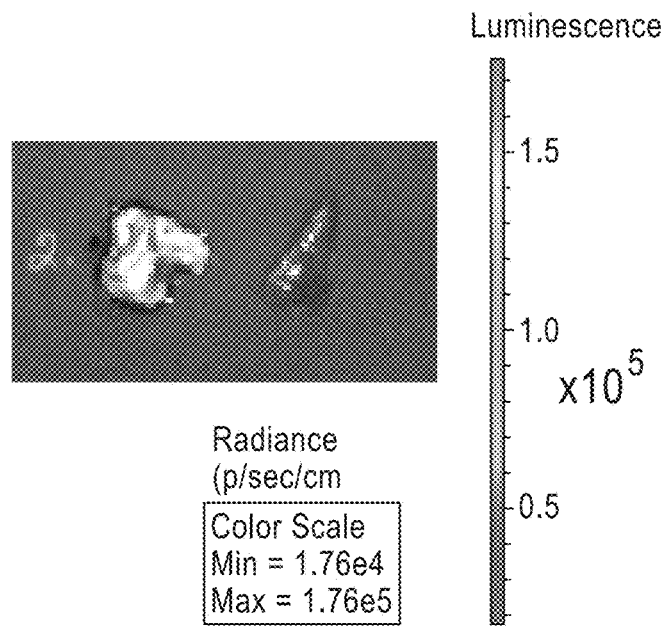
Figure 28:
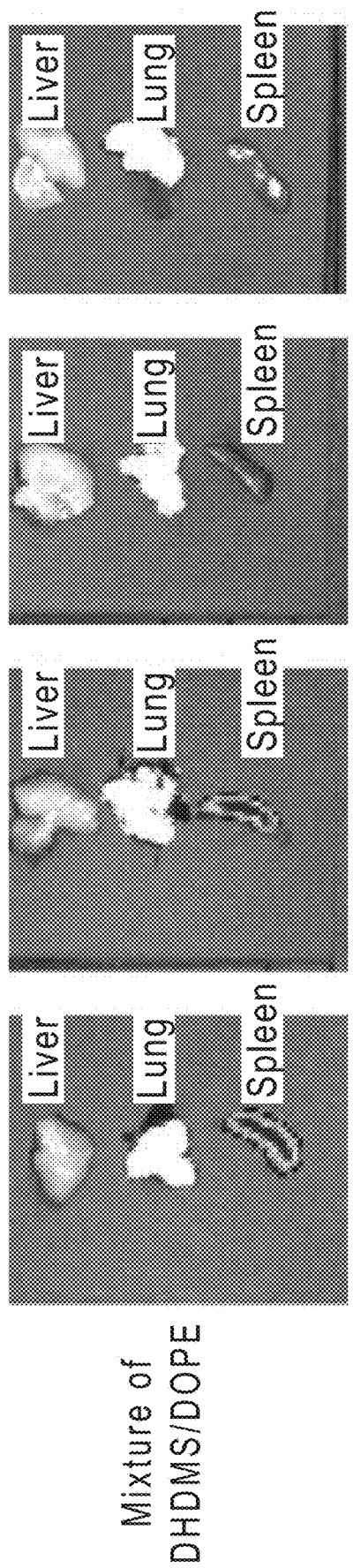
FIG. 28. Formulation: DHDMS/DOPE with N/P ratio alteration. No lung delivery seen and varied N/P ratio did not affect lung distribution. Ex vivo isolated organ tissue images.

FIGS. 27A-27K show that the N/P ratio (see FIG. 26) affects biodistribution patterns. However, using the core lipid (DHDMS) formulated with DOPE resulted in no lung delivery and varied N/P ratio did not affect lung distribution (FIG. 28).

REFERENCES

1. Kranz L M, Diken M, Haas H, Kreiter S et al. Systemic RNA delivery to dendritic cells exploits antiviral defense for cancer immunotherapy. Nature. 2016 Jun. 1; 534 (7607):396-401
2. Azarmi S, Roa W H, Lobenberg R, Targeted delivery of nanoparticles for the treatment of lung diseases Adv Drug Deliv Rev, 2008 May 22; 60(8):863-75
3. Scott McIvor, R. Therapeutic Delivery of mRNA: The Medium Is the Message. Molecular Therapy 19.5 (2011): 822 823. PMC. Web. 8 Nov. 2015.
4. Sahin, Ugur, Katalin Karikó, and Ozlem Tureci. "mRNA-based therapeutics [mdash]developing a new class of drugs." Nature Reviews Drug Discovery (2014).
5. Kauffman, Kevin John, et al. "Optimization of Lipid Nanoparticle Formulations for mRNA Delivery in vivo with Fractional Factorial and Definitive Screening Designs." Nano Letters (2015).

What is claimed is:

1. A method of delivering a bioactive agent to a lung tissue in a subject, said method comprising:
   intravenously administering a bioactive agent-lipid complex to the subject, thereby delivering said bioactive agent-lipid complex to the lung tissue,
   wherein the bioactive agent-lipid complex comprises a bioactive agent and a composition comprising
   (i) a first cationic lipid at a compositional molar ratio from about 0.18 to about 0.32 and of formula:

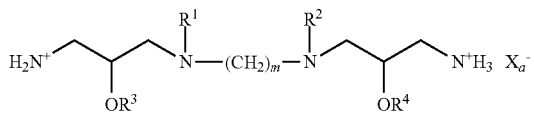

(I)

wherein
   $R^1$ and $R^2$ are independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl;
   $R^3$ and $R^4$ are independently hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl;
   m is an integer from 1 to 6;
   $X_a^-$ is an anion;
   (ii) a second cationic lipid at a compositional molar ratio from about 0.24 to about 0.51 and of formula:

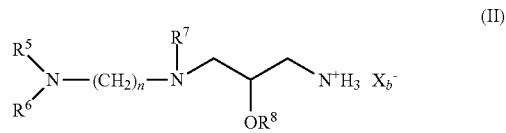

(II)

wherein
   $R^5$ and $R^8$ are independently hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl;
   $R^6$ and $R^7$ are independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl;
   n is an integer from 1 to 6; and
   $X_b^-$ is an anion;
   (iii) a first helper lipid at a compositional molar ratio from about 0.20 to about 0.32;
   (iv) a second helper lipid at a compositional molar ratio from about 0.01 to about 0.14; and
   (v) a biostability enhancing agent at a compositional molar ratio from about 0.01 to about 0.02.

2. The method of claim 1, wherein said first cationic lipid has the formula:

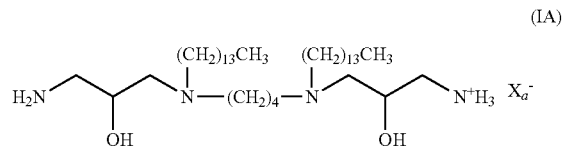

(IA)

wherein
$X_a^-$ is Cl$^-$ or $CH_3COO^-$.

3. The method of claim 1, wherein said second cationic lipid has the formula:

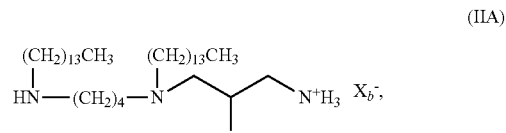

(IIA)

Wherein
$X_b^-$ is Cl$^-$ or $CH_3COO^-$.

4. The method of claim 1, wherein said first helper lipid is dioleoylphosphatidylethanolamine (DOPE).

5. The method of claim 1, wherein said second helper lipid is cholesterol.

6. The method of claim 1, wherein said biostability enhancing agent is a polyether compound, a PEGylated phospholipid, or polyethylene glycol.

7. The method of claim 1, wherein said bioactive agent comprises a nucleic acid, a ribonucleoprotein or a small molecule.

8. The method of claim 7, wherein said nucleic acid is an mRNA, a siRNA, miRNA or guide RNA.

9. The method of claim 1, wherein said subject is a mammal, optionally wherein said mammal is a primate.

10. The method of claim 1, wherein said bioactive agent-lipid complex is delivered to an epithelial lung cell or an endothelial lung cell.

11. The method of claim 1, wherein the bioactive agent-lipid complex is delivered to lung tissue and spleen tissue in the subject.

\* \* \* \* \*